United States Patent [19]
Nakamichi

[11] Patent Number: 5,748,596
[45] Date of Patent: May 5, 1998

[54] DISK CHANGER/PLAYER WITH DISK-EDGE GUIDE AND TRANSFER MECHANISM

[75] Inventor: Niro Nakamichi, Tokyo, Japan

[73] Assignee: Nakamichi Corporation, Tokyo, Japan

[21] Appl. No.: 725,137

[22] Filed: Oct. 2, 1996

[30] Foreign Application Priority Data

Oct. 11, 1995 [JP] Japan ................... 7-289282

[51] Int. Cl.$^6$ ........................... G11B 17/04; G11B 17/10
[52] U.S. Cl. ................... 369/77.1; 369/178; 360/98.06; 360/99.07
[58] Field of Search ................. 369/75.1, 75.2, 369/77.1, 178, 191; 360/99.03, 99.07, 98.06

[56] References Cited

U.S. PATENT DOCUMENTS

| | | |
|---|---|---|
| 4,682,320 | 7/1987 | D'Alayer De Costemore D'Arc .. 369/77.1 |
| 4,695,990 | 9/1987 | Kawakami ................................ 369/36 |
| 4,750,160 | 6/1988 | Miller et al. ............................. 369/37 |
| 5,119,354 | 6/1992 | Umesaki ................................. 369/77.1 |
| 5,173,894 | 12/1992 | Kido ...................................... 369/77.1 |
| 5,255,255 | 10/1993 | Kaneda et al. .......................... 369/77.1 |
| 5,307,331 | 4/1994 | D'Alayer De Costemore D'Arc .. 369/37 |
| 5,321,687 | 6/1994 | Kinoshita et al. ....................... 369/191 |
| 5,544,148 | 8/1996 | Nakamichi ............................. 369/77.1 |

FOREIGN PATENT DOCUMENTS 60-160061 8/1985 Japan ..................... 369/77.1

Primary Examiner—Jefferson Evans
Attorney, Agent, or Firm—Morrison Law Firm

[57] ABSTRACT

A disk changer employs two disk guides that support a disk by its edge. A first guide has a revolving belt that frictionally engages the disk edge to roll it on a second guide. The edge fits into a channel of the second guide. The channel's access is defined by two opposing guiding surfaces. The channel's blind end has a resilient surface. Disks are inserted between the guides through an aperture guarded by a flap that opens outwardly and closes to prevent improper insertion of disks. The flap, urged by a spring, closes on the disk, riding along the back surface. A controller detects when the flap falls off the trailing portion to register position for position encoding. The shape of the resilient surface of the second disk guide corresponds to the position of the disk along a line of transport. Three transport zones are defined. In the first zone, closest to the insertion aperture, the surface is sloped to press the disk against the guiding surface opposite the flap to resist the moment generated by the pressure of the flap on the back of the disk. In the second zone, following the point at which the flap has fallen off the trailing edge, the surface is sloped to press the disk against the opposite guiding surface. In the third zone, the surface is vertical to allow the disk to pitch to an extent allowed by the spacing of the guiding surfaces, to align itself with a storage slot.

44 Claims, 70 Drawing Sheets

DISK CHANGER/PLAYER WITH DISK-EDGE GUIDE AND TRANSFER MECHANISM

BACKGROUND OF THE INVENTION

The present invention relates to a disk changer/players and more particularly, changer/players that transport disks internally.

Japanese patent application number 7-138484 describes a disk changer/player in which a disk is transferred by rolling the disk along a disk transfer surface extending in the direction of disk transfer. One edge of the disk is supported by a timing belt revolving on a pair of pulleys. The opposite edge is supported by a fixed guide groove along which the disk rolls when the timing belt is revolved. The bottom of the guide groove has a friction belt to prevent the disk from slipping as it rolls. The friction belt presents a surface to the disk edge that is skew to both the surface of the disk and the normal of the disk's recording surface. The skewed surface urges the disk against a guide surface forming a side of the guide groove. The disk is thus prevented from pitching as it is rolled into a slot of the storage magazine.

In the above device, the disk may not move smoothly into the storage slot if the guide groove and the disk storage slot are not precisely aligned. This is because the disk is tightly held against one side of the groove with little play.

OBJECTS AND SUMMARY OF THE INVENTION

An object of the present invention is to provide a disk changer/player that overcomes the disadvantages of the prior art and allows for smooth transport of disks between guides.

Another object of certain embodiments of the present invention is to provide a disk changer/player that transports disk by their edges and inserts disks smoothly into a storage guide without suffering any binding due to slight misalignment between the storage slot and the disk transport mechanism.

Still another object of certain embodiments of the present invention is to provide a disk changer/player that maintains a disk orientation despite a moment generated by a disk position detecting member being urged against the disk.

Briefly, a disk changer employs two disk guides that support a disk by its edge. A first guide has a revolving belt that frictionally engages the disk edge to roll it on a second guide. The edge fits into a channel of the second guide. The channel's access is defined by two opposing guiding surfaces. The channel's blind end has a resilient surface. Disks are inserted between the guides through an aperture guarded by a flap that opens outwardly and closes to prevent improper insertion of disks. The flap, urged by a spring, closes on the disk, riding along the back surface. A controller detects when the flap falls off the trailing portion to register position for position encoding. The shape of the resilient surface of the second disk guide corresponds to the position of the disk along a line of transport. Three transport zones are defined. In the first zone, closest to the insertion aperture, the surface is sloped to press the disk against the guiding surface opposite the flap to resist the moment generated by the pressure of the flap on the back of the disk. In the second zone, following the point at which the flap has fallen off the trailing edge, the surface is sloped to press the disk against the opposite guiding surface. In the third zone, the surface is vertical to allow the disk to pitch to an extent allowed by the spacing of the guiding surfaces, to align itself with a storage slot.

According to an embodiment of the present invention, a disk transfer device, for transporting, in a direction of travel, a recorded disk having a back surface, a recorded surface, and an edge surface, comprises a first guide having a first surface oriented to engage the edge surface at a first portion of the edge surface, a second guide having a second surface oriented to engage the edge surface at a second portion of the edge surface substantially opposite the first portion of the edge surface, the first guide having at least one guide surface, means for urging the disk against the at least one guide surface, the at least one guide surface being such that the disk is forced toward a defined orientation relative to the direction of travel, a disk storage magazine, the disk storage magazine having at least one storage guide, alignable with the first disk guide, to guide the disk from the first and second disk guides into the disk storage magazine, the disk being guided by the storage guide after a position of initial engagement with the storage guide, the means for urging having means for reducing a force of urging, as the disk is transported through the position of initial engagement, during a transporting from the first and second disk guides toward the storage guide, whereby the disk is made freer to align itself with the storage guide.

According to another embodiment of the present invention, a disk transfer device for transporting a recorded disk with a recorded surface, a back surface opposite the recorded surface, and an edge surface running around a perimeter of the disk, comprises a first longitudinal guide having a first surface oriented to engage the edge surface at a first portion of the edge surface, a second longitudinal guide having a second surface oriented to engage the edge surface at a second portion of the edge surface opposite the first portion of the edges surface, the first longitudinal guide having a guide surface parallel to a direction of travel of the disk, the guide surface also being parallel to the recorded surface and a resilient element attached to the first longitudinal guide positioned to urge one of the recorded surface and the back surface against the guide surface, a third guide to which the disk is transferred from the first and second longitudinal guides, the third guide being substantially alignable with the first longitudinal guide, the resilient element being shaped such that a force of the urging is reduced when the disk is transferred from the first longitudinal guide to the third guide, whereby an engagement between the guide surface and the disk is one of relinquished and made more compliant, so that the disk is enabled to tilt and thereby pass smoothly to the third guide when the third guide is imperfectly aligned with the first longitudinal guide.

According to still another embodiment of the present invention, a disk transport device, for transporting a disk, with an edge and recorded and back surfaces, along a path of travel, comprises a chassis, a first guide element, connected to the chassis, with a channel aligned with the path, the channel having a first guide surface parallel to the path of travel, the first guide surface defining, at least partly, a first side of an access of the channel, a second guide element having a second guide surface that is imperfectly alignable with the first guide surface such that the first and second guide surfaces lie in different planes, a resilient member with a first edge-engaging surface defining a blind end of the channel, the first edge-engaging surface being shaped to urge one of the recorded and back surfaces against the first guide surface as the disk is transported along a first portion of the path, whereby the disk's orientation is maintained parallel to the guide surface, the first edge-engaging surface being shaped to ease a force of urging generated by the first edge-engaging surface at a second portion of the path coinciding with a position of the disk at which the disk engaged with the first guide surface begins to engage the second guide surface, whereby the disk is made more free to pivot and is thereby enabled to align itself with the second guide surface.

According to still another embodiment of the present invention, a disk transport device, comprises a first guide with a first support surface positioned to engage and movably support, at least partly, the disk, a second guide with a first guide surface substantially parallel to a recorded surface of the disk and positioned to engage one of the recorded surface and a back surface of the disk, a third guide, imperfectly aligned with the second guide, positioned to engage the one of the recorded surface and the back surface of the disk when the disk is transported along the first guide beyond a transition point along a path of transport of the disk at which the disk begins to engage the third guide, the second guide having an urging surface forming a first angle, substantially greater than 0 and substantially less than 90 degrees, with the recorded surface of the disk, the first guide having means for urging an edge of the disk against the urging surface and for permitting the disk to roll along the edge against the urging surface, whereby one of the recorded surface and a back surface is urged against the guide surface, the second guide having a low-urging-force surface positioned such that, when the disk approaches the transition point, the disk rolls off the urging surface onto the low-urging force surface and the low-urging-force surface forming a second angle substantially greater than the first angle.

According to still another embodiment of the present invention, a disk transport device, comprises a first guide with a first support surface positioned to engage and movably support, at least partly, the disk, a second guide with a first guide surface substantially parallel to a recorded surface of the disk and positioned to engage one of the recorded surface and a back surface of the disk, a third guide, imperfectly aligned with the second guide, positioned to engage the one of the recorded surface and the back surface of the disk when the disk is transported along the first guide beyond a transition point along a path of transport of the disk, the transition point being a point at which the disk just begins to engage the third guide, the second guide having a resilient urging surface positioned to urge one of the recorded surface and a back surface against the guide surface with a first urging force, the urging surface being operative to urge the disk over a portion of the path other than the transition regions so that, when the disk approaches the transition point, the first urging force is one of relinquished and reduced so that the disk is permitted to tilt more easily to align itself with the third guide as the disk passes through the transition point.

According to still another embodiment of the present invention, a disk transporting device for transporting a disk, with an edge, a recorded surface, and a back surface opposite the recorded surface, from an insertion position to a first position of the device, comprises first and second disk transfer guides movably supported in the device, the first disk transfer guide including first means for engaging a first portion of the edge, the second disk transfer guide including second means for engaging a second portion of the edge and means for urging the first and second disk transfer guides together so that the disk can be supported therebetween, at least one of the first and second disk transfer guides including drive means for moving the disk along the first and second disk transfer guides, one of the first and second disk guides having an urging surface and a guiding surface, the urging surface having a sloped portion positioned to engage the edge at a corner thereof, the sloped portion being oriented to urge the disk toward the other of the first and second disk guides and also urge one of the recorded and back surfaces against the guide surface with a first force of urging, a storage guide at the first position having a storage guiding surface to guide the disk at the first position, the urging surface having a transition surface portion, coinciding with a portion of a path of travel of the disk to the first position where the disk initially engages the storage guide and the transition surface portion being oriented such that the disk is urged against the guide surface with a second force that is less than the first force, whereby the disk is permitted to tilt to align itself with the storage guiding surface.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 65 is a flowchart showing a procedure JOB STAND-BY.

DETAILED DESCRIPTION OF PREFERRED EMBODIMENTS

Figure 1:
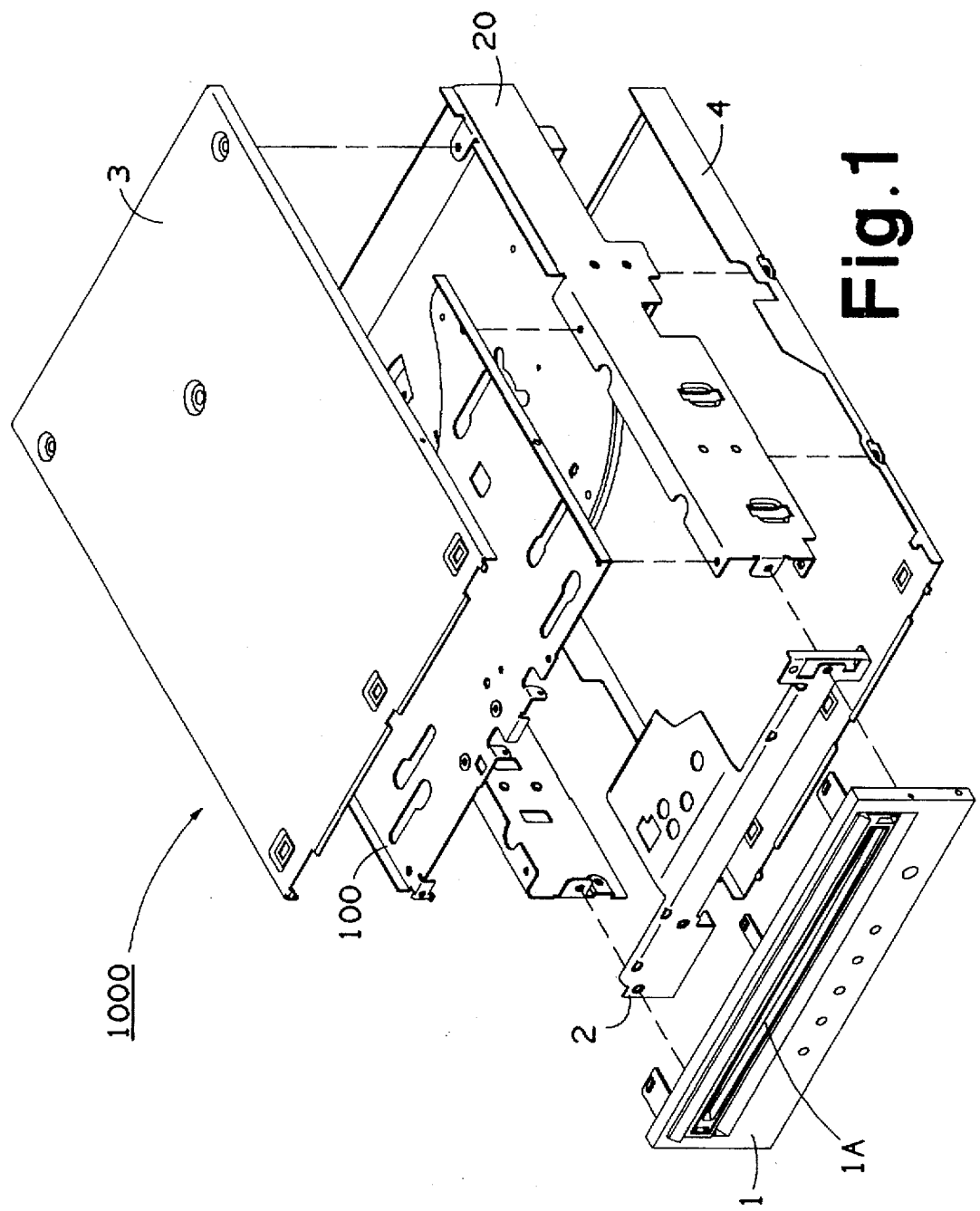
FIG. 1 is an exploded view of a chassis structure of a disk changer/player according to an embodiment of the invention.

A disk transport mechanism, similar in many respects to the present invention, is described in U.S. patent application Ser. No. 08/644,718, the entirety of which is incorporated herein by reference. Referring to FIG. 1, a disk changer/player that uses a stocker capable of selectively playing back one of a plurality of disks stored in a stocker (not shown in FIG. 1). Disks (CD-ROMs) are inserted from a disk insertion aperture 1A and stored in a stocker inside a housing comprising a top cover 3, a main chassis 20, a front chassis 2, and a bottom cover 4. To allow changer/player 1000 to be mounted internally in a computer unit, the outer dimensions comply with the standard peripheral size; the 5¼ inch half-height form factor (H×W×D dimensions of 41.5×146× 208 mm).

Chassis

A loading chassis 100 is affixed attached to the top of main chassis 20 and serves as an internal fixture. Front chassis 2 is affixed to the front of main chassis 20. A front panel 1 is attached to the outside of front chassis 2. Top cover 3 and bottom cover 4 are mounted on upper end and lower ends of main chassis 20, respectively. Disks are inserted through a disk insertion aperture 1A in front panel 1. Disk insertion aperture 1A is wider toward the center than at the edges to prevent damage to the recording surface of the disk during insertion and removal of the disk.

Disk Transfer Mechanism

Referring to FIGS. 2 through 8, a disk transfer mechanism 1001 employs a drive-side disk guide 1002, on a left side of changer/player 1000 and a fixed-side disk guide 1003 on a right of the changer/player 1000. Disk transfer mechanism 1001 is movably affixed to the bottom of loading chassis 100 by guides and guide pins that permit only left and right movement. Drive-side disk guide 1002 and fixed-side disk guide 1003 converge on a disk D, engaging its edge at opposite points, to support and move disk D within changer/player 1000 after disk D is inserted in disk insertion aperture 1A.

An L-shaped loading plate 104 supports drive-side disk guide 1002. Another L-shaped loading plate 140 supports fixed-side disk guide 1003. Loading collars 120A–120C, attached to loading plate 104, fit into guide grooves 100A–100C in loading chassis 100, respectively, providing guided, movable support for loading plate 104. Loading collars 120D–120F, attached to loading plate 140, fit into guide grooves 100D–100F in loading chassis 100, respectively, providing guided, movable support for loading plate 140. Thus loading plates 104 and 140 hang from the bottom of loading chassis 100 and are free to move, over a limited range, left and right, respectively.

Racks 104A, 140A are formed on facing edges of loading plates 104 and 140. A pinion gear 143 rotatably mounted on the lower face of loading chassis 100, engages both racks 104A and 140A forcing loading plates 104 and 140 to move equally in opposite directions. Loading plates 104 and 140 are urged together by a spring 160.

Figure 46:
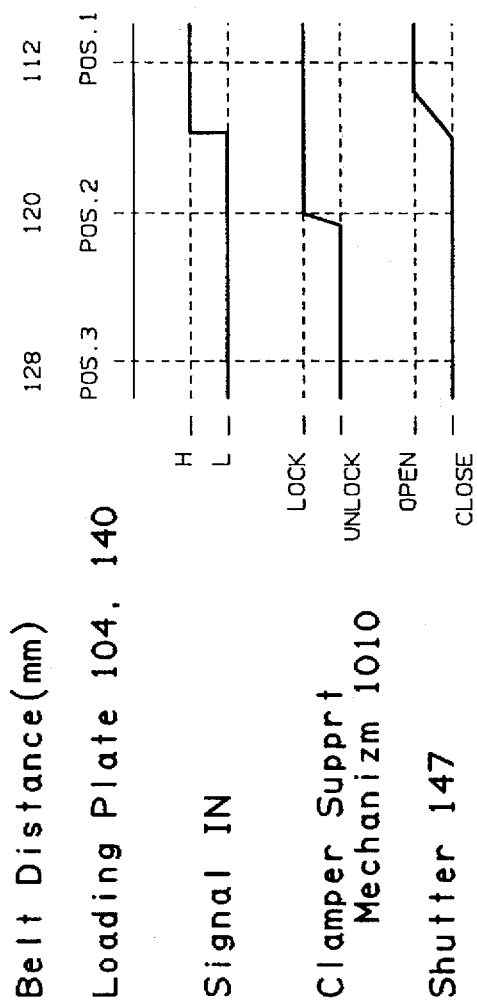
FIG. 46 is a timing chart showing the operating modes of the other mechanisms that move in tandem with the open/close position of loading plates 104 and 140.

A bent tab in loading plate 104 forms shutter piece 104B toward the front of changer/player 1000. A light beam generated by an optical sensor 163B on the lower surface of loading chassis 100, is interrupted by shutter piece 104B when loading plates 104 and 140 are in a substantially converged position. An output from optical sensor 163B is identified as signal Loading IN. Referring momentarily to FIG. 46, when a gap between a timing belt 107 and a friction belt 142, supported on loading plates 104 and 140, respectively, is 115.7 mm or greater, the signal goes high "H".

Drive-side disk guide 1002 has an upper disk guide 121 of low-friction resin, such as Duracon. The lower surface of upper disk guide 121 forms an upper half of a guide groove/channel 121'. Guide groove/channel 121' confines the edge of disk D, restraining vertical motion of the left side of disk D (see FIG. 5). The lower surface of upper disk guide 121 has a sloped surface 121A that forms a 45 degree angle with respect to the upper surface Du of disk D. Sloped surface 121A runs a substantial part of the length of longitudinal axis of upper disk guide 121. A horizontal surface 121B of upper disk guide 121 forms one side of guide groove/channel 121' at the end of sloped surface 121A. Lower disk guide 122 forms a lower half of guide groove/channel 121'. The lower half of guide groove/channel 121' is defined by a another sloped surface 122A, also inclined at a 45 degree angle with respect to the upper surface Du of disk D, which runs into a reference horizontal surface 122B.

Guide groove/channel 121' has an access defined by surfaces 121A, 121B, 122A, 122B and other surfaces of upper and lower disk guides 121 and 122. Surfaces 121A and 121B and the other surfaces of upper and lower disk guides 121 and 122 bridging surface 107A of timing belt 107 with horizontal surface 121B form a continuous surface defining the upper side of the access of guide groove/channel 121'. Similarly, surfaces 122A and 122B and the other surfaces of lower disk guide 122 bridging surface 107A of timing belt 107 form a continuous surface defining the lower side of the access of guide groove/channel 121'. Guide groove/channel 121' is further defined by a blind end that includes bridging surface 107A of timing belt 107. Guide groove/channel 141' is further defined by a blind end that includes sloped surface 142A of friction belt 142.

The gap between guiding surface 121B and reference horizontal surface 122B is 1.5 mm, which is slightly wider than the thickness of the disk (1.2 mm). Horizontal surfaces 121B and 122B engage the unrecorded portion of disk upper surface Du and the lower surface Dl, respectively, restricting vertical movement of the left side of disk D.

Timing pulleys 106 and 108 are rotatably supported by shafts 105 and 109, respectively. Shafts 105 and 109 are positioned at opposite ends of upper disk guide 121, shaft 105 being toward the front and shaft 109 toward the rear. Timing belt 107 is reeved over timing pulleys 106 and 108. Timing belt 107 sits at a blind end of guide groove/channel 121' and drives a disk edge De of disk D in guide groove/channel 121'. Lower disk guide 122 has a restraining wall 122C over which timing belt 107 slides. Restraining wall 122C prevents inward bowing of timing belt 107 (see FIG. 7).

Figure 9:
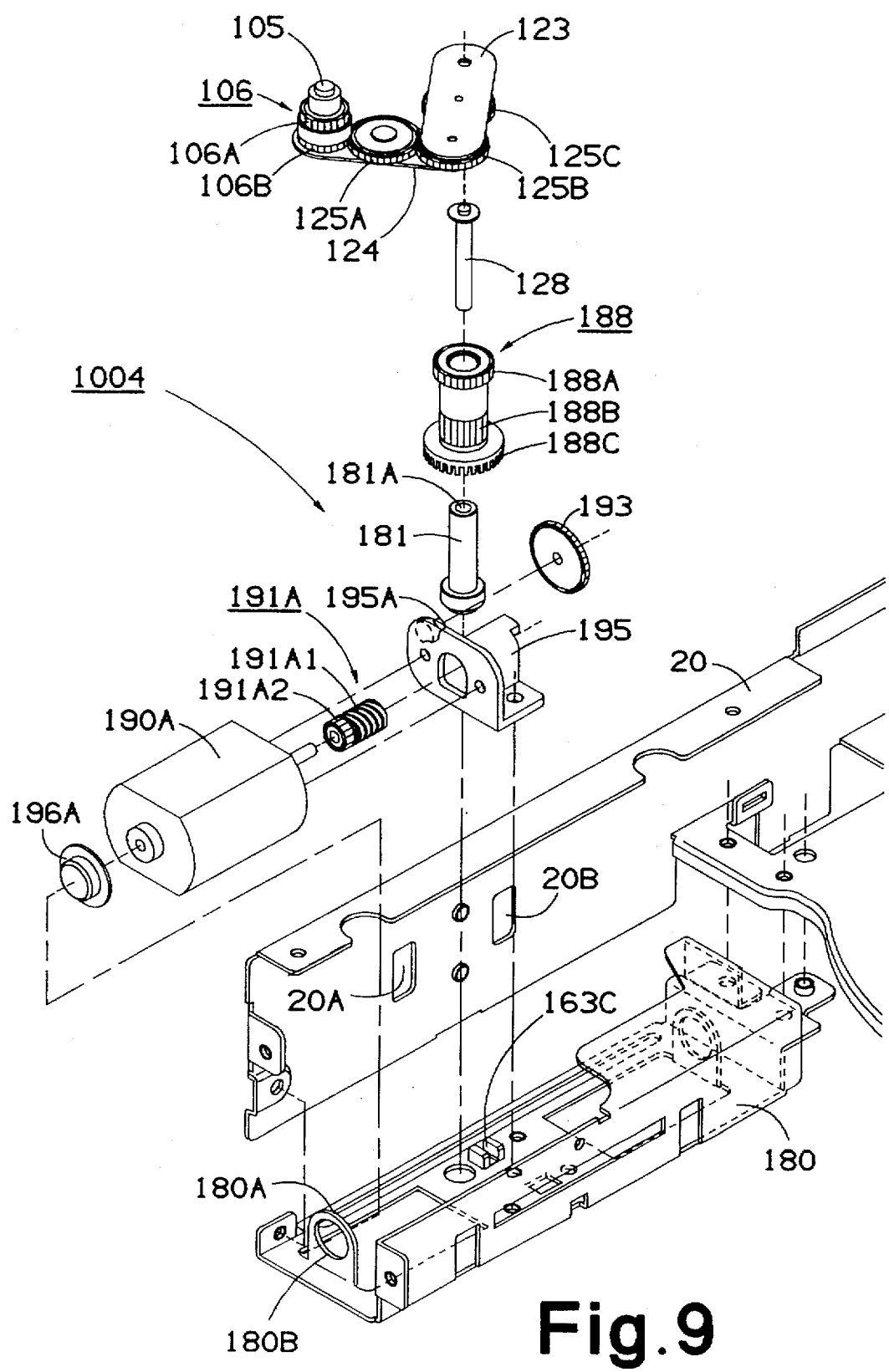
FIG. 9 is an exploded view of a pulley drive mechanism 1004 that drives drive-side disk guide 1002.

Referring now to FIG. 9, a pulley drive mechanism 1004 rotates timing pulley 106. A drive motor 190A is secured at its rear end by a rubber grommet 196A that fits into a cutout 180B in a motor bracket 180A. A gear member 188 rotates on a shaft 181 on chassis 180. An integral gear 188B on the lower end of gear member 188, engages a worm gear portion 191A1 of a worm gear element 191A that is press-fitted to the shaft of a motor 190A. Loading links 123 and 124 are pivotably interconnected by a shaft about which a gear 125B rotates. Timing pulley 106 rotates on a shaft 105 attached to the free end of loading link 124. Loading link 123 pivots on a shaft 128 affixed to the free end of loading link 123. Shaft 128 inserts into a center hole 181A of a shaft 181 to form a bearing for pivoting.

Motor 190A drives timing pulley 106 by a gear train that includes gear 125C, which meshes gear 125B, which meshes with gear 125A, which meshes with gear 106B. The input end of the gear train, gear 188B, is driven by worm gear portion 191A1. Gear 188B is driven by drive gear member 188 which has an integral gear 188A that engages gear 125C rotating on loading link 123. Gear 106B, integral with timing pulley 106, drives timing pulley 106. With this gear drive train, timing pulley 106 can move laterally with drive-side disk guide without moving motor 190A. Instead, loading links 123 and 124 pivot, as drive-side disk guide 1002 moves laterally, to keep gears 188A, 125C, 125B, 125A, and 106B in mesh. Besides avoiding the need to provide room for motor 190A to move, the mass of drive-side disk guide 1002 is smaller than if it had to carry motor 190A, reducing the size of spring 160. A weaker spring makes it easier to insert the disk smoothly.

Gear member 188 has a shutter 188C at its lower end. Optical sensor 163C, attached to motor chassis 180, detects the rotation of shutter 188C. The output from optical sensor 163C forms a loading pulse signal (signal $\overline{L.PULSE}$). In this embodiment, one pulse corresponds to approximately 0.46 mm of disk motion.

The present embodiment has an emergency gear 193 that makes it possible to remove disks from changer/player 1000 when there is no power (such as when changer/player 1000 has malfunctioned or when changer/player 1000 is disconnected from the computer unit). A gear 191A2 is formed on the end of worm gear 191A described above. Emergency gear 193, rotating on a shaft 195A of motor bracket 195, meshes gear 191A2. A portion of emergency gear 193 is exposed to the outside through opening 20A on the side of main chassis 20. A user can manually rotate emergency gear 193, rotating worm gear 191A of motor 190A, to remove disks left in changer/player 1000 during disk transfer.

Referring again to FIGS. 4 and 6, a main element of fixed-side disk guide 1003, a disk-guide 141, is of low-friction resin, such as Duracon. A guide groove/channel 141' is formed lengthwise in disk-guide 141. The edge of disk D fits into guide groove/channel 141' to restrict vertical movement of the right side of disk D. Guide groove/channel 141' is defined by sloped surfaces 141A and 141B, guiding surface 141C, and guiding surface 141D. Surfaces 141A and 141B, 141C, and 141D define an access of guide groove/channel) 141'. The gap between horizontal surface 141C and guiding surface 141D is 1.5 mm, which is identical to the gap for guide groove/channel 121'. To permit smooth disk insertion, a low-friction, rounded disk guide 141F is formed at the end of disk guide 141 toward the front of changer/player 1000 (see FIG. 8).

To prevent outer disk edge De from slipping, friction belt 142 is inserted and affixed in groove/channel 141'. The non-slip surface does not extend into disk guide 141F. Friction belt 142 is of high-friction material, such as urethane rubber or plastic rubber. Integrally-formed projections 142E on the back side of friction belt 142 insert into holes 141E, which pass all the way through disk guide 141 to the back side. Projections 142E are forcibly pulled through holes 141E to lock friction belt in place and excess material of projections 142E is trimmed off.

Figure 6:
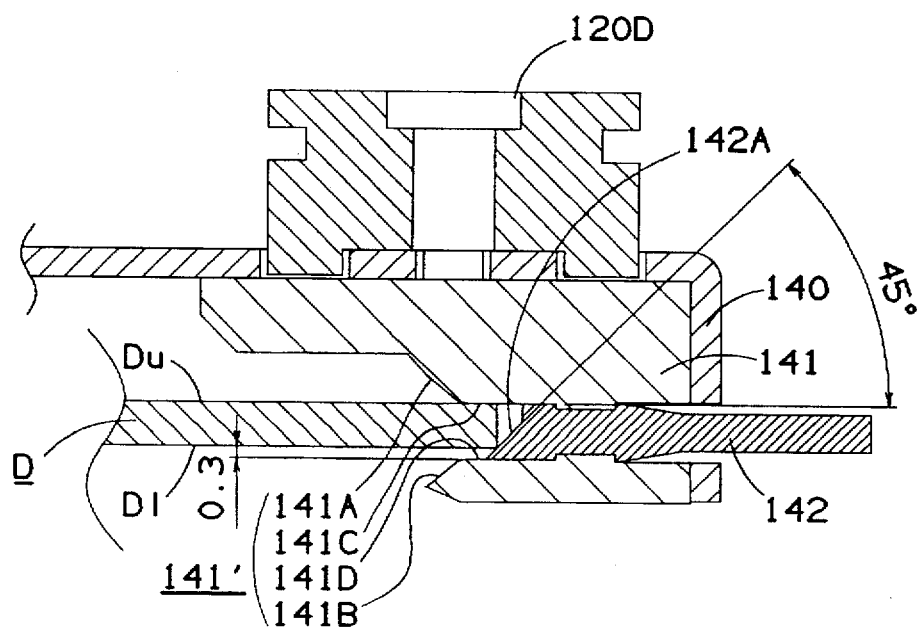
FIG. 6 is a schematic cross-section at a zone A1 of fixed-side disk guide 1003.
Figure 7:
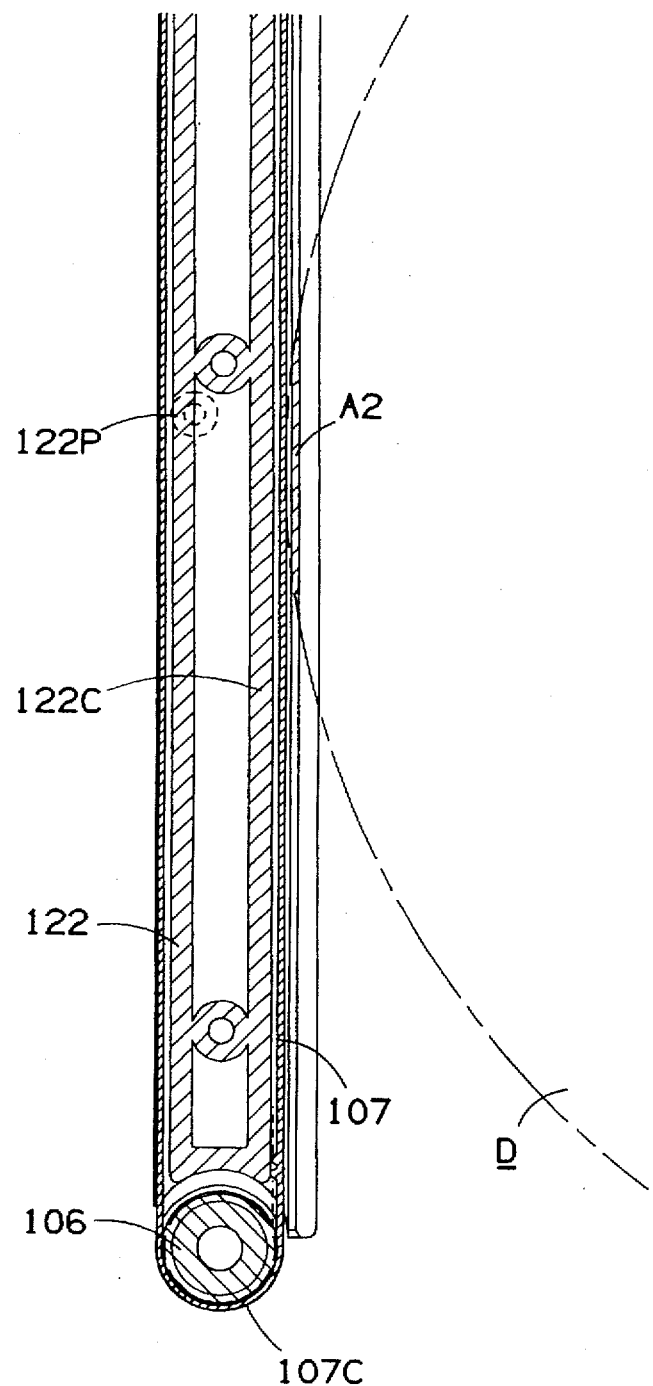
FIG. 7 is a schematic plan cross-section view of drive-side disk guide 1002.
Figure 10:
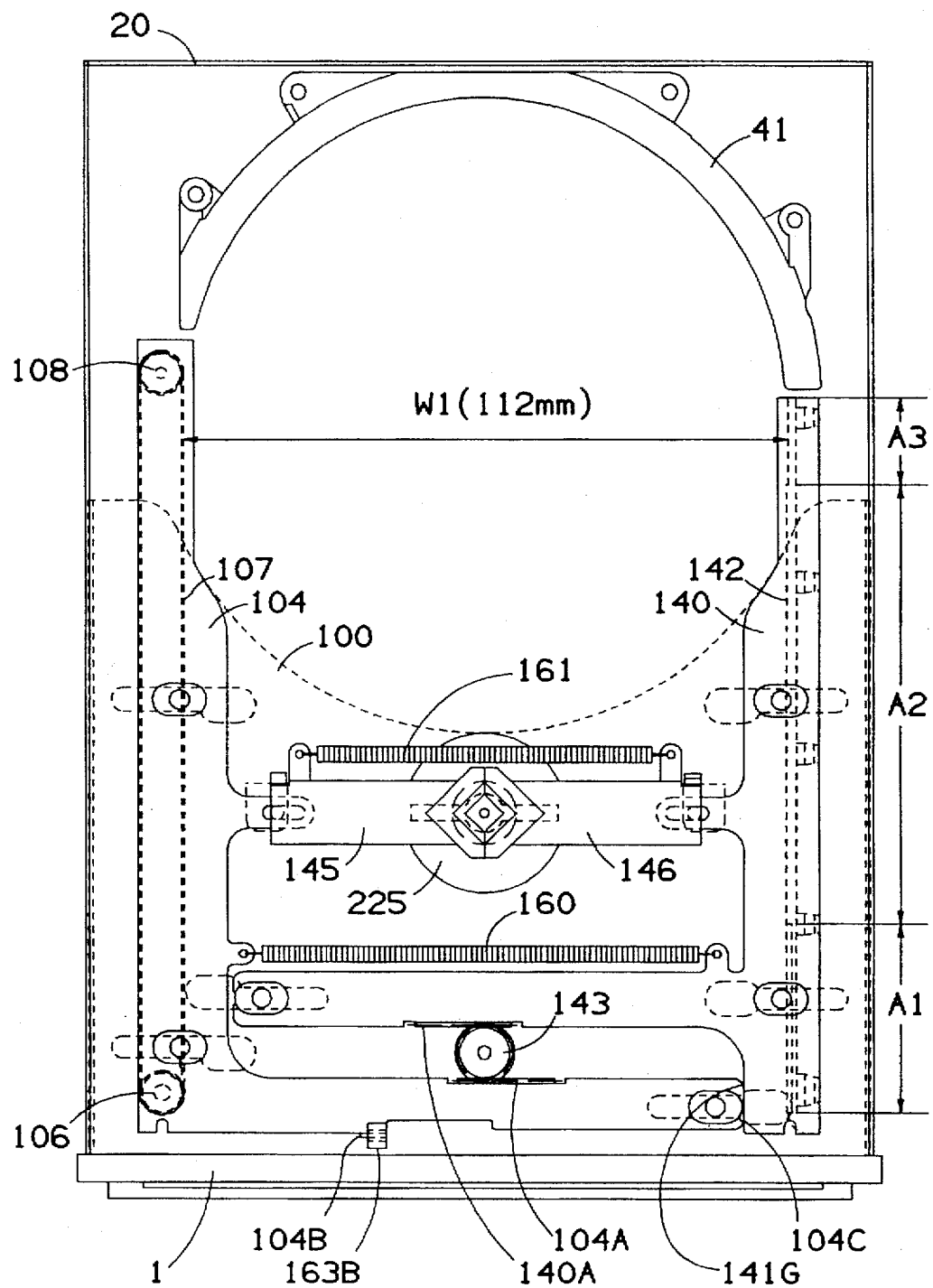
FIG. 10 is a plan-view of the changer/player 1000 showing disk transfer mechanism 1001 in a disk-receiving position POS. 1.

Referring to FIGS. 6 and 10, the shape of the surface of friction belt 142 that engages the disk edge varies with position along its length. Three zones are defined: A1, A2, and A3. Shown in FIG. 6, in initial zone A1 (35.2 mm in length), the engaging surface of friction belt 142 has a sloped surface 142A inclined at a 45 degree angle relative to the disk surface which partially engages disk D lower surface D1. The inclination helps to resist the moment generated by shutter 147 which presses against the back side of disk D when it is in zone A1. Sloped surface 142A defines a blind end of guide grove/channel 141'. Thus, the upper surface Du of disk D is urged toward guiding surface 141C as drive-side disk guide 1002 and fixed-side disk guide 1003 are urged together, squeezing disk D between them at Disk D's edge. By keeping a portion of the upper surface Du of disk D in engagement with guiding surface 141C, disk D is held horizontal and therefore resists pitching motion (rotation about the pitch axis in the horizontal plane and perpendicular to the direction of transport of disk D). In the present embodiment, when disk D is in zone A1, a shutter 147 (described in detail below) applies pressure to the rear surface of disk D generating a moment about the pitch axis. Guiding surface 141C helps to keep disk D in a horizontal plane when disk D is in zone A1. If sloped surface 142A were sloped to press the disk against the opposite guiding surface 141D, the disk would ride up sloped surface 142A, as disk D rolled, causing it to pitch.

Figure 79:
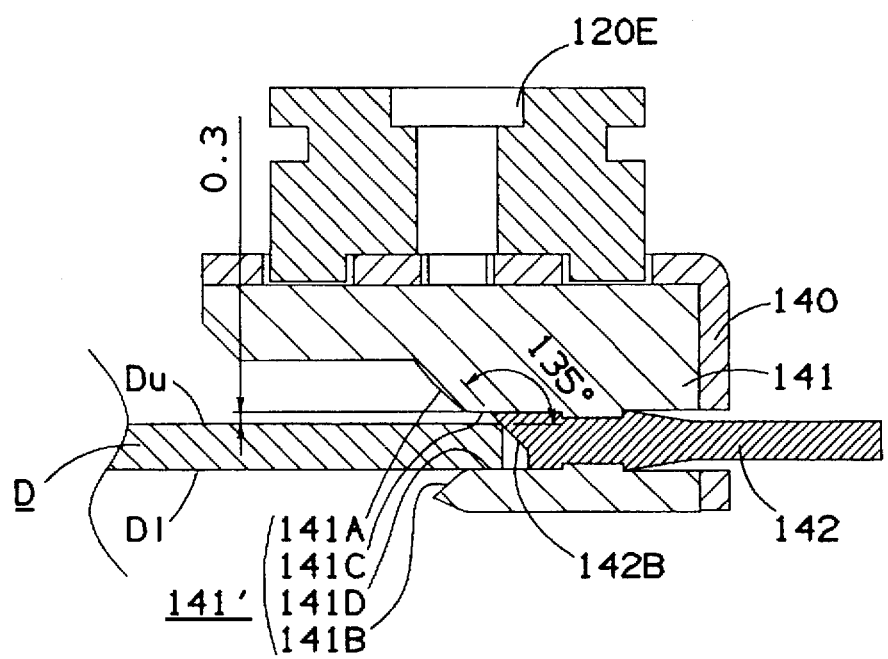
FIG. 79 is a schematic cross-section view of fixed-side disk guide 1003 cut across a portion in zone A2.

After disk D moves beyond zone A1 during transfer toward the rear of disk changer/player 1000, disk D arrives in transfer zone A2, which is 82.3 mm long. A playback position P3 is in zone A2. Disk D is not pressed by a shutter in zone A2 as in zone A1. The reference surface of guide groove/channel 141' is guiding surface 141D. When an optical mechanism 1006 is lifted to a position UP-1, guiding surface 141D insures the alignment of disk D with the mounting surface of a turntable 222. Zone A2 extends up to the point where disk D just begins to enter one of the slots 41A–D of stocker body 41. Referring momentarily to FIG. 79, in zone A2, the surface of friction belt 142 engaging disk D has a sloped surface 142B inclined at a 135 degree angle relative to upper surface Du of disk D so that lower surface D1 of disk D is urged toward guiding surface 141D. The surface contact between lower surface D1 of the disk and guiding surface 141D stabilizes disk D just as described with respect to zone A1.

Figure 80:
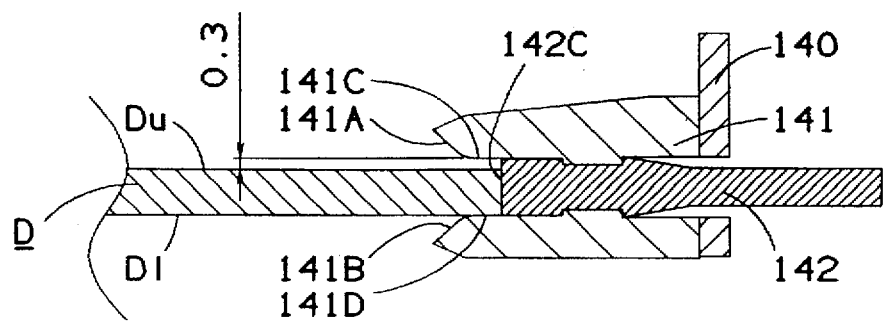
FIG. 80 is a schematic perpendicular cross-section view of fixed-side disk guide 1003 cut across a portion in zone A3.

In transfer zone A3 (16.5 mm long), disk D is guided by an aligned one of slots 41A–D of stocker body 41. Referring momentarily to FIG. 80, the engaging surface of friction belt 142, vertical surface 142C, supports the right side of disk D's edge. The 0.3 mm tolerance of guide groove/channel 141' allows pitching and some vertical displacement of disk D. With the freedom so to move, disk D can self-align with the selected stocker slot (one of slots 41A–D) without getting caught, even if the alignment of the stocker slot is imperfect. Thus, disk D inserts smoothly into stocker body 41.

Before a disk is inserted, as shown in FIG. 10, loading plates 104 and 140 are pulled together by spring 160, causing drive-side disk guide 1002 and fixed-side disk guide 1003 to remain converged. A right end 104C of loading plate 104 engages with an "L"-shaped stop 141G of disk guide 141 (see FIGS. 3 and 4) halting loading plates 104 and 140 at disk receiving position POS.1. In the present embodiment, when drive-side disk guide 1002 and fixed-side disk guide 1003 are in position POS.1, belts 107 and 142 are separated by a distance W1 of 112 mm, which is smaller than the disk diameter (120 mm).

Figure 8:
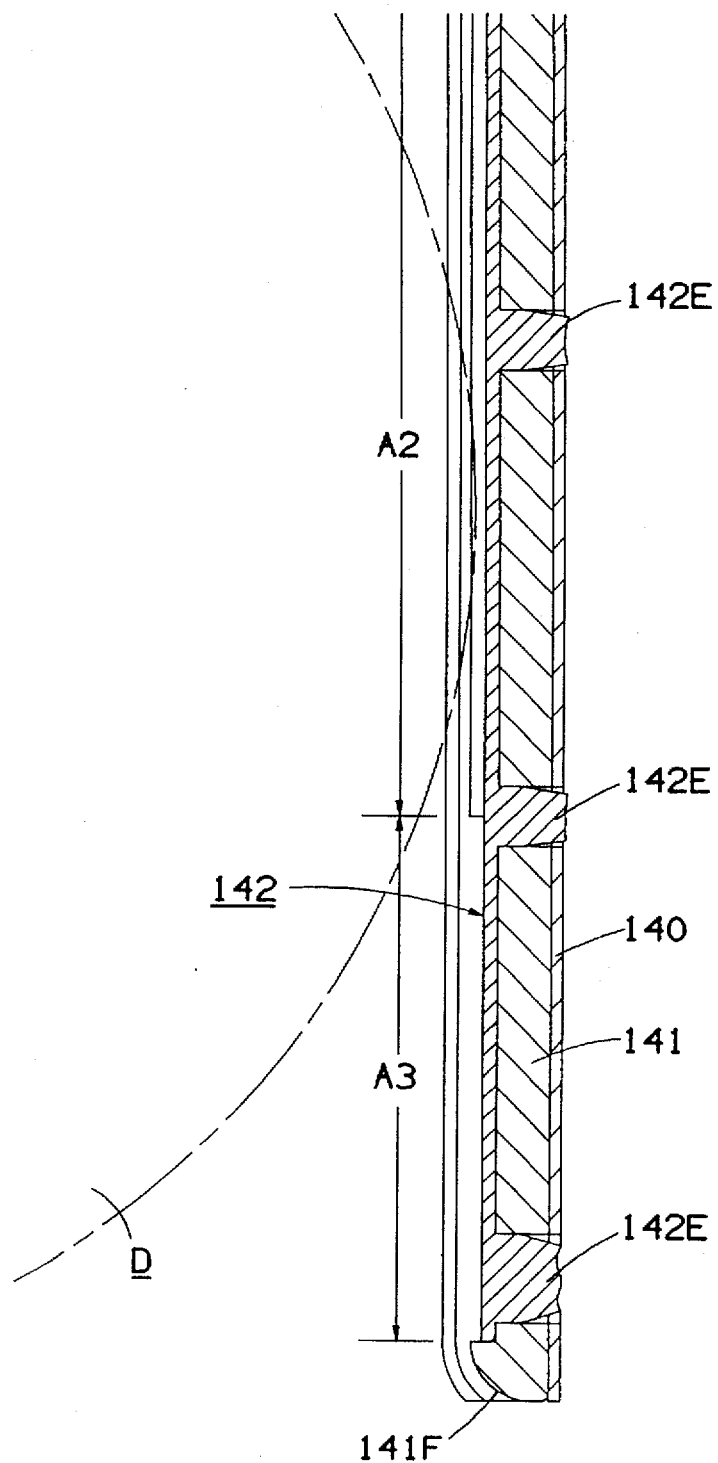
FIG. 8 is a schematic plan cross-section view of fixed-side disk guide 1003.
Figure 11:
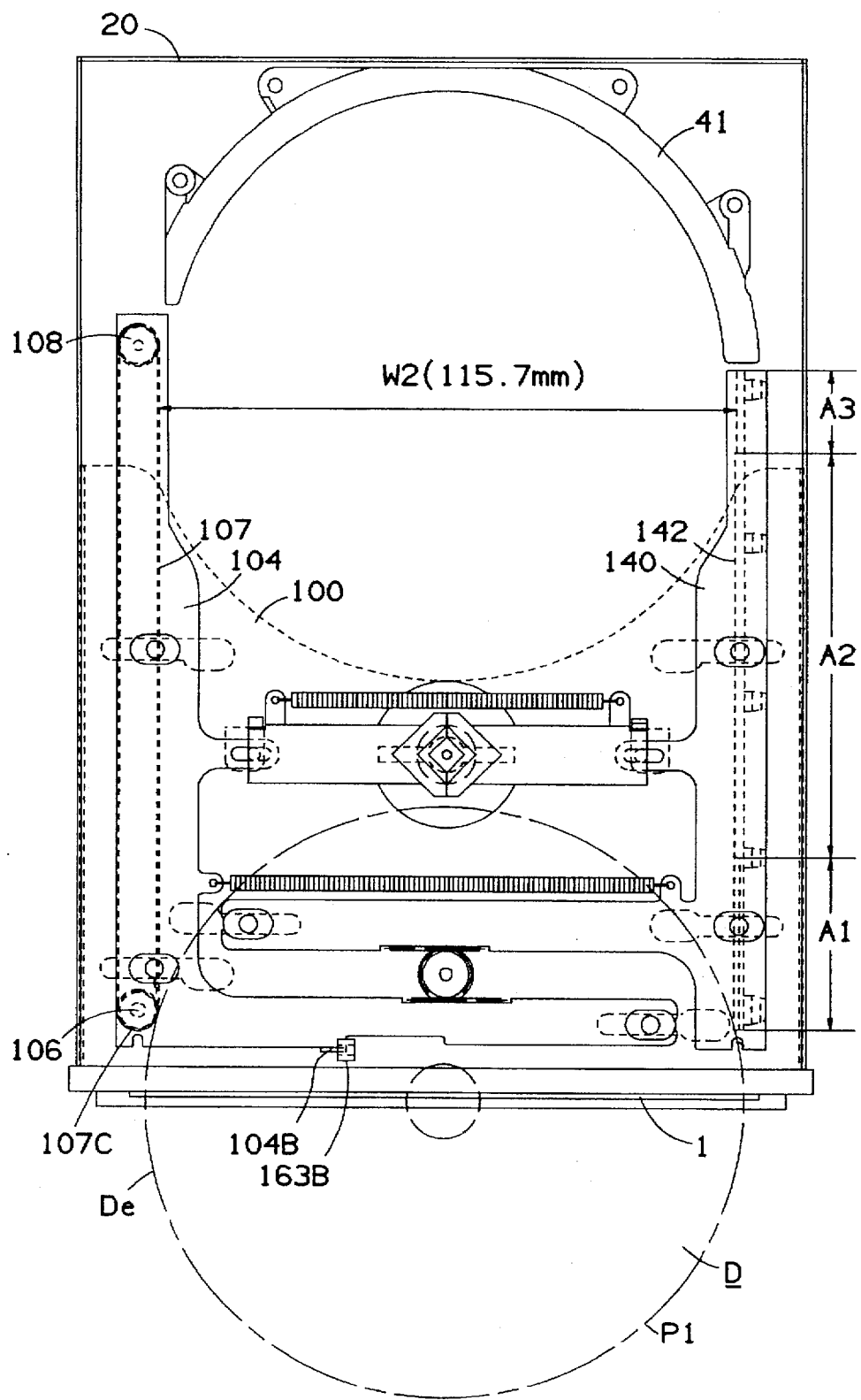
FIG. 11 is a plan-view of changer/player 1000 showing a disk in a loading start position P1.

Referring to FIGS. 8, 10, and 11, initially, just as a disk is initially inserted into disk insertion aperture 1A, outer edge De of the disk engages with a wrapped portion 107C of timing belt 107 and disk guide 141F. Since disk guide 141F is of low-friction resin, disk edge De glides smoothly into place between drive-side disk guide 1002 and fixed-side disk guide 1003 as the loading plates 104 and 140 move smoothly apart. Once disk D is inserted between drive-side disk guide 1002 and fixed-side disk guide 1003, loading plates 104 and 140 are separated as shown in FIG. 11. In the position of FIG. 11, the separation between the disk-engaging surfaces of drive-side disk guide 1002 and fixed-side disk guide 1003 reaches 115.7 mm causing an output from optical sensor 163B (loading-in signal IN) to change to "L", initiating a disk loading operation.

To draw disk D inside disk changer/player 1000, disk transfer mechanism 1001 moves timing belt 107 counterclockwise. However, unless disk D is inserted a sufficient distance, disk edge De will slip and disk D will not be drawn in. This requires the user to push the disk in. In general, the user will insert disk D into changer/player 1000 by supporting disk spindle hole Ds and disk edge De with the forefinger and the thumb of the right hand. The right hand, holding disk D naturally, tends to turn clockwise as the forefinger releases disk D and the thumb follows the left side edge De of disk De into the disk player, pushing gently with the thumb. Once disk transfer mechanism 1001 begins active transport, the sensation felt by a right handed user is quite natural as the disk is pulled away from the thumb, because the disk D rotates in a clockwise direction as it is transported in. For this reason, in the preferred embodiment, drive-side disk guide 1002 is located to the left-side of disk changer player 1000, and fixed-side disk guide 1003 is located to the right.

After the user pushes disk D in far enough, the left and right portions of edge De are fully supported between timing belt 107 and friction belt 142. Thereafter, disk D is fully supported and engaged in disk transfer mechanism 1001 and will move under the control of disk transfer mechanism 1001. As described above, in zone A1, disk D's edge De is engaged between guiding surface 141C and sloped surface 142A. Sloped surface 142A slopes in at 45 degrees so that it holds disk D against guiding surface 141C.

Note that the effect of sloped surfaces 142A and 142B is to cause disk D to move toward one of guiding surfaces 141C and 141D. Since disk D is rolling along the respective sloped surface, disk D moves toward the respective guiding surface by riding or creeping along sloped surfaces 142A or 142B. It is not necessary that disk D slip toward the guiding surface. Therefore, even though sloped surfaces 141A and 141B are high friction surfaces, disk D is still reliably moved toward the guiding surface.

When the disk enters zone A2, disk D's edge De is engaged between guiding surface 141D and sloped surface 142B. The disk is brought to a playback position P3, where a portion of the disk overlaps with the stored disks held in the stocker. When the disk enters zone A3, the right edge of disk D is less restricted since the engaging surface of friction belt 142 is a vertical surface 142C as shown in FIG. 80. In zone A3, the disk is transferred into an aligned one of stocker slots 41A–41D, which corresponds to stock position P4 of disk transfer mechanism 1001.

Figure 14:
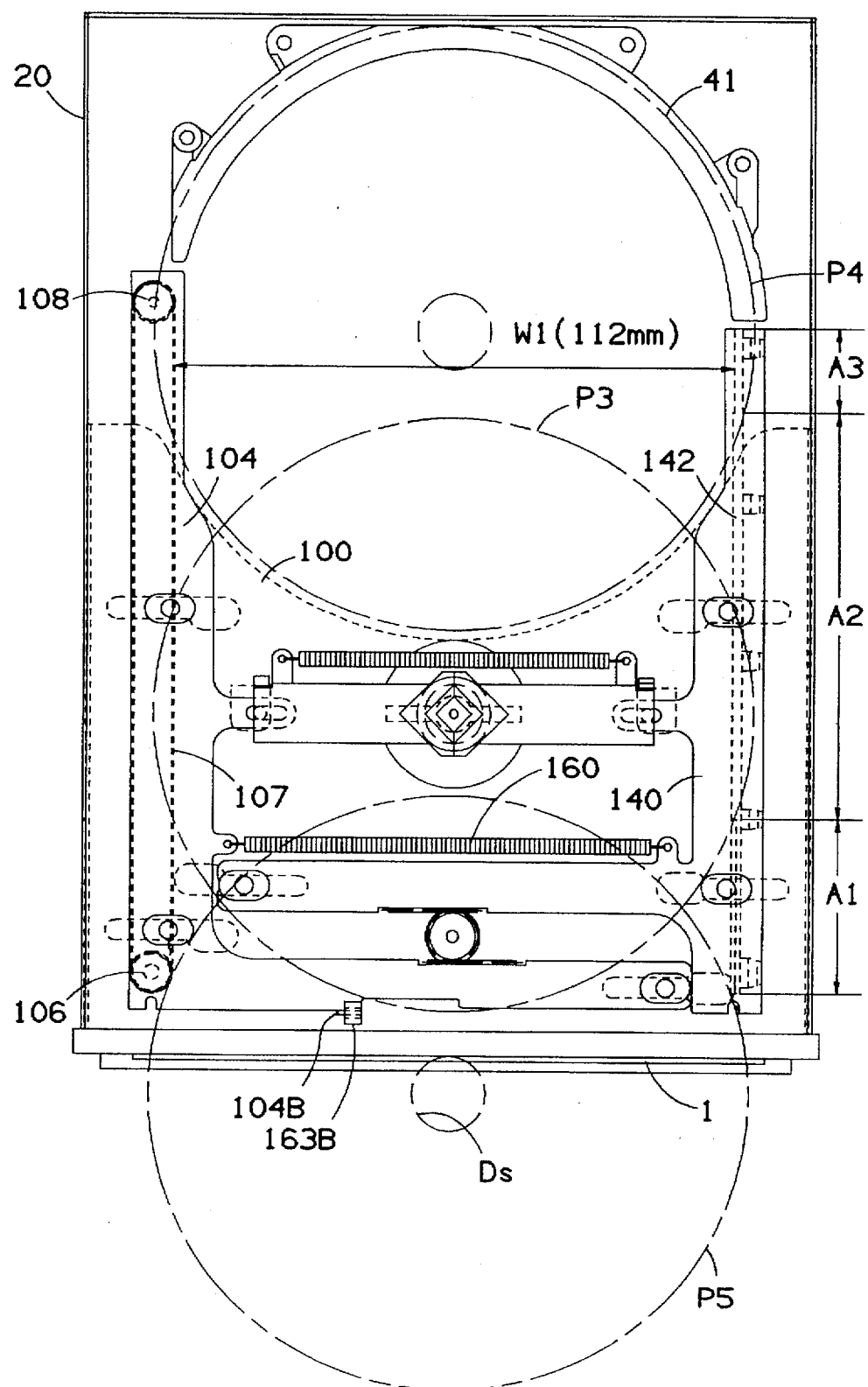
FIG. 14 is a plan-view of changer/player 1000 showing eject position P5.

By revolving timing belt 107 clockwise, disk transfer mechanism 1001 can transfer the disk from stock position P4, through playback position P3, to eject position P5 (see FIG. 14). At position P5, disk D is readily removed from disk changer/player 1000. According to the present embodiment, eject position P5 is located such that disk spindle hole Ds lies beyond disk insertion aperture 1A so that it is accessible to the user for purposes of grasping disk D. Once disk D reaches disk transfer position P5, loading plates 104 and 140 converge until distance W1, between belts 14 and 12, is approximately the separation distance of the disk receiving position P1 (112 mm).

Optical Mechanism

Figure 15:
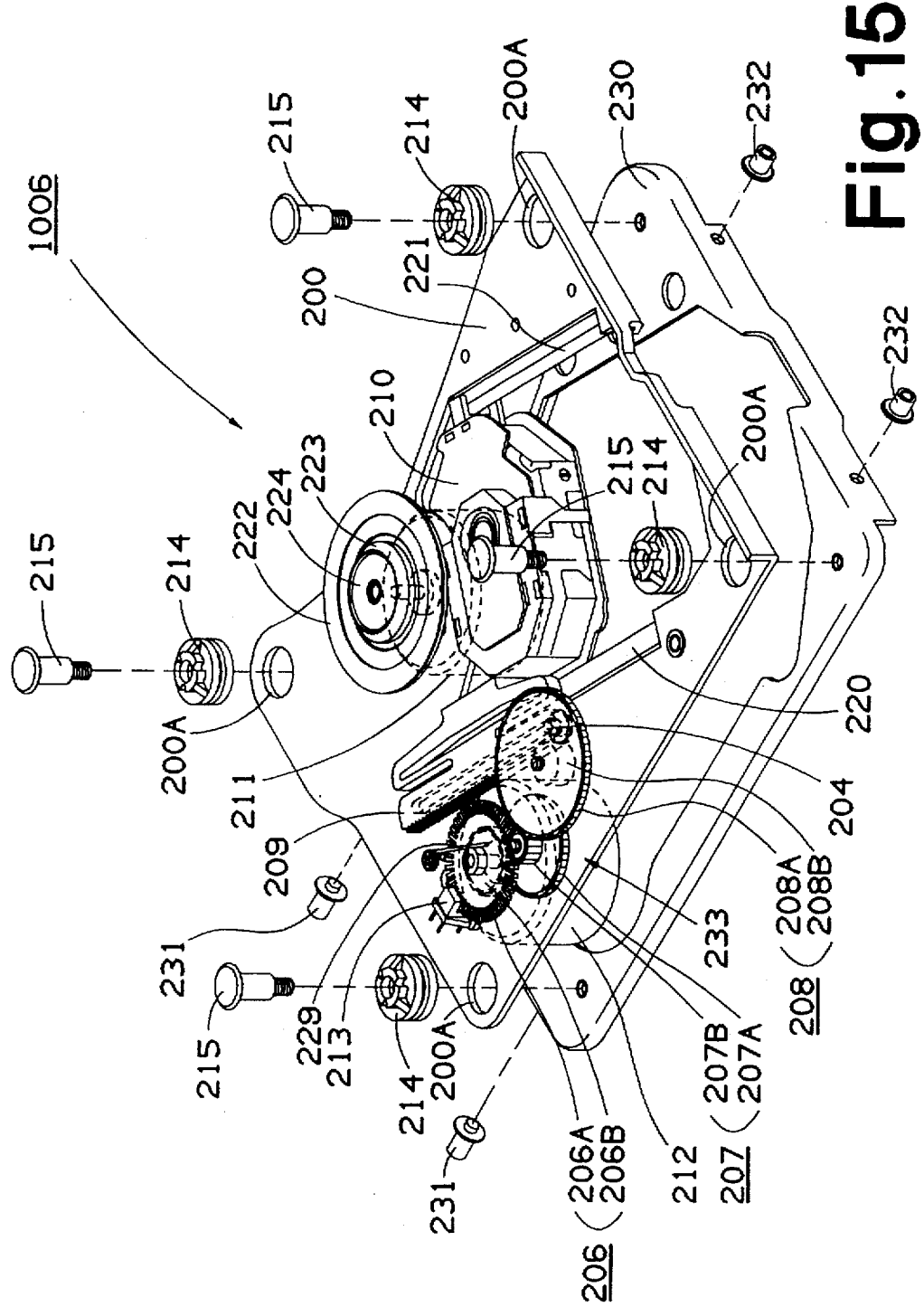
FIG. 15 is an exploded view of an optical mechanism 1006.

Referring to FIG. 15, optical mechanism 1006 has a mechanism chassis 200 with a turntable 222, an optical pickup 210, and an optical pickup translating mechanism 233. Optical mechanism 1006 rotates disk D (not shown in the drawing) mounted on turntable 222 and plays it back. Turntable 222 is affixed to a shaft of spindle motor 211 attached to a lower surface of mechanism chassis 200. Turntable 222 has a convex spindle 223, integrally formed on the upper surface of turntable 222, to align and center disk D. A magnet 224, built into spindle 223, attracts a damper 1009 to clamp disk D. Guide rods 220 and 221, on mechanism chassis 200, guide optical pickup 210 for movement along a path of translation that forms an angle of 25 degrees relative to the front end of the housing of disk changer/player 1000. A feed motor 212, attached to the bottom surface of mechanism chassis 200, drives a gear element 206 with integral shutter wheel 206A and gear 206B. Gear 206B meshes with a gear 207A of gear element 207, which has an integral gear 207B in mesh with a gear 208A of gear element 208, which has an integral gear 208B which meshes with a rack 209 to drive optical pickup 210 along a radius of disk D during playback. As shown in FIG. 15, gears 206A, 206B, 207A, 207B, 208A, and 208B are sized so that the gear train they comprise is a reduction gearing train. Shutter wheel 206A in combination with optical sensor 213 encodes displacement of gear element 206 to generate a signal indicating translation of optical pickup 210 along its path of translation.

Support for the Optical Mechanism

Figure 16:
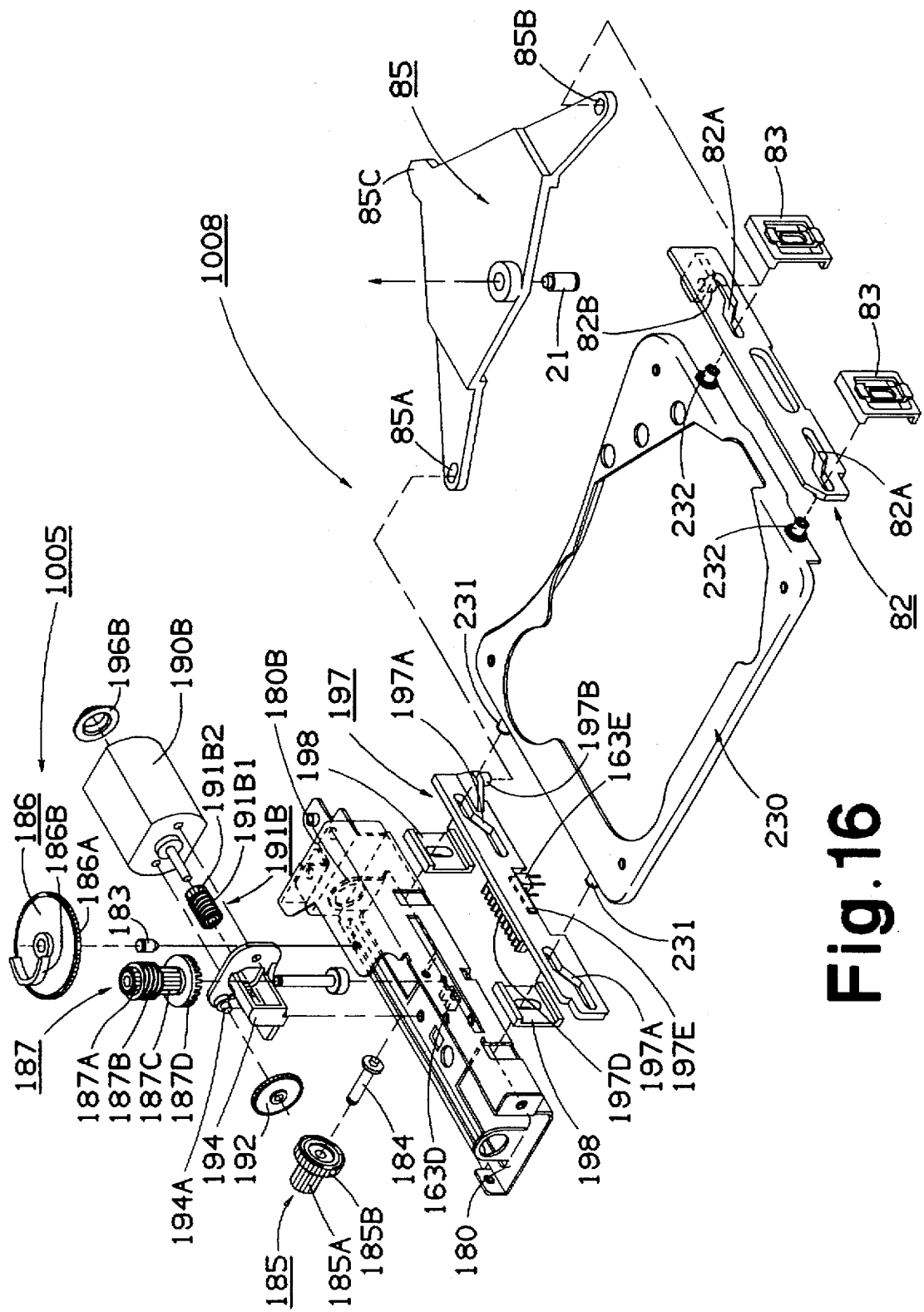
FIG. 16 is an exploded view of an optical mechanism elevator mechanism 1008 and loading plate open/close mechanism 1005.
Figure 17:
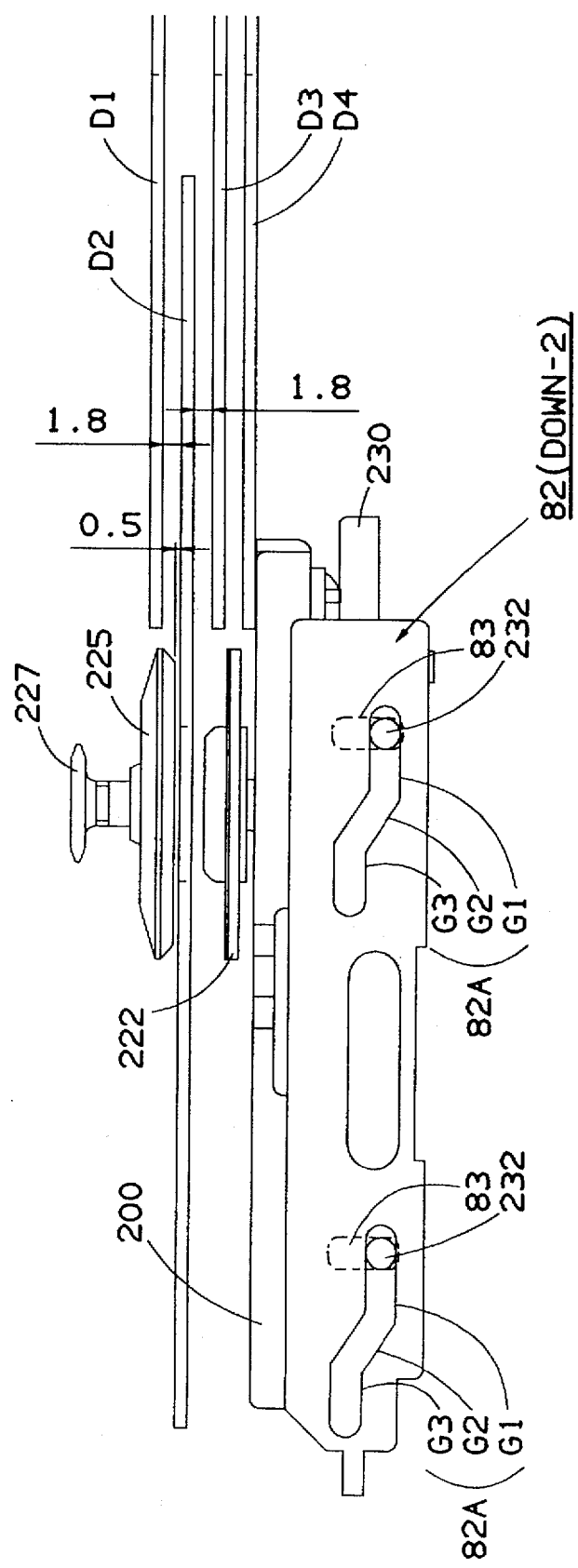
FIG. 17 is a side-view of optical mechanism 1006 and UD cam 82 in a position DOWN-2.
Figure 18:
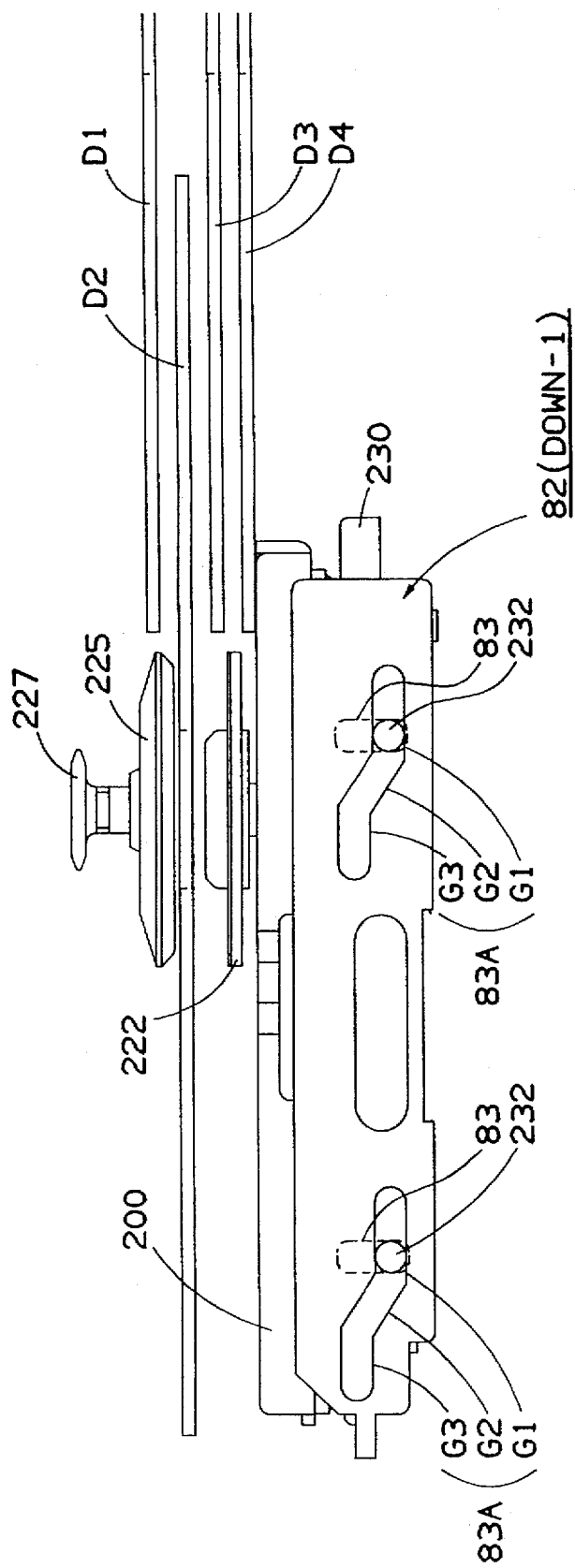
FIG. 18 is a side-view of optical mechanism 1006 and UD cam 82 in position DOWN-1.

Referring to FIGS. 15 and 16, to prevent external vibrations from being transferred to optical mechanism 1006, dampers 214 are mounted in each of four round holes 200A at the corners of mechanism chassis 200. Optical mechanism 1006 is attached to a stainless steel base 230 with dampers 214. Pins 231 and 232, projecting from the left and right sides of stainless steel base 230, insert into guide grooves of UD cams 197 and 82. An optical mechanism elevator 1008 lifts and lowers optical mechanism 1006 between an up position for disk playback and a down position below the disk. UD cams 197 and 82 move freely along axes parallel to the direction of transport of disk D (that is, toward and away from the front of disk changer/player 1000). UD cams are guided by guide plates 198 and 83. Guide plates 198 and 83 are held in place by holes in main chassis 20 and by holes in motor chassis 180. Pins 197B and 82B project downwardly from the rear ends of UD cams 197 and 82, respectively, inserting in respective holes 85A and 85B of a UD link arm 85. UD link arm 85 rotates on the lower surface of main chassis 20 on a shaft 21. Linked in this way, UD cams 197 and 82 are constrained to move in opposite directions.

Referring now also to FIGS. 17–20, guide grooves 197A and 82A, in UD cams 197 and 82, lift and lower pins 231 and 232 of stainless steel base 230 so as to keep stainless steel base 230 horizontal at all times. Pins 231 and 232 are prevented from moving horizontally by slots in guide plates 83 and 198. Note that grooves 82A and 197A slope in opposite directions. Thus, as UD cams 197 and 82 move oppositely and in concert, pins 231 and 232 to ride up and down in grooves 82A and 197A raising and lowering stainless steel base 230.

UD cams 82 and 197 are driven through a rack 197D on UD cam 197. Motive force for driving UD cams 82 and 197 is generated by a motor 190B mounted on motor chassis 180 by a rubber grommet 196B, which fits into a cutout 180B in a standing bracket of motor chassis 180. Motor 190B rotates a worm gear element 191B which meshes with a gear 187C of gear element 187 driving an integral worm gear 187B. Worm gear 187B in turn drives a gear 185A of gear element 185 (rotating on shaft 184) which in turn drives an integral gear 185B, which meshes with rack 197D.

During disk transfer, optical mechanism 1006 remains in a lowered ("down") position out of the way of disk D. Between a position of UD cams 82 and 197 identified as DOWN-2 (shown in FIG. 17) and a position DOWN-1 (shown in FIG. 18) pins 232 slide over a flat portion GI of UD cam 82, and optical mechanism 1006 remains at a lowered position below disk D in the playback position (see FIG. 47). During a transition from a position of UD cams 82 and 197 identified as position DOWN-1 (shown in FIG. 18) to a position UP-1, shown in FIG. 19, pins 232 slide over a sloped portion G2 of UD cam 82 lifting optical mechanism 1006. During a transition from a position of UD cams 82 and 197 identified as position UP-1 shown in FIG. 19 to a position UP-2 (shown in FIG. 20) pins 232 slide over a flat portion G3 of UD cam 82 holding optical mechanism 1006 in a raised position. The raised position is used for disk playback. In the present embodiment, optical mechanism 1006 is lifted until the mounting surface of turntable 222 coincides with the lower surface of disk D. Thus, unlike tray-type disk playback devices, turntable 222 does not lift up the disk to prepare for playback.

Figure 47:
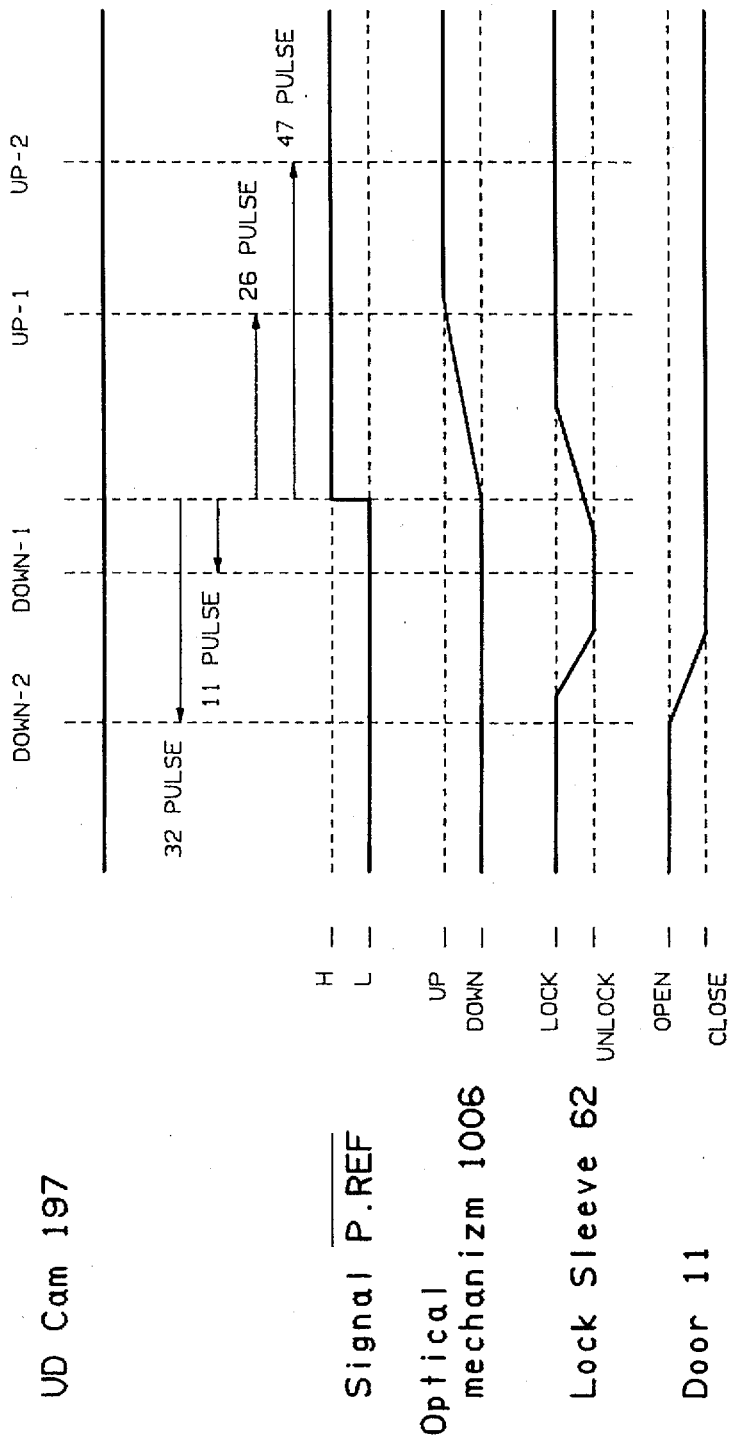
FIG. 47 is a timing chart showing the operating modes of the other mechanisms that move in tandem with the position of UD cams 197 and 82.
Figure 48:
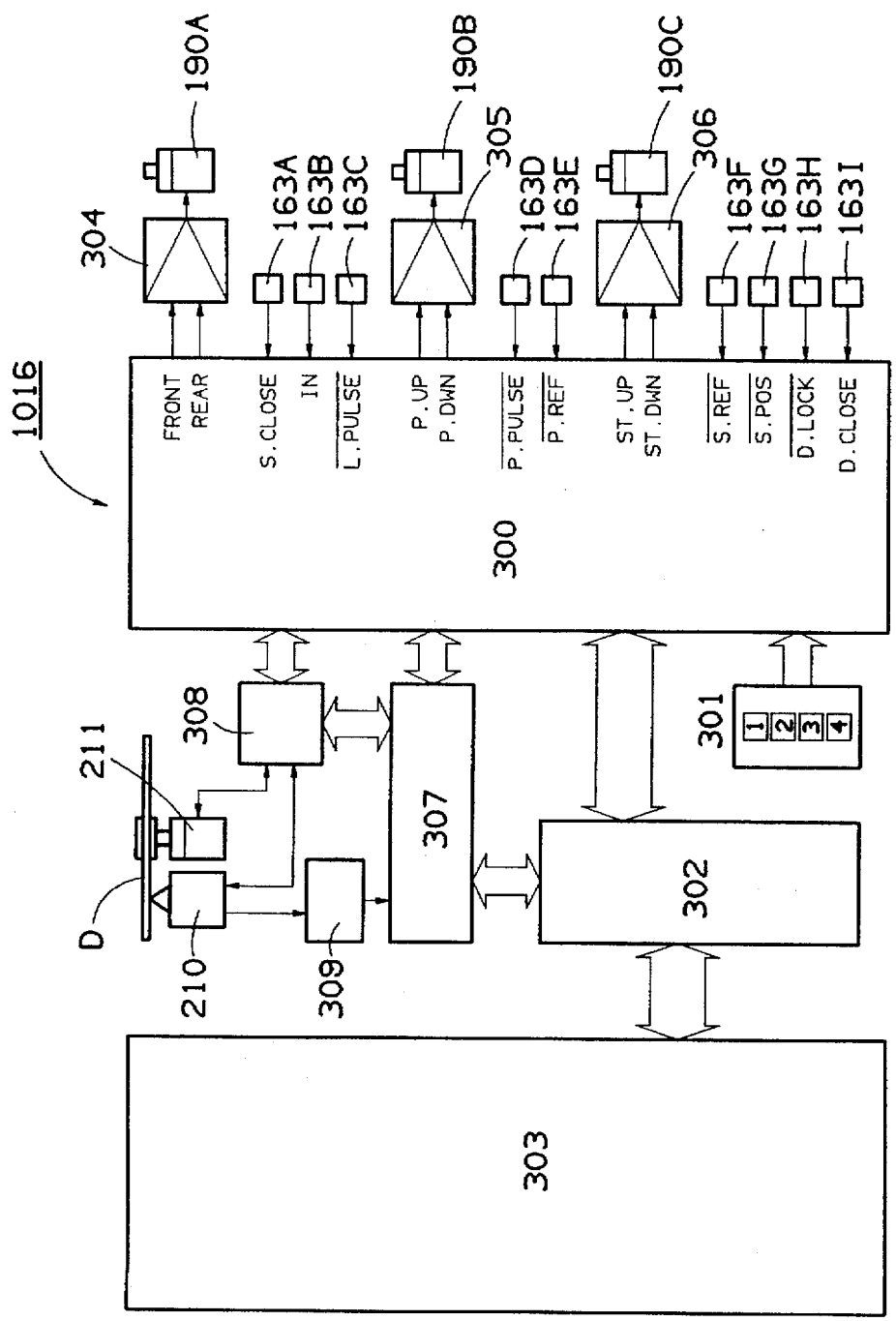
FIG. 48 is a block diagram of a control circuit 1016 of disk changer/player 1000.

A shutter wheel 187D on the lower end of gear member 187 and an optical sensor 163D are used to encode UD cam movement via a pulse signal (signal P.PULSE). One pulse indicates approximately 0.19 mm of movement of UD cam 197. To supply a reference position of UD cams 82 and 197, a shutter piece 197E on UD cam 197 is detected by an optical sensor 163E affixed to front chassis 2 (not shown in the drawing). The output from optical sensor 163E serves as a UD cam reference position signal (signal P.REF). Referring to FIG. 47, the signal goes low "L" when UD cam 197 moves down past an approximate midpoint between position DOWN-1 and position UP-2.

The positions of UD cams 82 and 197 are determined by counting the pulses beginning with the detection of signal P.REF, which is the reference. Referring momentarily to FIG. 47, position DOWN-1 is detected by counting 11 pulses of signal P.PULSE after signal P.REF changes to "L" while moving UD cam 197 in a direction that lowers stainless steel base 230. Position DOWN-2 is detected by counting 32 pulses of signal P.PULSE after signal P.REF changes to "L" while moving UD cam 197 in a direction that lowers stainless steel base 230. Position UP-1 and UP-2 are detected by moving UD cam 197 to raise stainless steel base 230 and counting 26 pulses and 47 pulses, respectively, of signal P.PULSE after signal P.REF changes to "H".

If changer/player 1000 malfunctions, is disconnected from the main computer unit, or loses power, the disk clamp can be released by rotating a gear 191B2 on the lower end of a worm gear 191B via an emergency gear 192 in mesh therewith. Emergency gear 192, which rotates on a shaft 194A on motor bracket 194, protrudes through an opening 20B in the side of main chassis 20 exposing emergency gear 192 outside the housing. When there is a malfunction, the user can release the disk clamp by manually rotating emergency gear 192. Subsequently, emergency gear 193, exposed through opening 20A, can be manually rotated (see FIG. 9), and the unclamped disk removed through disk insertion aperture 1A.

Loading Plate Open/Close Mechanism

Referring to FIGS. 3, 16, and 21–25 a loading plate open/close mechanism 1005, which causes loading plates 104 and 140 to converge and diverge, is also driven by drive motor 190B. An integral gear 187A on gear element 187 engages with a gear 186A formed on the perimeter of a loading plate cam 186. Loading plate cam 186 rotates on a shaft 183 projecting upwardly from an upper surface of motor chassis 180. A cam 186B is formed on the upper surface of loading plate cam 186. Cam 186B engages a pin 122P that projects from the lower surface of lower disk guide 122 (visible in FIG. 3).

Figure 21:
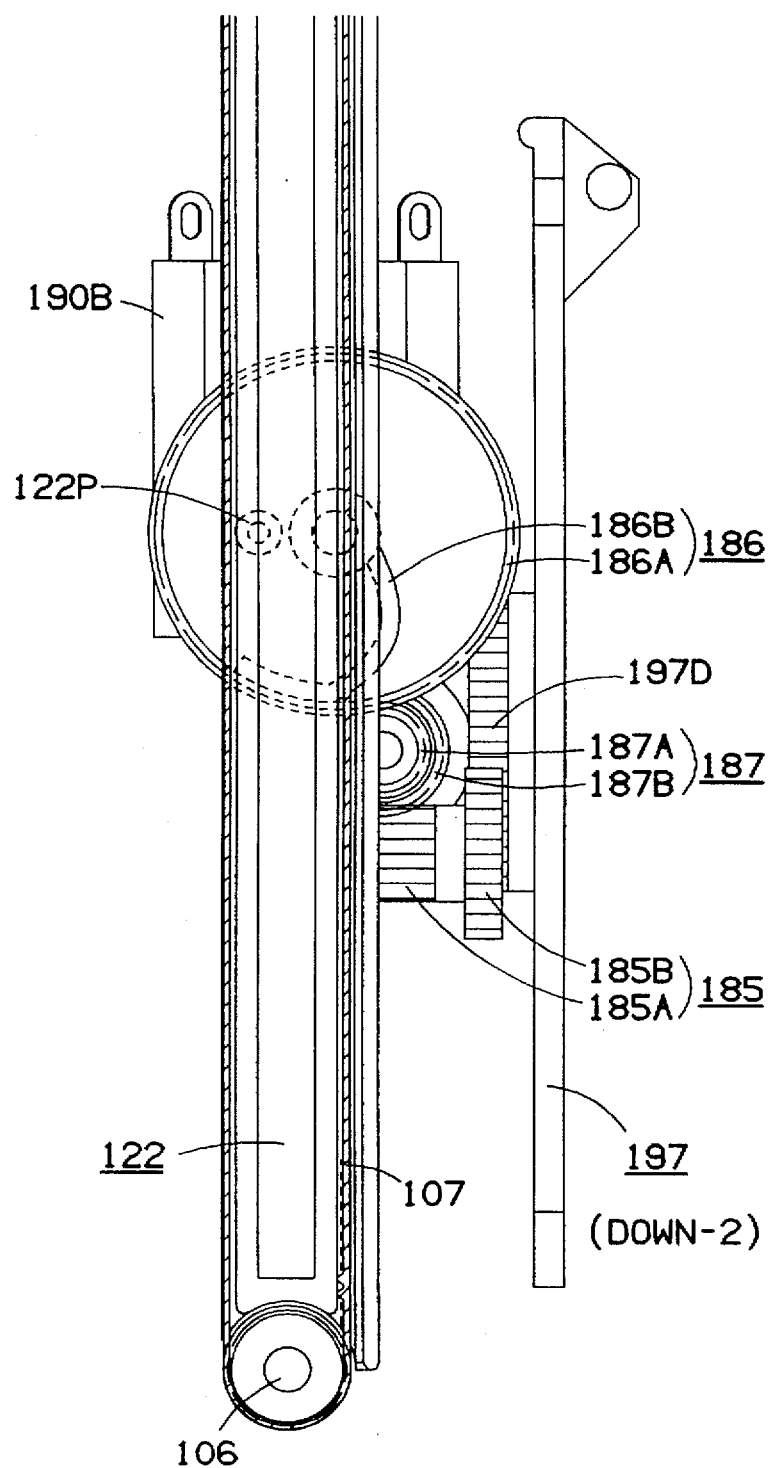
FIG. 21 is a plan-view of loading plate cam 186 and UD cam 82 in position DOWN-2.
Figure 22:
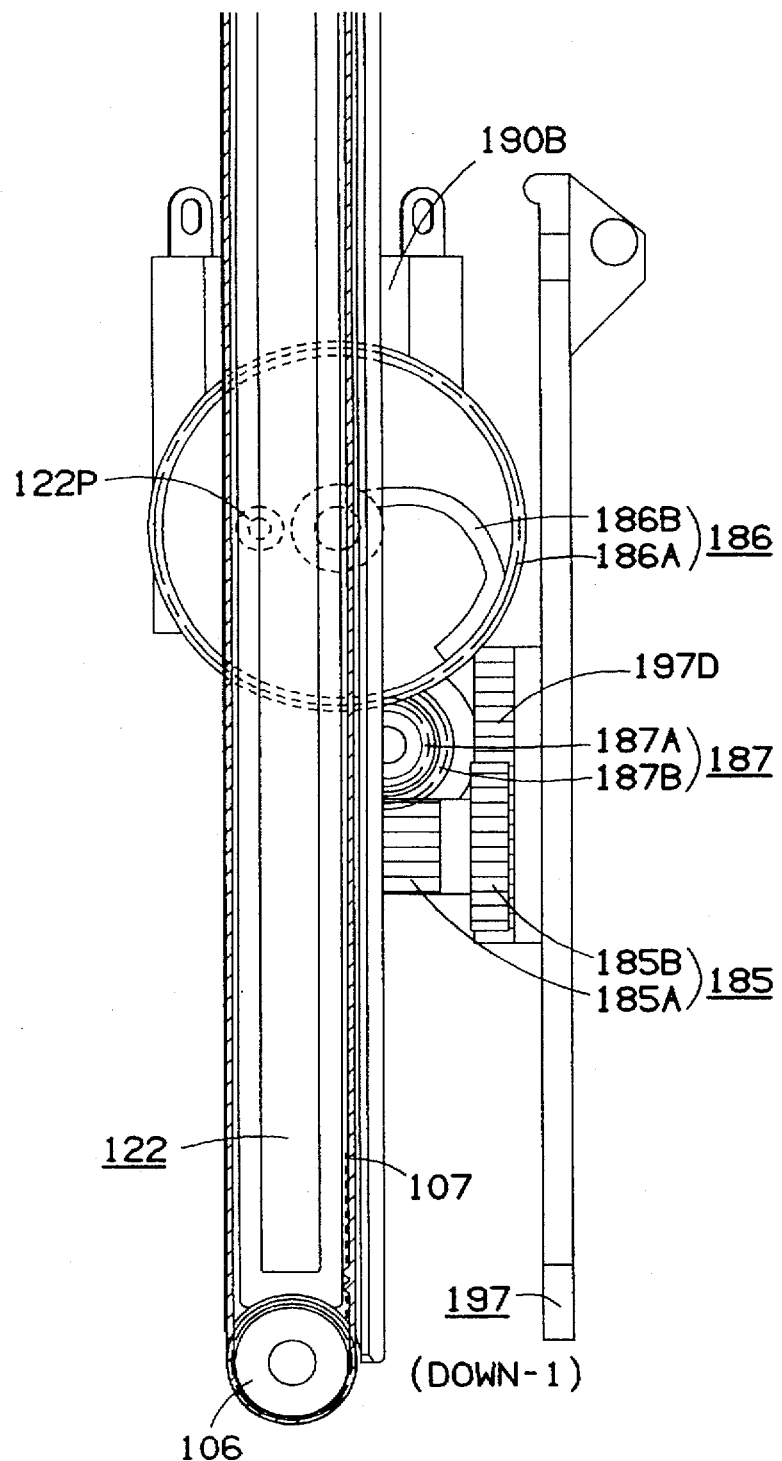
FIG. 22 is a plan-view of loading plate cam 186 and UD cam 82 in position DOWN-1.

As UD cams 82 and 197 are brought to position DOWN-2, loading plate cam 186 is rotated to the angle shown in FIG. 21. In this position, the outer perimeter of cam 186B is disengaged from pin 122P of lower disk guide 122. Spring 160 moves loading plates 104 and 140 together until the right end 104C of loading plate 104 engages with "L"-shaped stop 141G (see FIG. 10), which is position POS. 1. When motor 190B drives UD cams 82 and 197 to position DOWN-1, loading plate cam 186 rotates counter-clockwise to the angle shown in FIG. 22 in which cam 186B remains disengaged from pin 122P.

Figure 23:
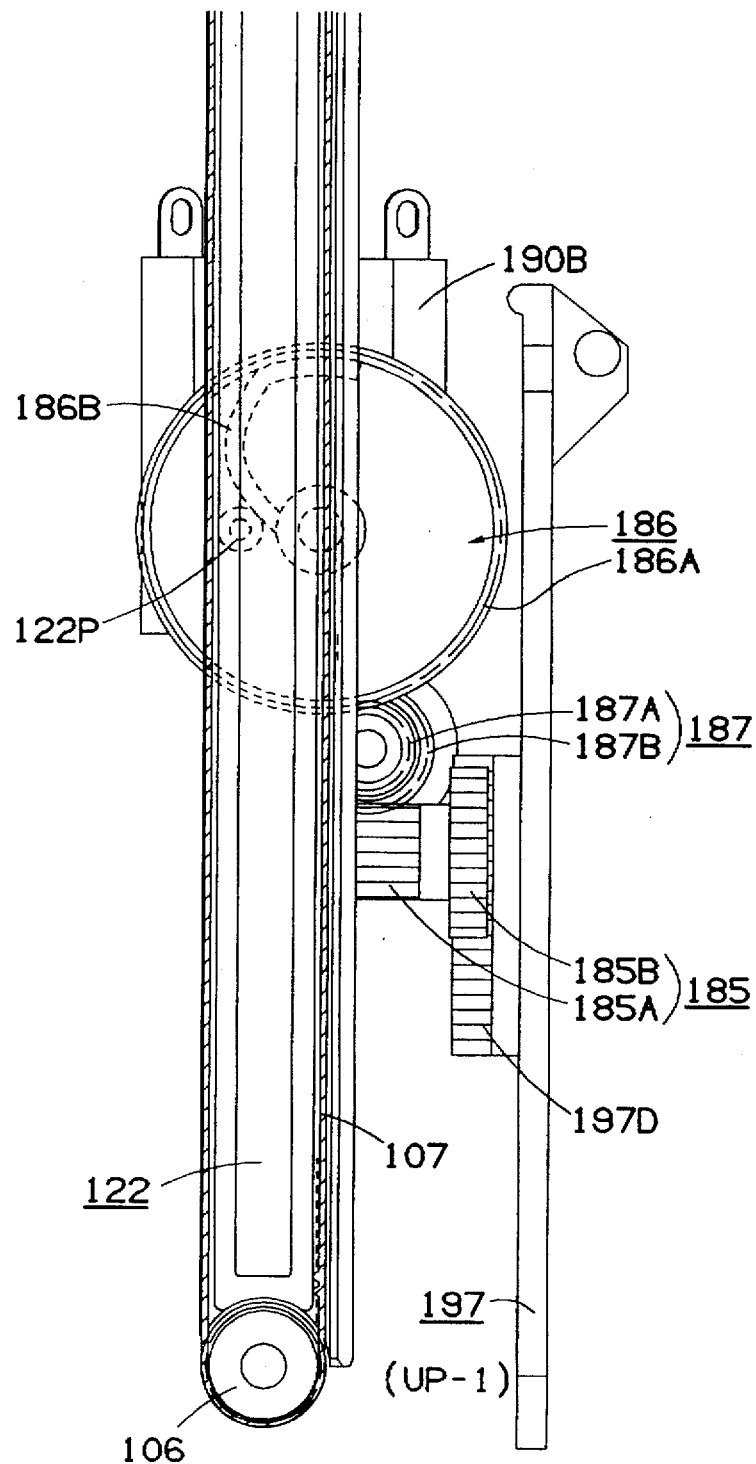
FIG. 23 is a plan-view of loading plate cam 186 and UD cam 82 in position UP-1 when no disk is present.
Figure 24:
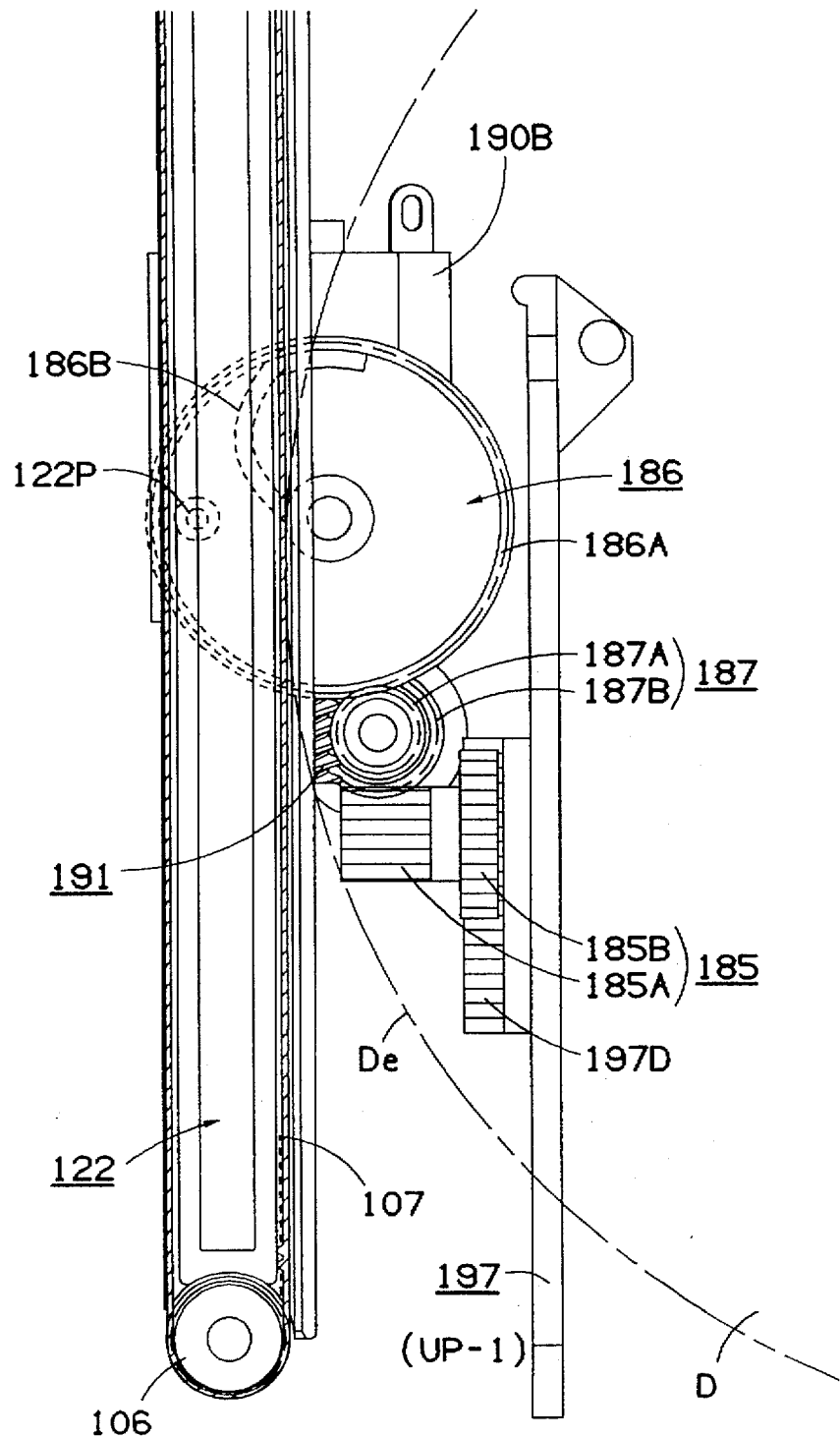
FIG. 24 is a plan-view of loading plate cam 186 and UD cam 82 in position UP-1 when a disk is present.
Figure 25:
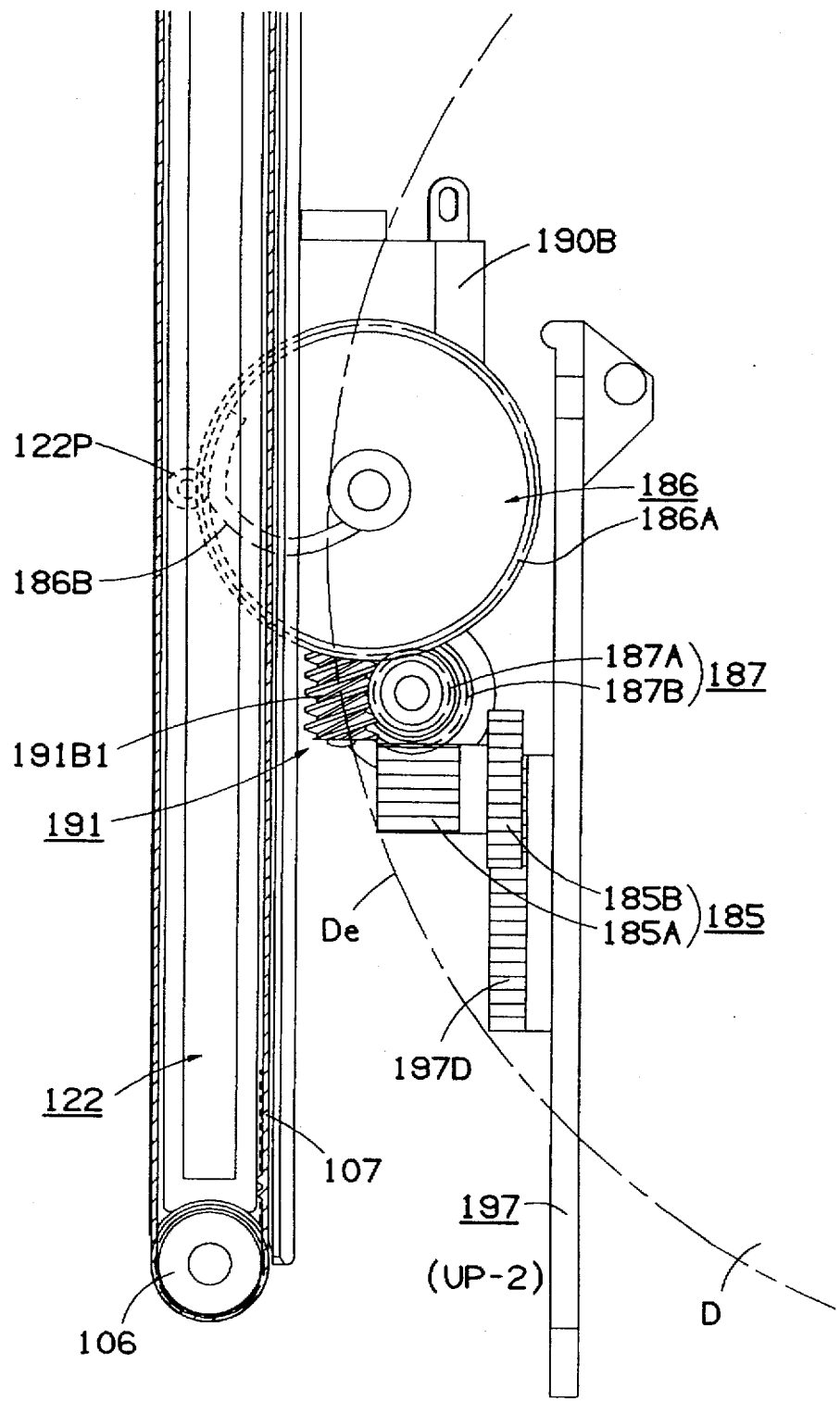
FIG. 25 is a plan-view of loading plate cam 186 and UD cam 82 in position UP-2.

When UD cams 82 and 197 move to position UP-1, loading plate cam 186 rotates counter-clockwise to the angle shown in FIG. 23. At this point, the outer perimeter of cam 186B engages pin 122P of lower disk guide 122. At this point, loading plates 104 and 140, at disk receiving position POS.1, are opened slightly, opposing the force of spring 160. When loading plates 104 and 140 are forced apart in response to the insertion of a disk, thereby placing them in disk-supporting position POS.2 (see FIG. 12), pin 122P is moved away from the outer perimeter of cam 186B as shown in FIG. 24. When UD cams 82 and 197 are moved to position UP-2, loading plate cam 186 rotates counter-clockwise to the angle indicated in FIG. 25. The outer perimeter of cam 186 presses pin 122P toward the outside of changer/player 1000 causing loading plates 104 and 140 to diverge to open position POS.3. Belts 107 and 142 disengage and move away from disk D to clear disk D's outer edge De (see FIG. 13).

Clamper

Figure 2:
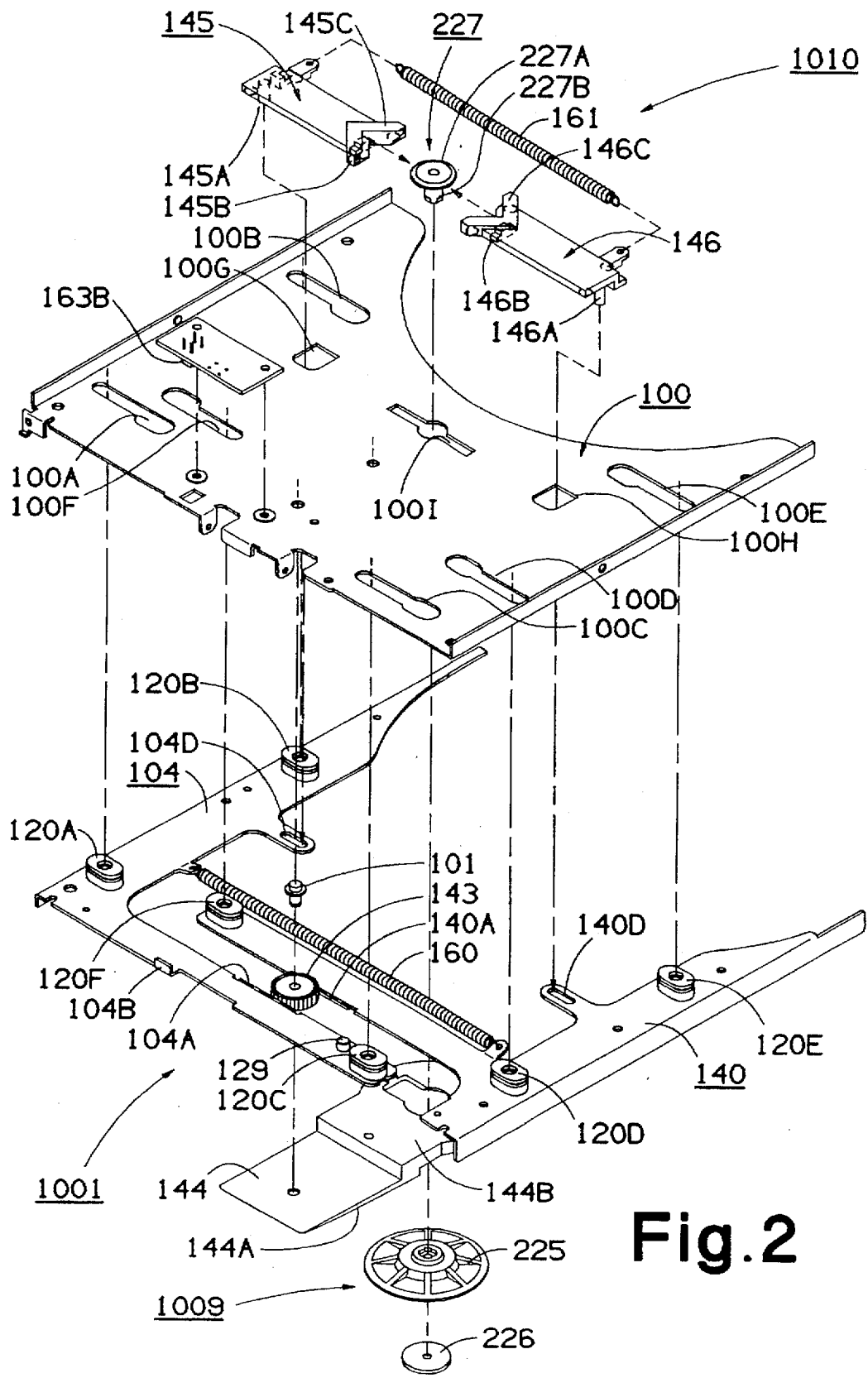
FIG. 2 is an exploded view of damper support and disk-supporting mechanisms that are carried on a loading chassis 100.
Figure 3:
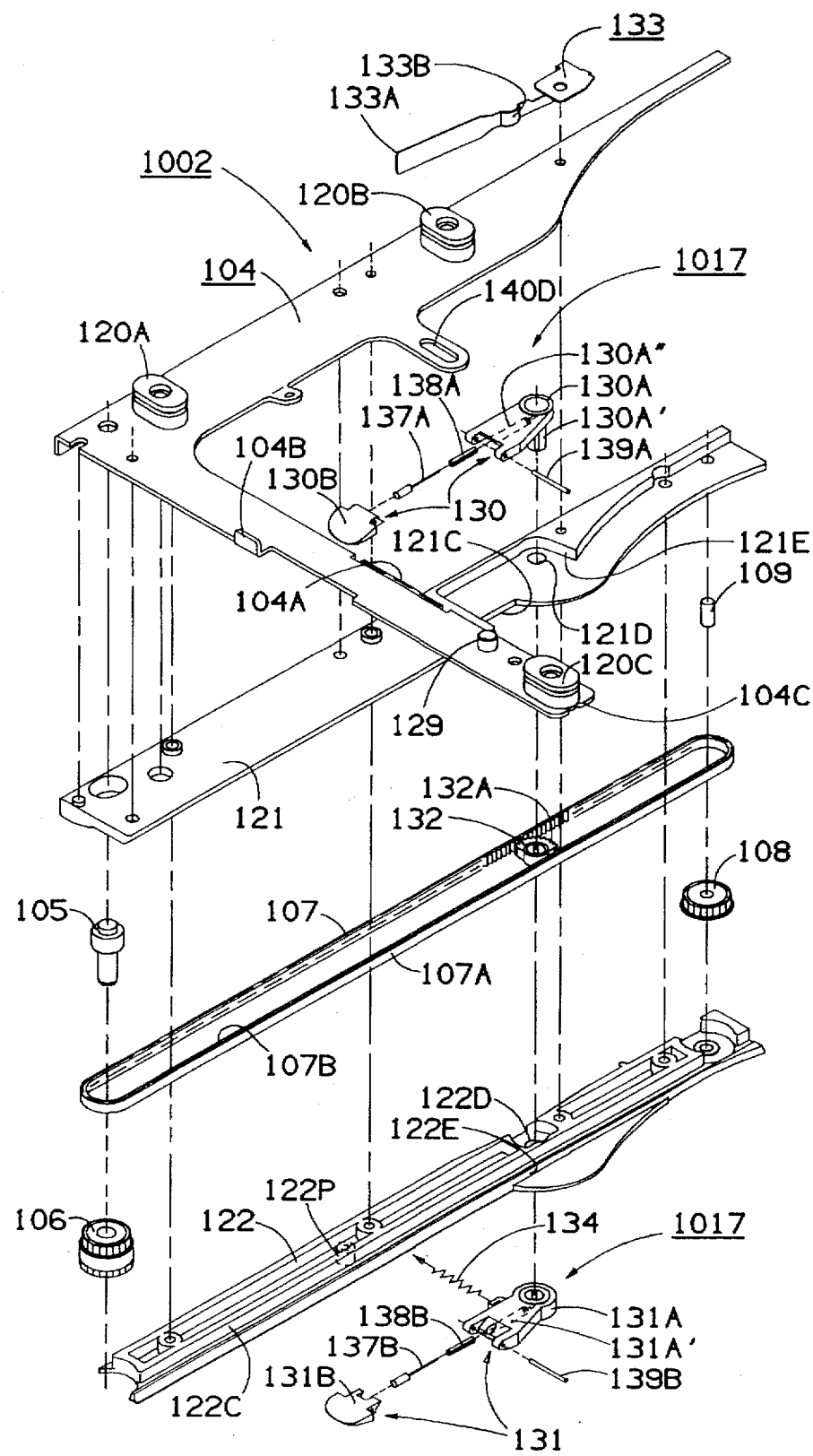
FIG. 3 is an exploded view of a drive-side disk guide 1002 and associated mechanisms.
Figure 4:
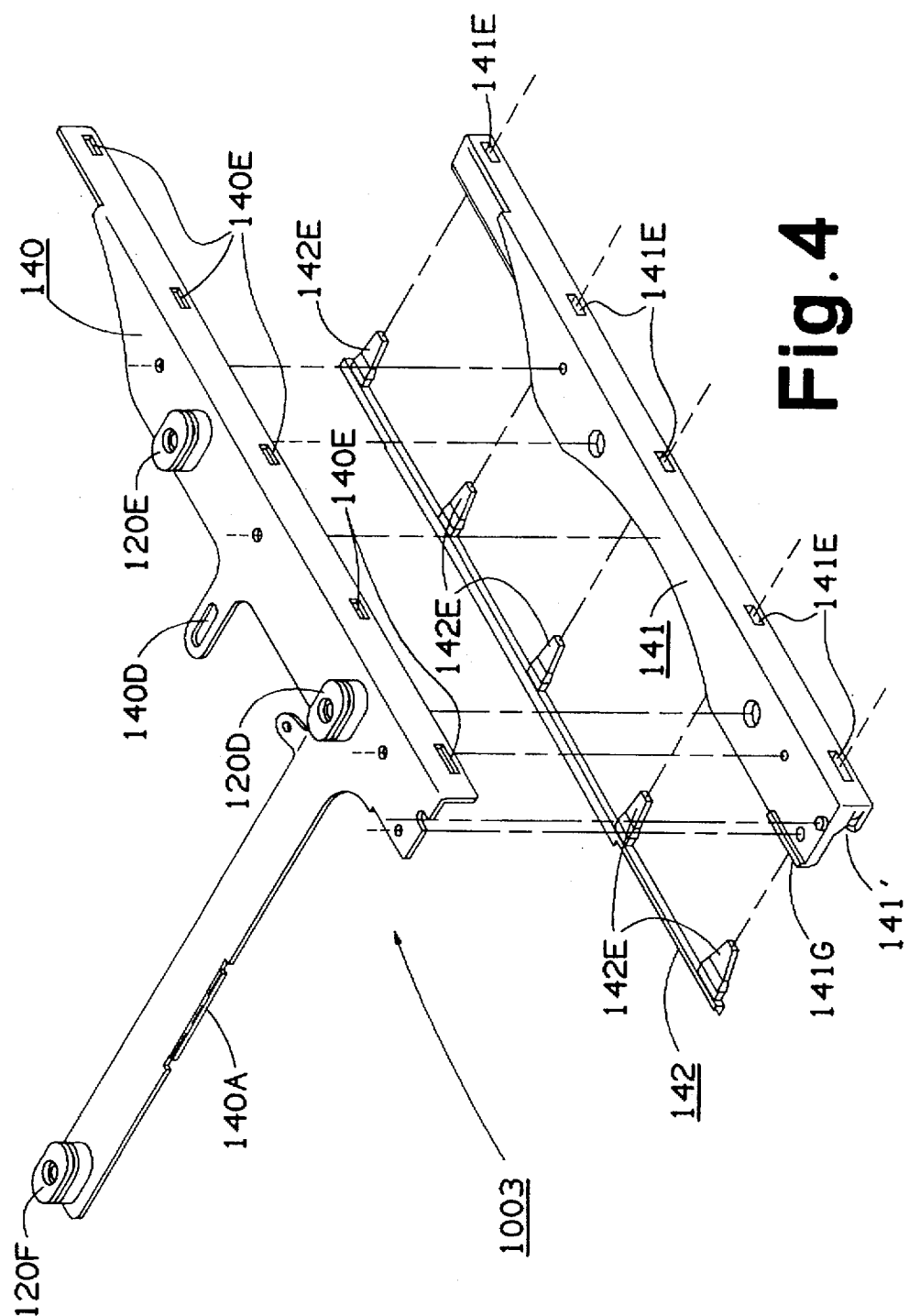
FIG. 4 is an exploded view of a fixed-side disk guide 1003.
Figure 5:
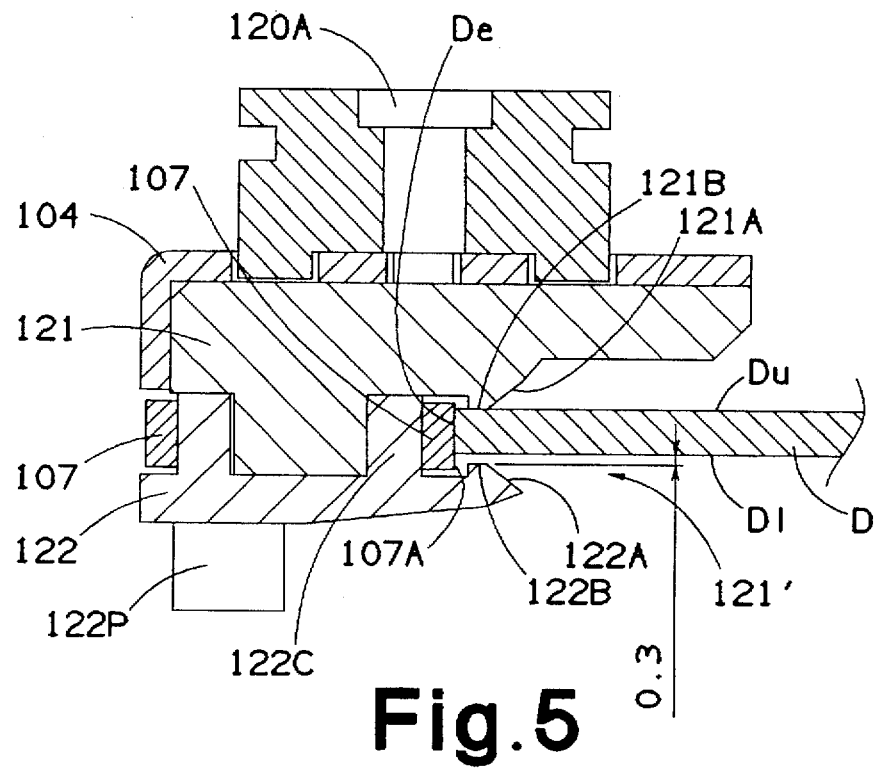
FIG. 5 is a schematic cross-section view of drive-side disk guide 1002.

Referring to FIGS. 2 and 15, a damper 1009 clamps a disk onto a turntable. Clamper 1009 has a damper base 225 and a damper top 227. A magnetic plate 111 is mounted on the lower surface of damper base 225 so that it faces magnet 224 in turntable 222. Clamper top 227 is roughly T-shaped in cross-section with a flange 227A that tapers toward the perimeter. A shaft 227B, integral with flange 227A, passes through opening 100I of loading chassis 100 to connect with damper base 225. A disk guiding roof element 144 is affixed to the lower surface of loading chassis 100. Disk guiding roof element 144 has an integral damper guide 144B that prevents excessive tilting of the damper and a forward portion 144A that prevents wobbling of the front end of the disk during inserting through disk insertion aperture 1A.

Clamper Support Mechanism

A damper support mechanism 1010, on the upper surface of loading chassis 100, supports damper 1009 at a retracted position 0.5 mm above disk D. Supports 145C and 146C, on facing ends of respective damper holders 145 and 146, support flange 227A. Pins 145A and 146A project downwardly from the lower surface of damper holders 145 and 146, respectively. Pins 145A and 146A pass through openings 100G and 100H, respectively, of loading chassis 100, inserting in respective guide grooves 104D and 140D in loading plates 104 and 140. Inverted-T-shaped guide pieces 145B and 146B project downwardly from the lower surfaces of damper holders 145 and 146, respectively. The top bars of guide pieces 145B and 146B are retained below loading chassis 100 and the stems of guide pieces 145B and 146B slide in grooves that form lateral arm extensions of opening 1001. Thus, damper holders 145 and 146 are movably attached to loading chassis 100 such that they can move laterally. In addition, damper holders 145 and 146 are urged toward each other by a spring 161. When damper holders 145 and 146 converge fully, supports 145C and 146C lift flange 227A putting damper base 225 in the retracted position.

When loading plates 104 and 140 diverge as they move from disk receiving position POS.1 (see FIG. 10) to disk supporting position POS.2 (see FIG. 12), pins 145A and 146A of damper holders 145 and 146 slide within guide grooves 104D and 140D of loading plates 104 and 140 without affecting the converged state of damper holders 145 and 146. Spring 161 keeps supports 145C of damper holders 145 and 146 converged on support flange 227A, thereby keeping damper 1009 retracted 0.5 mm above disk D in the playback position (see FIG. 17).

When loading plates 104 and 140 separate further from POS.2 to POS.3, pins 145A and 146A of damper holders 145 and 146 engage with the ends of guide grooves 104D and 140D. This causes damper holders 145 and 146 to separate in tandem with the motion of loading plates 104 and 140. When loading plates 104 and 140 arrive at the open position POS.3, damper holders 145 and 146 have completely released their support of flange 227A. A magnet 224, in a turntable 222, attracts damper 1009 causing disk D to be clamped between damper 1009 and turntable 222.

Stocker

Referring to FIGS. 26–30, a stocker 1011 is roughly crescent shaped. Disk holding slots 41A–41D are formed in stocker body 41 at a 3 mm pitch so that four disks can be accommodated by disk transfer mechanism 1001. The cross-sections of the front ends of slots 41A–41D are tapered in the direction of disk transport so disks slide smoothly into slots 41A–41D. The edges of the disks are supported by lower surfaces 41A'–41D' of the slots (See FIG. 30. Note that, to avoid crowding the drawing, surfaces 41B' through 41D' are not labeled as is 41A', however, these surfaces can be identified because they are the geometrically similar surfaces in each slot 41C–41D). Openings 41E–41H open in the blind ends of slots 41A–41D of stocker body 41. Shim members 51A and 51B, described below, have shims 510A–510D that insert in corresponding openings 41E–41H.

Shim members 51A, 51B, help to eliminate vibrations in the disks stored in slots 41A–41D. Shim members 51A, 51B, have slight differences in length but are roughly the same in shape. A screw 50 secures shim members 51A and 51B to stocker body 41 and to the upper surface of attachment portion 41'. Shim members 51A and 51B have shims 510A–510D supported on resilient supports 511A–511D, all of which extend from attachment base 512. Shim members 51A and 51B are integrally formed of resin. Resilient supports 511A–511D, which are thin, flexible, and resilient, extend as the tines of a fork. Shims 510A–510D are urged into slots 41A–41D so that they engage the upper surfaces of disks therein. Shims 510A–510D are sloped at a roughly 30 degree angle relative to disk upper surface Du to form sloped surfaces 510A'–510D' which engage the edges of disks in slots 41A–41D. Flat portions 510A"–510D", engage with lower surfaces 41A'–41D' of disk holding slots 41A–41D. Shims 510A–510D are continuously urged into the gap between the upper surfaces Du of the disks and the upper surfaces 41A"–41D" of slots 41A–41D, through openings 41E–41H in the stocker. Shims 510A–510D, pressed inwardly by resilient supports 511A–511D, generate a downward component force (i.e. perpendicular to recording surface D1 of the disk) due to the slope of the disk-engaging sloped surfaces 510A'–510D' of shims 510A–510D. The downward force helps to secure disks D in stocker body 41.

Figure 36:
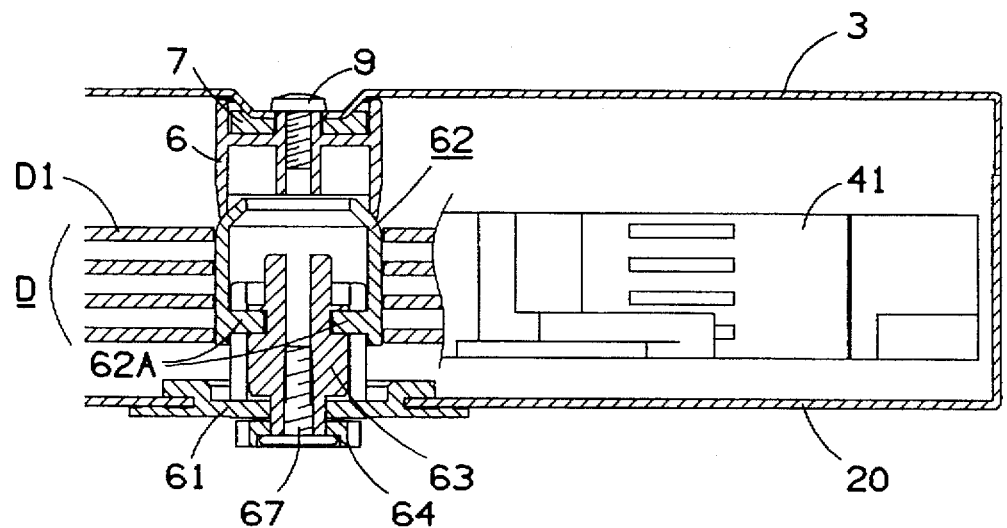
FIG. 36 is a schematic cross-section view of a lock sleeve 62 of disk lock mechanism 1013 in the lock position and the stocker in position POS(1).
Figure 37:
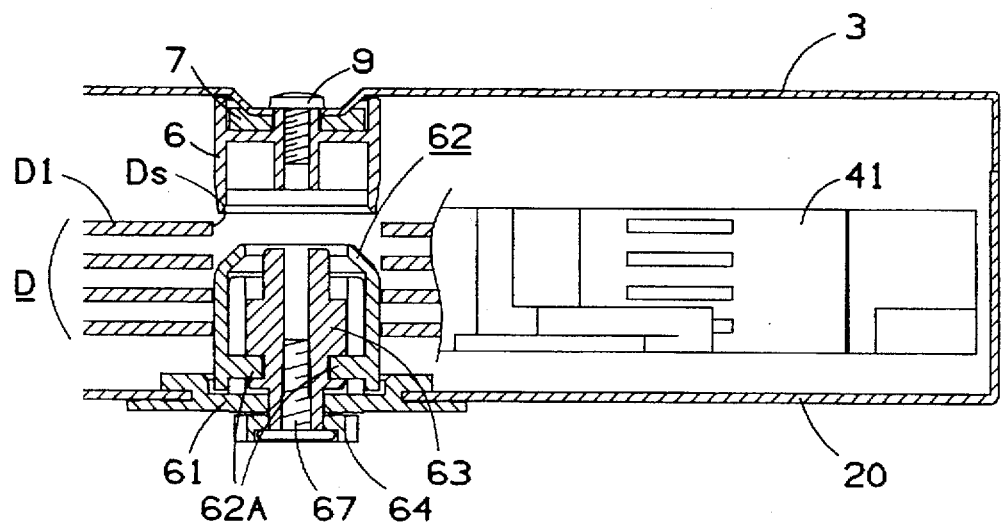
FIG. 37 is a schematic cross-section view of lock sleeve 62 in the unlock position and the stocker in position POS(1).
Figure 38:
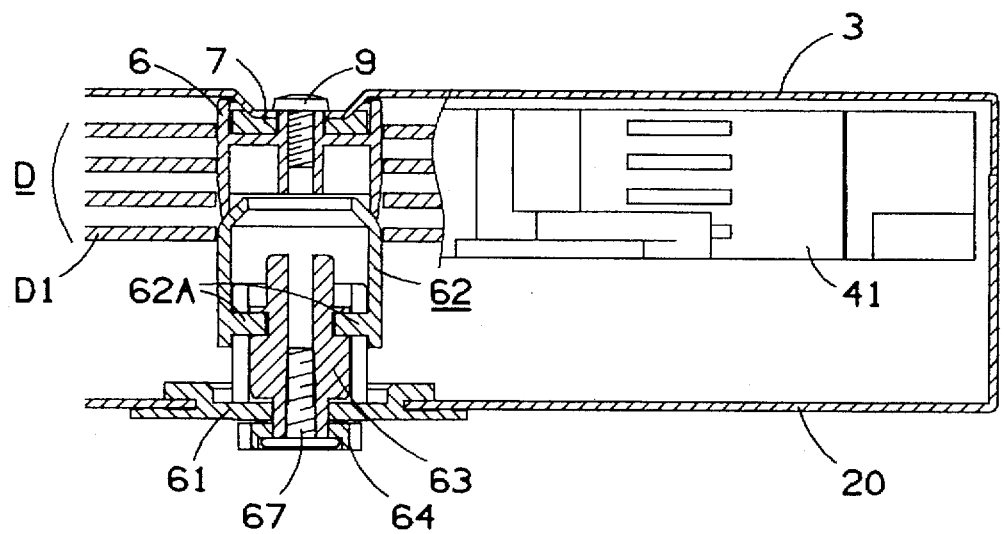
FIG. 38 is a schematic cross-section view of lock sleeve 62 in the lock position and the stocker in position POS(4).
Figure 39:
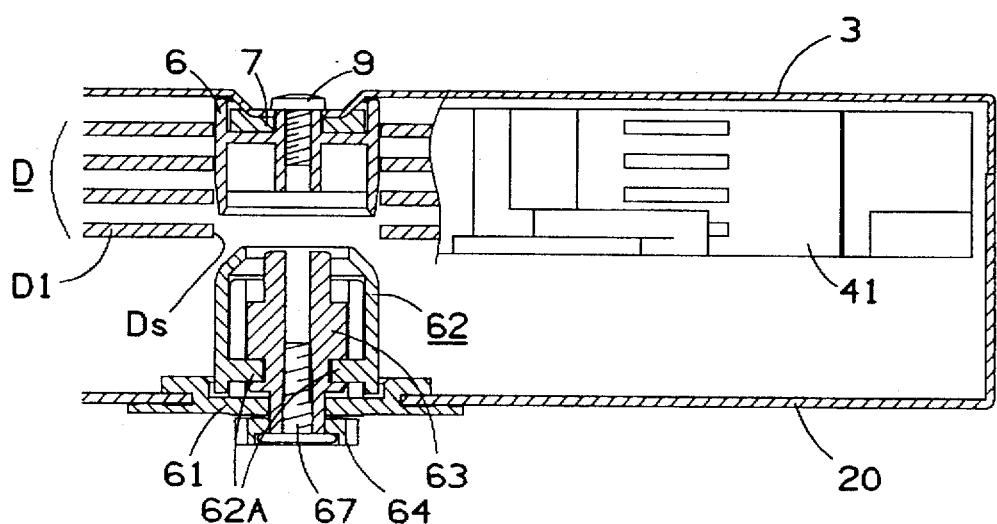
FIG. 39 is a schematic cross-section view of lock sleeve 62 in the unlock position and the stocker in position POS(4).

Although shims 510A–510D generate a component force that would, in the absence of friction, tend to force the disks out of the stocker, the shallow slope angle of 30 degrees helps to insure that this component force is sufficiently small, and the perpendicular component that generates friction, sufficiently great, to prevent this. Disks are also secured by a disk guide sleeve 6 or a disk lock sleeve 62 inserted into the spindle holes of the disks in the stocker as described below. Thus, the disks cannot slide out of the stocker (see FIGS. 36–38).

Stocker Vertical Translation Mechanism

A stocker elevator mechanism 1012, just below stocker 1011, moves stocker body 41 to height positions POS(1)–POS(4), to align slots 41A–41D with drive-side disk guide 1002 and fixed-side disk guide 1003. A drive motor 190C affixed to main chassis 20 via a motor bracket 49, has a worm gear 191C pressed-fitted on its shaft. Gear member 45, with an integral gear 45A, rotates on a shaft 27 projecting upwardly from main chassis 20. Integral gear 45A meshes worm gear 191C. Another integral gear 45B, on the lower end of gear member 45, meshes an integral gear 440A on the lower end of a lead screw 440, rotating on a shaft 260. The rotation of lead screw 440 is transferred via gears 46A, 47A, and 47B to gears 441A, 442A of lead screws 441 and 442, and lead screws 441 and 442, which are rotatably supported by shafts 262 and 263, respectively. Lead screws 441 and 442 rotate in tandem with lead screw 440. Lead screws 440, 441, and 442 engage with nuts 42A, 42B, and 43, respectively, which are mounted on a base plate 40. When lead screws 440–442 rotate, stocker 1011 is translated vertically.

A stocker position-indicating gear 48 rotates on a shaft 23 on main chassis 20. Stocker position-indicating gear 48 is used to detect vertical displacement of stocker 1011. Stocker position-indicating gear 48, which engages with gear 46B on the bottom of gear 46, rotates counter-clockwise and clockwise as stocker body 41 moves up and down. On the upper surface of stocker position-indicating gear 48, a shutter piece 48A indicates a reference position of stocker 1011. A shutter piece 48B has slits corresponding to positions POS (1)–POS (4) of stocker 1011. Optical sensors 163F and 163G, projecting from the bottom surface of main chassis 20, detect shutter pieces 48A and 48B.

The output from optical sensor 163G is a stocker reference position signal (signal $\overline{\text{S.REF}}$), which indicates the reference position of stocker 1011. This signal changes to "H" as the stocker is raised up past the approximate midpoint between disk holding position POS (1) and disk holding position POS (2) immediately above POS(1). The output from optical sensor 163F is a stocker position signal (signal $\overline{\text{S.POS}}$), which goes low ("L") each time stocker 1011 reaches one of positions POS (1)–POS (4). Thus, position POS (1) is detected by moving the stocker downward and detecting the change in signal $\overline{\text{S.POS}}$ to "L" after signal $\overline{\text{S.REF}}$ changes to "H". The remaining positions, POS (2)–POS (4) are determined by counting the pulses from signal $\overline{\text{S.POS}}$ using position POS (1) as a reference.

Disk Position Regulating Mechanism

Referring to FIGS. 3, 26, and 67–72, in an embodiment of the invention, the disks are held in the stocker at a narrow pitch of 3 mm to make the disk changer/player compact. The close spacing can expose disks to damage if a disk held in stocker 1011 is permitted to pitch sufficiently to contact the upper surface Du of the disk being played back. Also, since the playback disk needs to be rotated at high speeds, to provide high-speed data transfer, couette flow of air, generated between the playback disk and the lower disks held in the stocker, can cause the stocked disks to be drawn toward the playback disk, causing damage. To eliminate this problem, the present embodiment includes a disk position regulating means 1017, which prevents stored disks positioned above and below the playback disk from moving close to the playback disk.

Figure 71:
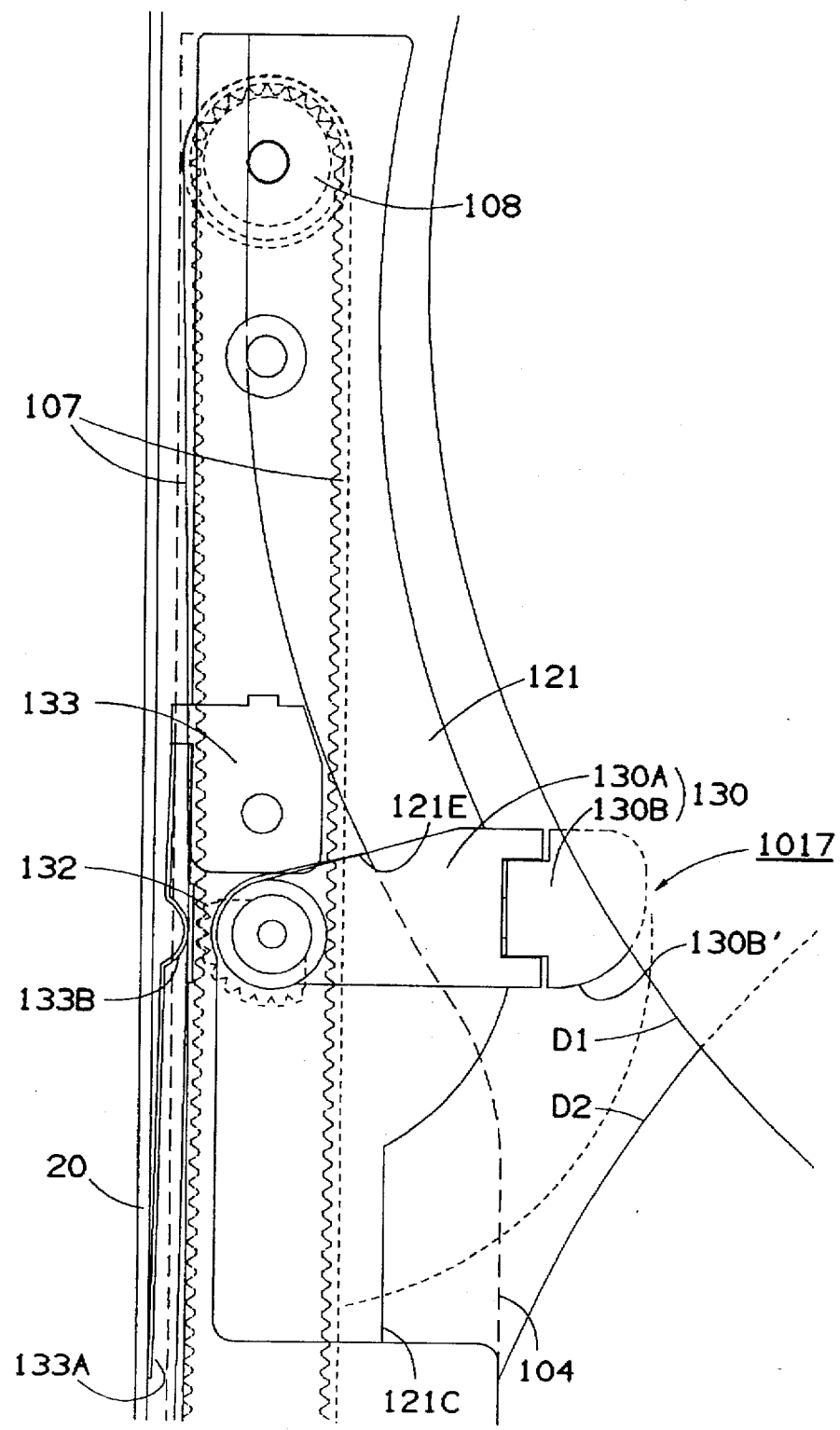
FIG. 71 is a plan-view of disk position regulating mechanism 1017 in a retracted position with the loading plates in the disk open position.
Figure 72:
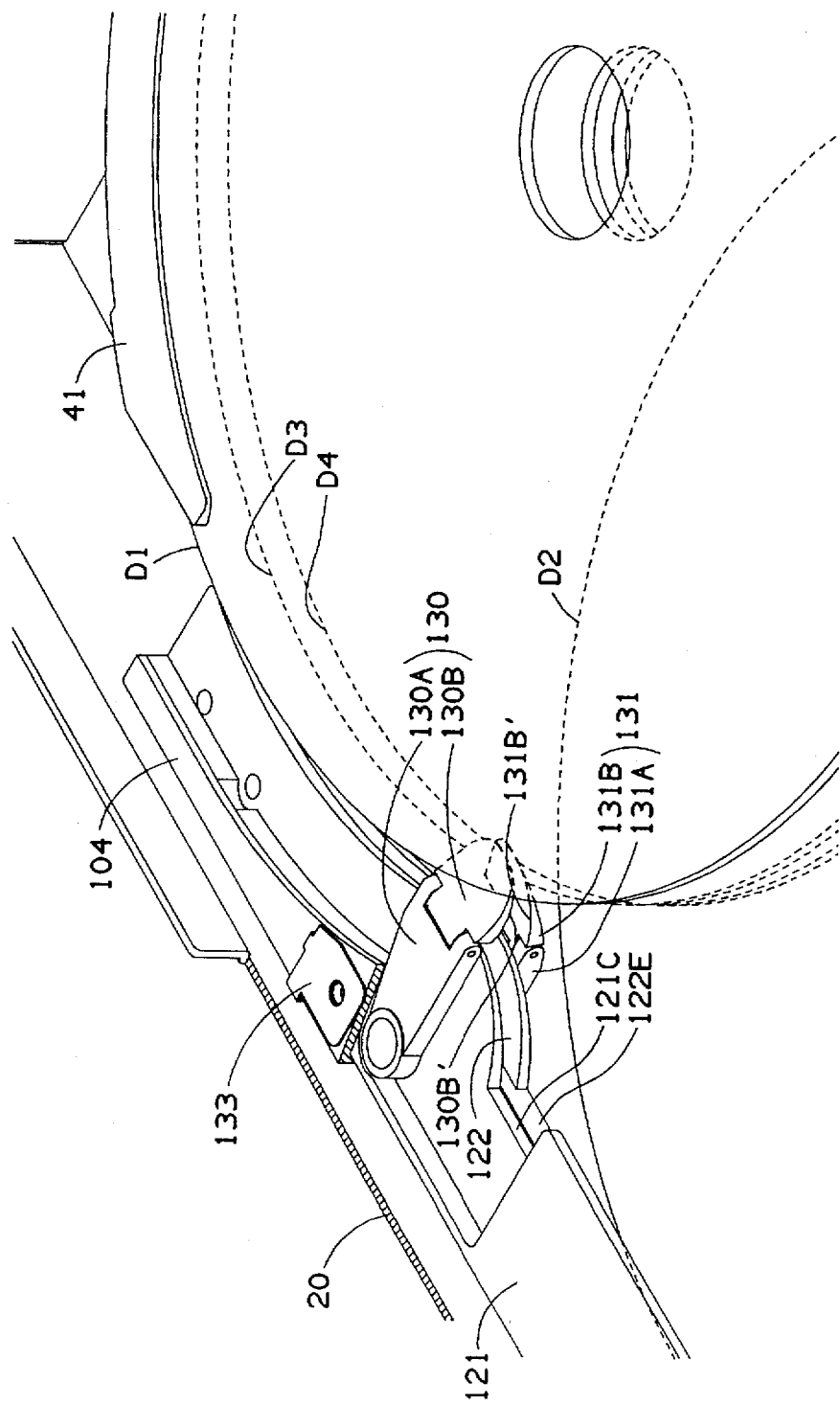
FIG. 72 is a perspective view of disk position regulating mechanism 1017 in the retracted position with the loading plates in the disk open position.

Disk position regulating means 1017 includes an upper disk separation arm 130 and a lower disk separation arm 131 that connect in common to a pinion gear element 132. Upper disk separation arm 130, has support 130A and an end 130B. Upper disk separation arm 130 urges stored disks positioned above the playback disk away from the playback disk. Shaft 130A' of support 130A inserts through hole 121D of upper disk guide 121. Shaft 130A' rotates between a disengaged position shown in FIG. 69 and 70 and an engaged position shown in FIGS. 71 and 72. End 130B is wedge-shaped and pivots on the end of support 130A. As shown best in FIG. 70, end 130B pivots to a flat position above drive-side disk guide 1002, when shaft 130A' is rotated to the disengaged position. This allows shaft 130A' to rotate far enough to bring end 130B completely outside the transport path of the disks. As best shown in FIG. 72, end 130B pivots down to an angled position and engages the stored disk immediately above the playback disk when shaft 130A' rotates to the engaged position, urging and retaining the stored disk immediately above the playback disk away from the playback disk. End 130B is urged to pivot down to the angled position by a spring 138A forces a plunger 137A which slides inside a side hole 130A" in support 130A.

Shaft 130A' of support 130A extends through hole 121D below the lower surface of upper disk guide 121. A pinion gear 132A of pinion gear element 132, meshes timing belt 107. Pinion gear 132 is press-fitted over shaft 130A'. Also, shaft 130A' extends through a hole 122D of lower disk guide 122, and its end inserted and affixed to lower disk separation arm 131. Lower disk separation arm 130, with a support 131A and an end 131B similar to support 130A and end 130B, prevents a stored disk immediately below the playback disk from contacting the playback disk. As with end 130B, end 131B is rotatably supported on the end of a support 131A, and rotates between a flat position outside of the motion path of the playback disk, shown in FIG. 70, and an angled position within the motion path of the playback disk. Also, end 131B is urged toward the angled position by a plunger 137B urged by a spring 138B inserted into a side hole 131A" of support 131A.

A plate spring 133 is attached to the upper surface of loading plate 104. Plate spring 133 has an end 133A that engages the inner wall of main chassis 20 and a pressing portion 133B that applies pressure to the perimeter surface of timing belt 107. Referring to FIG. 71, when loading plate 104 is moved to the open position POS.3, pressing portion 133B forces the teeth of timing belt 107 in mesh with pinion gear 132A causing pinion gear 132A to rotate, thereby rotating disk-position regulating means 1017.

Figure 67:
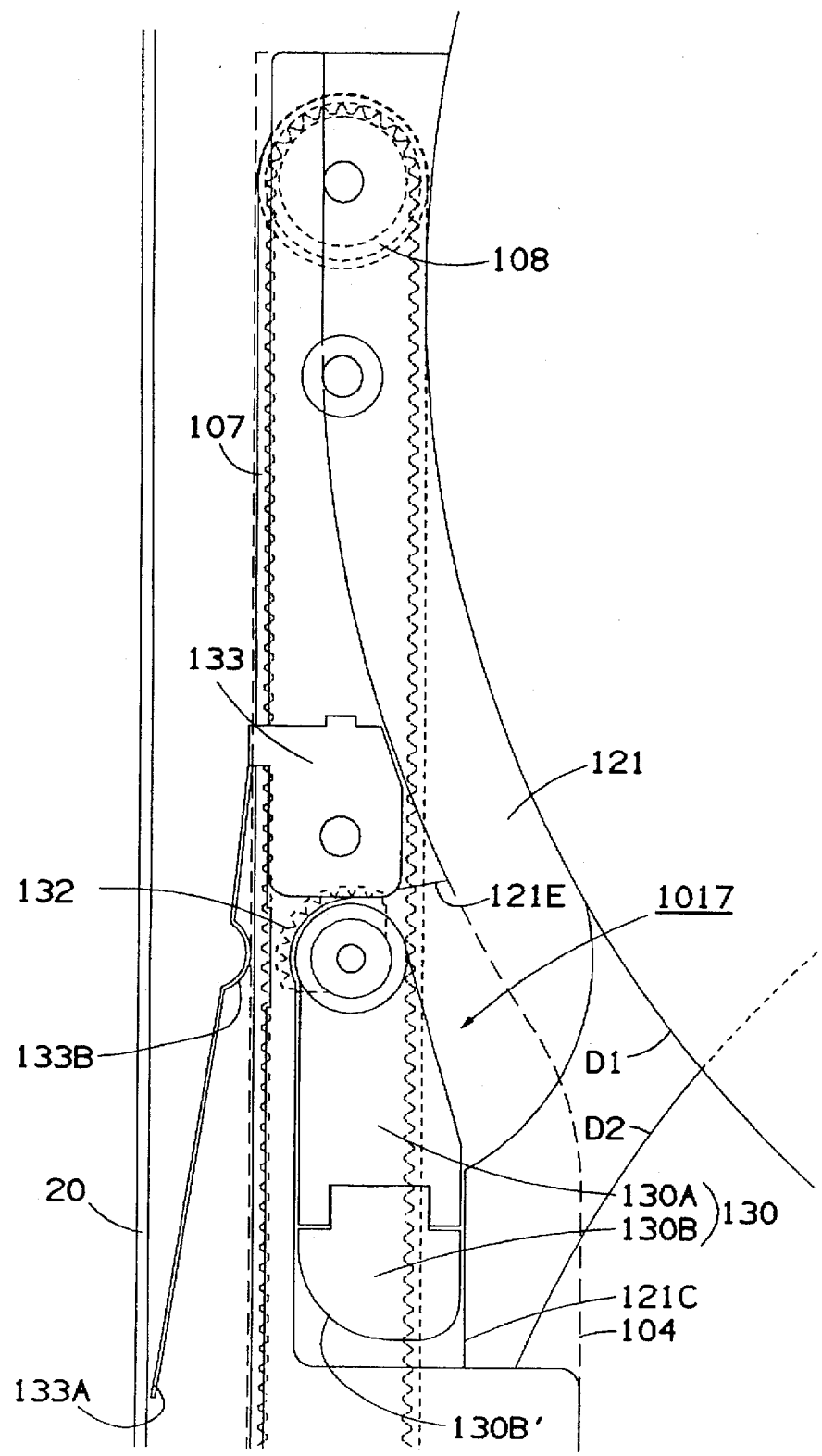
FIG. 67 is a plan-view of a disk position regulating mechanism 1017 with the loading plates in the disk supporting position.
Figure 68:
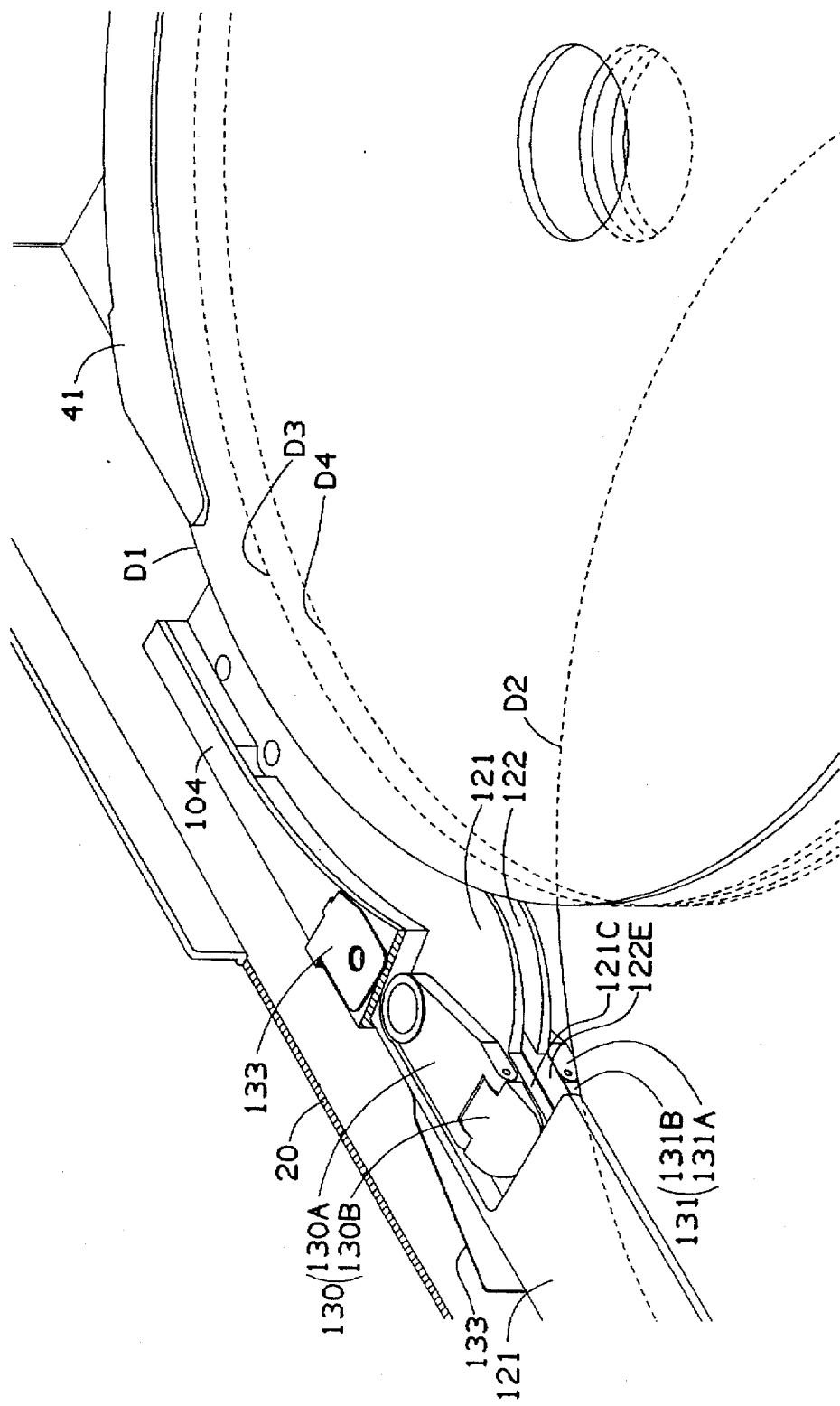
FIG. 68 is a perspective view of disk position regulating mechanism 1017 with the loading plates in the disk supporting position.

In the embodiments described above, when loading plate 104 is positioned medially relative to disk loading position POS.2, as shown in FIGS. 67 and 68, an end 133A of plate spring 133 is prevented from reaching the inner wall of main chassis 20, and therefore, does not press against the perimeter surface of timing belt 107. Thus, timing belt 107 remains disengaged from pinion gear 132A. While timing belt is disengaged from pinion gear 132A, disk separation arms 130 and 131 remain in the retracted position due to the force of a return spring 134 which pulls on support 131A. In the retracted position, the side of support 130A engages edge 121C of lower disk guide 121. At this point, ends 130B and 131B are forced into the flat position by upper disk guide 121 and lower disk guide 122, respectively. Also, in the retracted position, ends 130B and 131B are out of the path of transport of disks and out of the way of the playback disk.

Figure 69:
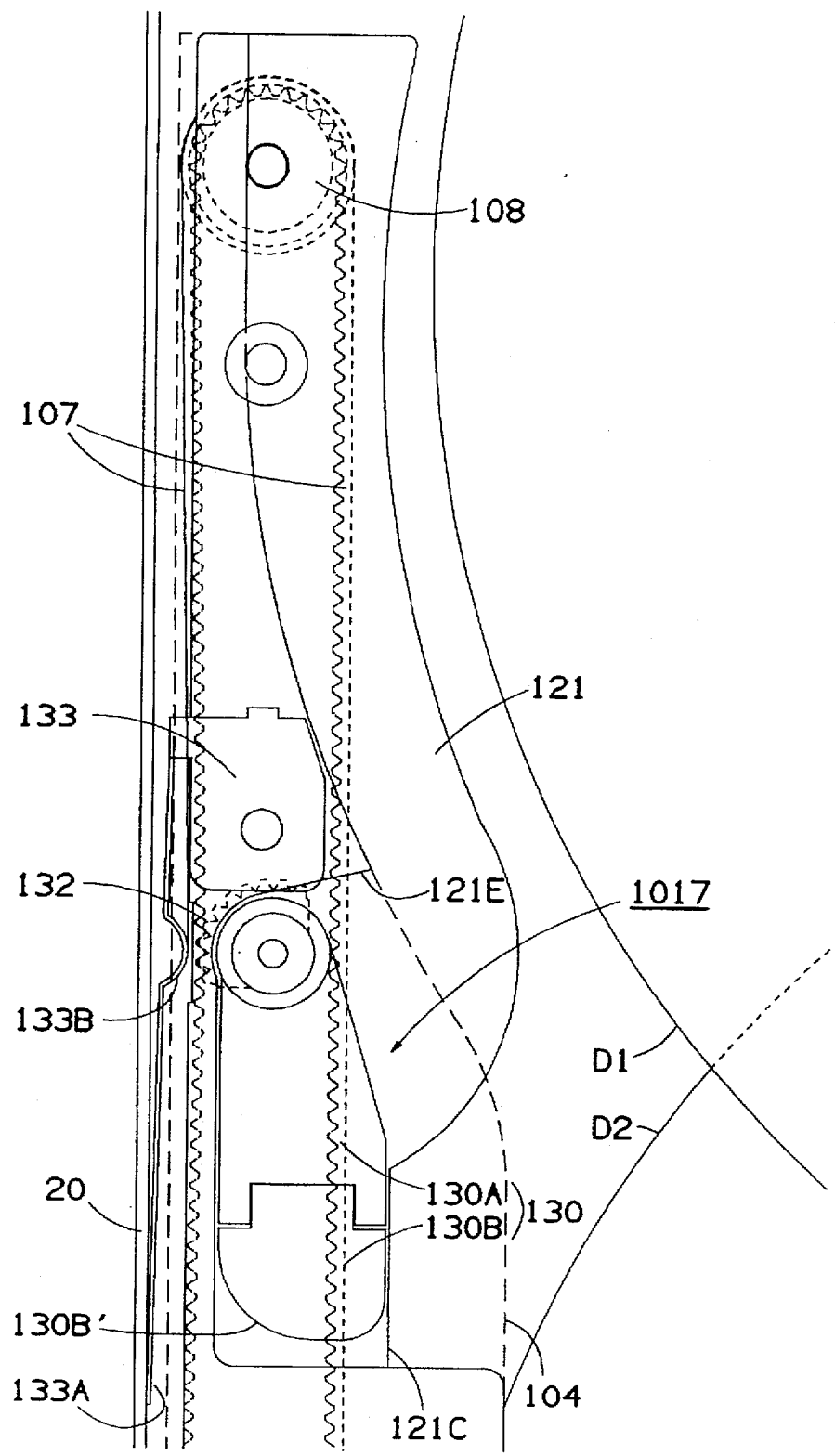
FIG. 69 is a plan-view of disk position regulating mechanism 1017 in the retracted position with the loading plates in the disk open position.
Figure 70:
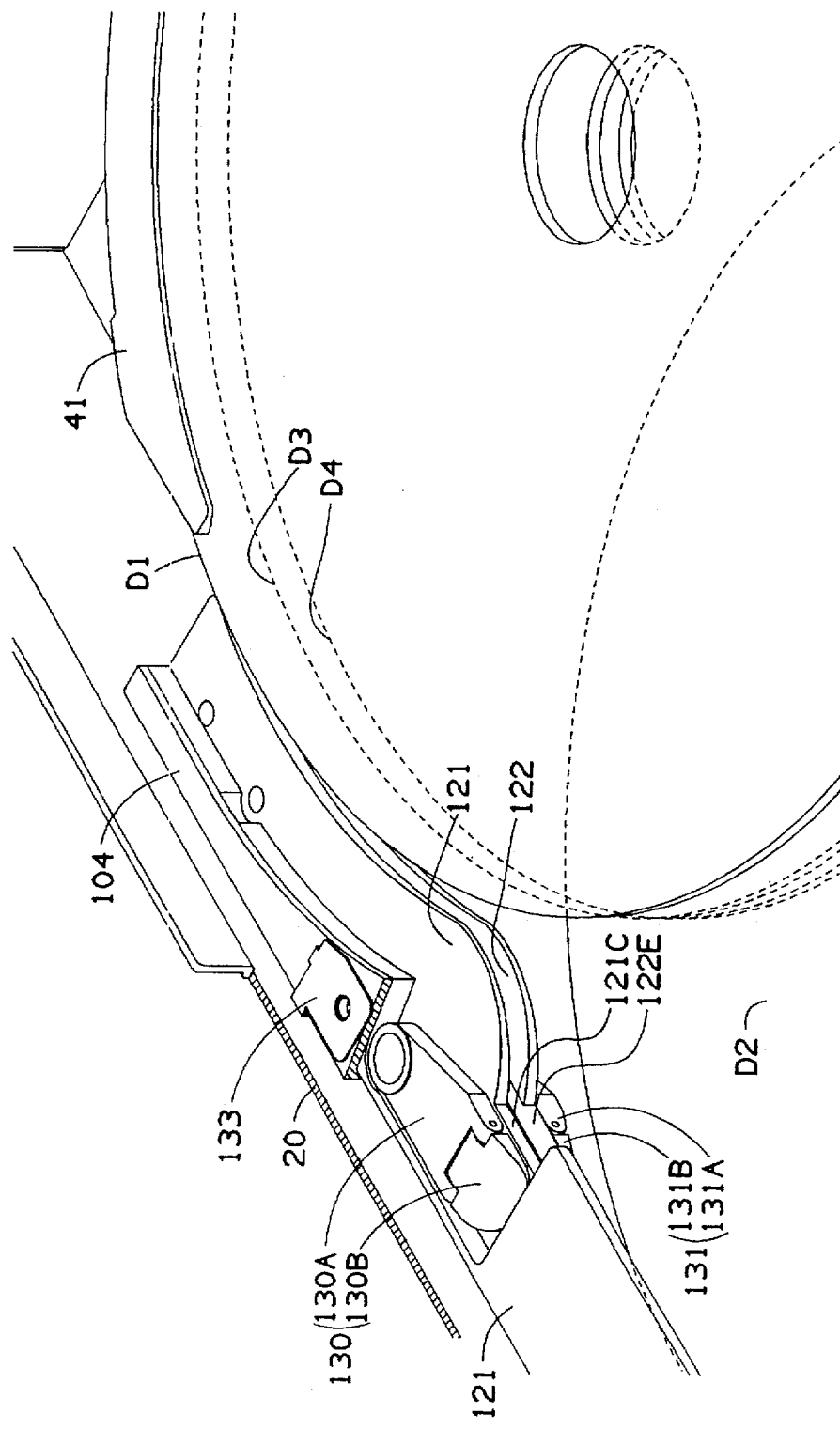
FIG. 70 is a perspective view of disk position regulating mechanism 1017 in the retracted position with the loading plates in the disk open position.

Referring to FIGS. 69 and 70, when loading plate 104 moves to open position POS.3, an end 133A of plate spring 133 engages the inner surface of main chassis 20 and pressing portion 133B presses against the perimeter surface of timing belt 107, causing it to engage pinion gear 132A. As a result, pinion gear element 132 rotates counter-clockwise. Ends 130B and 131B converge, urged by springs 138A and 138B, as disk separation arms 130 and 131 rotate because they are no longer supported by upper and lower disk guides 121 and 122 as they are rotated to a position located within the motion path of the playback disk. Thus, disk separation arms 130 and 131, with ends 130B and 131B bending toward each other, insert between stored disks D1 and D3, positioned above and below playback disk D2. Disk separation arms 130 and 131 raise the edge of stored disk D1 and also prevent stored disk D3 from being drawn toward playback disk D2.

As timing belt 107 rotates clockwise, disk separation arms 130 and 131 rotate clockwise. Ends 130B and 131B are drawn out from between stored disk D1 and D3. As their edges 130B' and 131B' engage with edges 121C and 122E of upper and lower disk guides 121 and 122 respectively, ends 130B and 131B are forced apart and into the flat position against the force of springs 138A and 138B. When disk separation arms 130 and 131 are rotated to the retracted position shown in FIGS. 69 and 70, ends 130B and 131B are retracted away from the disk motion path of playback disk D2.

Although in the embodiment described above disk separation arms 130 and 131 are rotated by timing belt 107 to positively rotate disk separation arms 130 and 131 to the retracted position, it would also be possible to employ other mechanisms to accomplish the same result. For example it would also be possible to use a mechanism that uses a return spring 134 (See FIG. 3) on disk separation arms 130 and 131 and which, by closing loading plate 104, releases an engagement between timing belt 107 and pinion gear 132A so that return spring 134 brings disk separation arms 130 and 131 back to the retracted position.

Disk Lock Mechanism

Figure 31:
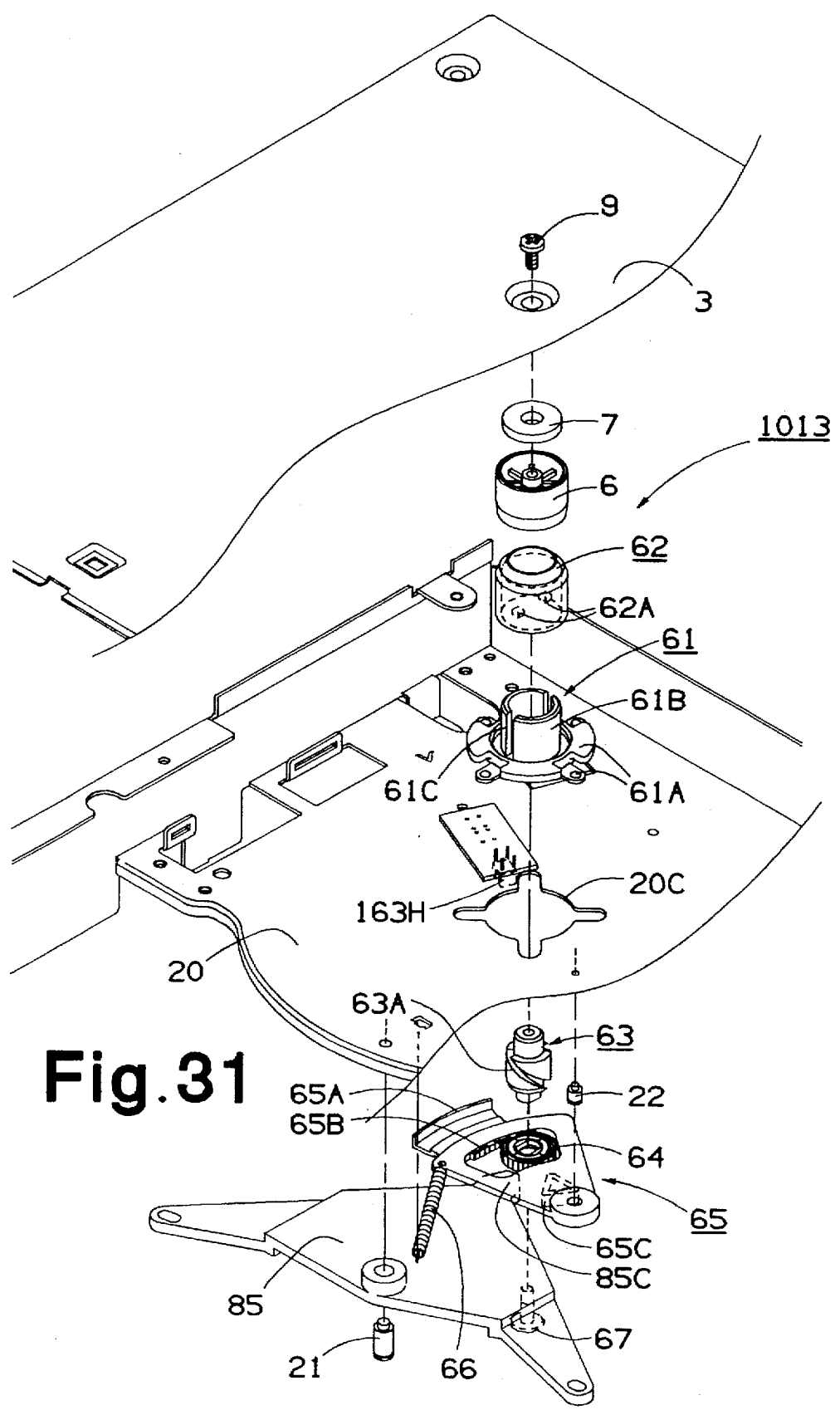
FIG. 31 is an exploded view of a disk lock mechanism 1013.
Figure 32:
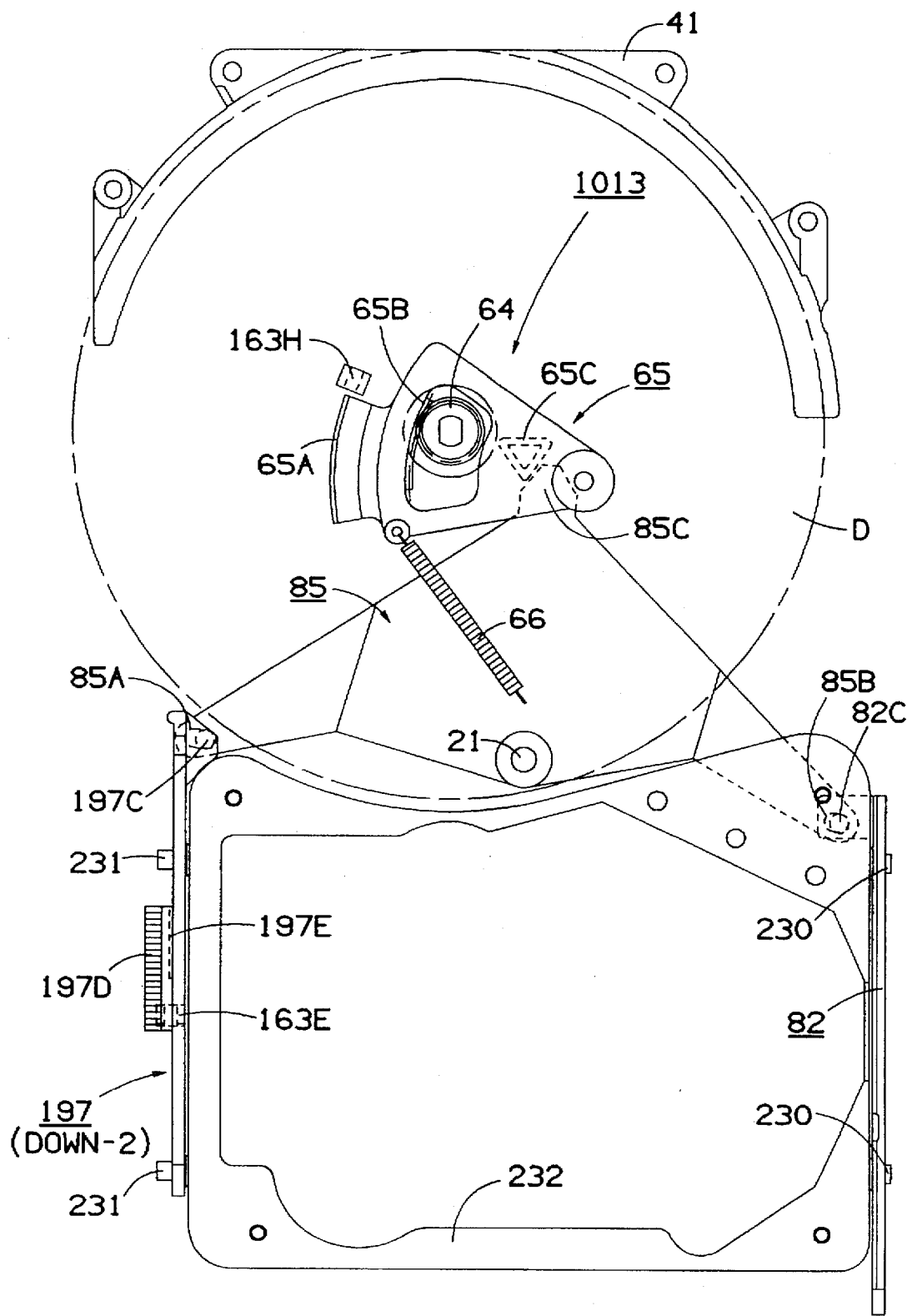
FIG. 32 is a plan-view of disk lock mechanism 1013 and UD cams 197 and 82 in position DOWN-2.

Referring to FIGS. 31–39, for now, and particularly to FIG. 31, a disk lock mechanism 1013, keeps disks in stocker 1011 from shifting. A guide sleeve 6 is resiliently mounted by a screw 9 to the lower surface of top cover 3. A cushion member 7, of urethane, felt or the like, holds guide sleeve 6 in a vertical orientation. The end of guide sleeve 6 (toward the bottom of the drawing of FIG. 31) extends to a position 0.8 mm above upper surface Du of transfer disk D1 (See FIGS. 38 and 39), passing through the disk spindle holes of any disks in the stocker that are above transfer disk D1. Also, the end of guide sleeve 6 is a concave to receive the end of a lock sleeve 62, described below.

Lock sleeve 62 extends upwardly from main chassis 20 facing guide sleeve 6. Lock sleeve 62 is guided so that it can move between an unlock position, where it passes through the spindle holes of the disks within the stocker below transfer disk D1 (see FIG. 37), and a lock position, where it fits against the end of guide sleeve 6 described above (see FIG. 36). In the unlock position, the end of lock sleeve 62 extends to a position 0.8 mm below the lower surface of disk D1 opposite guide sleeve 6. The end of lock sleeve 62 is tapered to compensate for slight misalignments in the position of transfer disk D1 when it moves up toward the lock position. Also, the taper serves to align lock sleeve 62 with guide sleeve 6.

A lock base 61 inserts through an opening 20C in main chassis 20. Lock base is affixed to main chassis 20 by a flange 61A on the bottom end of lock base 61. Lock base 61 guides lock sleeve 62. On lock base 61, there is a vertical guide groove 61C cut through an outside cylindrical section thereof. Guide pins 62A, projecting radially inward from the inner surface of lock sleeve 62, keeps lock base 61 from rotating during vertical movement. Guide pins 62A fit into a spiral cam 63A, of a lock cam 63. Lock cam 63 is inserted inside guide 61B. Rotation of lock cam 63 guides pin 62A, moving lock sleeve 62 between the unlock and lock positions described above. A gear 64, affixed to the bottom end of lock cam 63 by a screw 67, meshes gear segment 65B of lock arm 65. Lock arm 65, rotatably supported on the bottom surface of main chassis 20 by a shaft 22, is urged counter-clockwise by a spring 66. Also, a projection 65C, positioned to engage with end 85C of UD link arm 85 described above, is formed on the lower surface of lock arm 65.

In disk lock mechanism 1013, lock sleeve 62 moves up and down in response to the motion of UD cams 197 and 82, as shown in FIG. 47. Initially, when UD cams 197 and 82 are in position DOWN-2, UD link arm 85 rotates to the position shown in FIG. 32. End 85C is positioned to the right of projection 65C of lock arm 65. In lock arm 65, spring 66 causes lock cam 63 (FIG. 31) to rotate clockwise, driven by gear 64. Lock sleeve 62 is raised to a lock position where it fits against guide sleeve 6 (see FIG. 36, FIG. 38). Thus, lock sleeve 62 is inserted in the spindle hole of disk D in the plane of transport. Other disks in stocker 1011 are secured by one or both of guide sleeve 6 and lock sleeve 62 so that none of the disks can shift.

Figure 33:
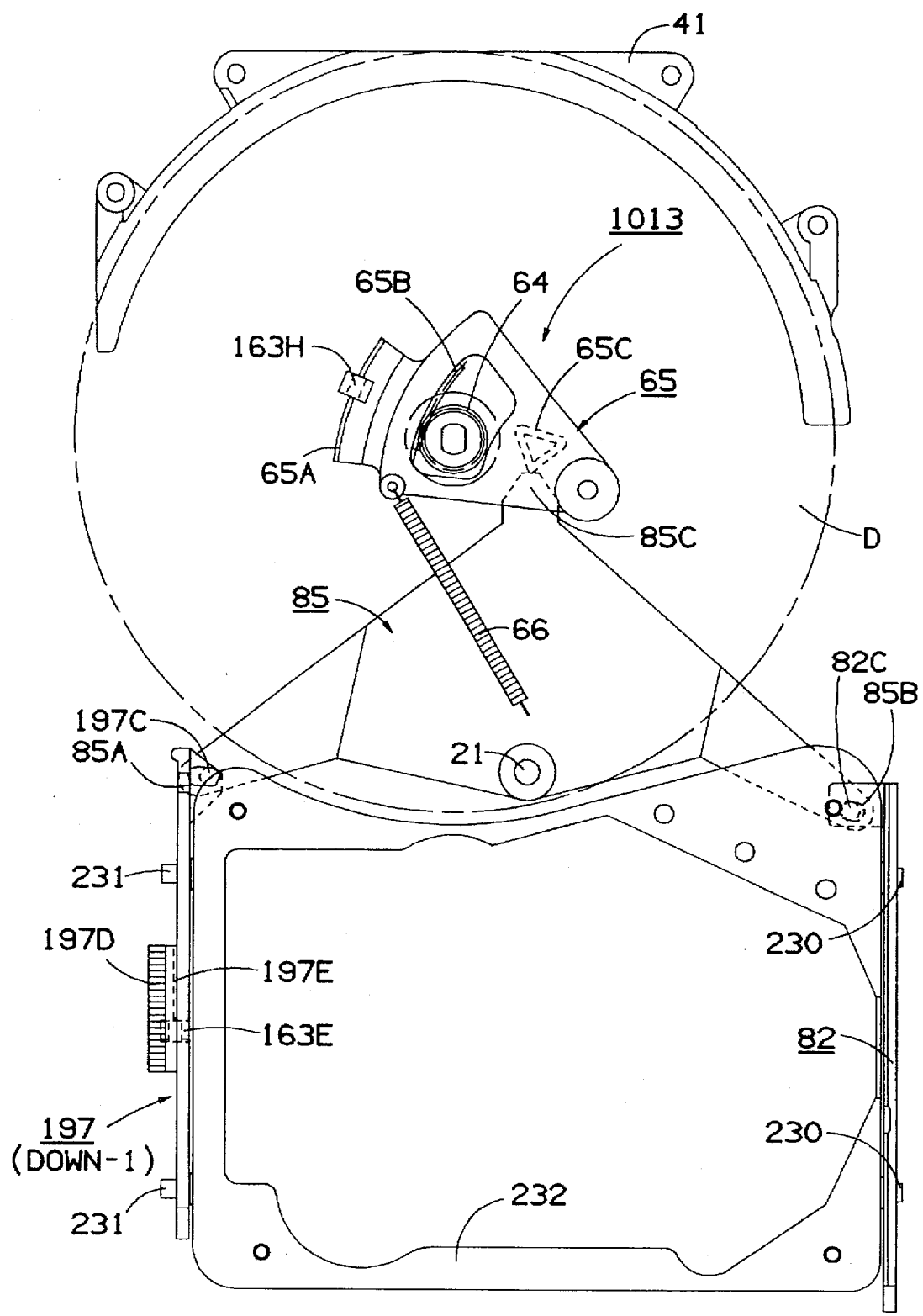
FIG. 33 is a plan-view of disk lock mechanism 1013 and UD cams 197 and 82 in position DOWN-1.

When UD cams 197 and 82 move to position DOWN-1, UD link arm 85 rotates counter-clockwise to the position shown in FIG. 33. End 85C forces lock arm 65 to rotate clockwise in opposition to the force of spring 66. Lock cam 63 rotates clockwise, and lock sleeve 62 lowers to an unlock position in response to the movement of spiral cam 63A. In the unlock position, lock sleeve 62 is 0.8 mm below lower surface D1 of transfer disk D1 (see FIGS. 37 and 39). As described above, the lower surface of guide sleeve 6 extends only 0.8 mm above upper surface Du of transfer disk D1. Thus, neither guide sleeve 6 nor lock sleeve 62 passes through spindle hole Ds of transfer disk D1, thus allowing disk D1 to be removed from stocker body 41.

Figure 34:
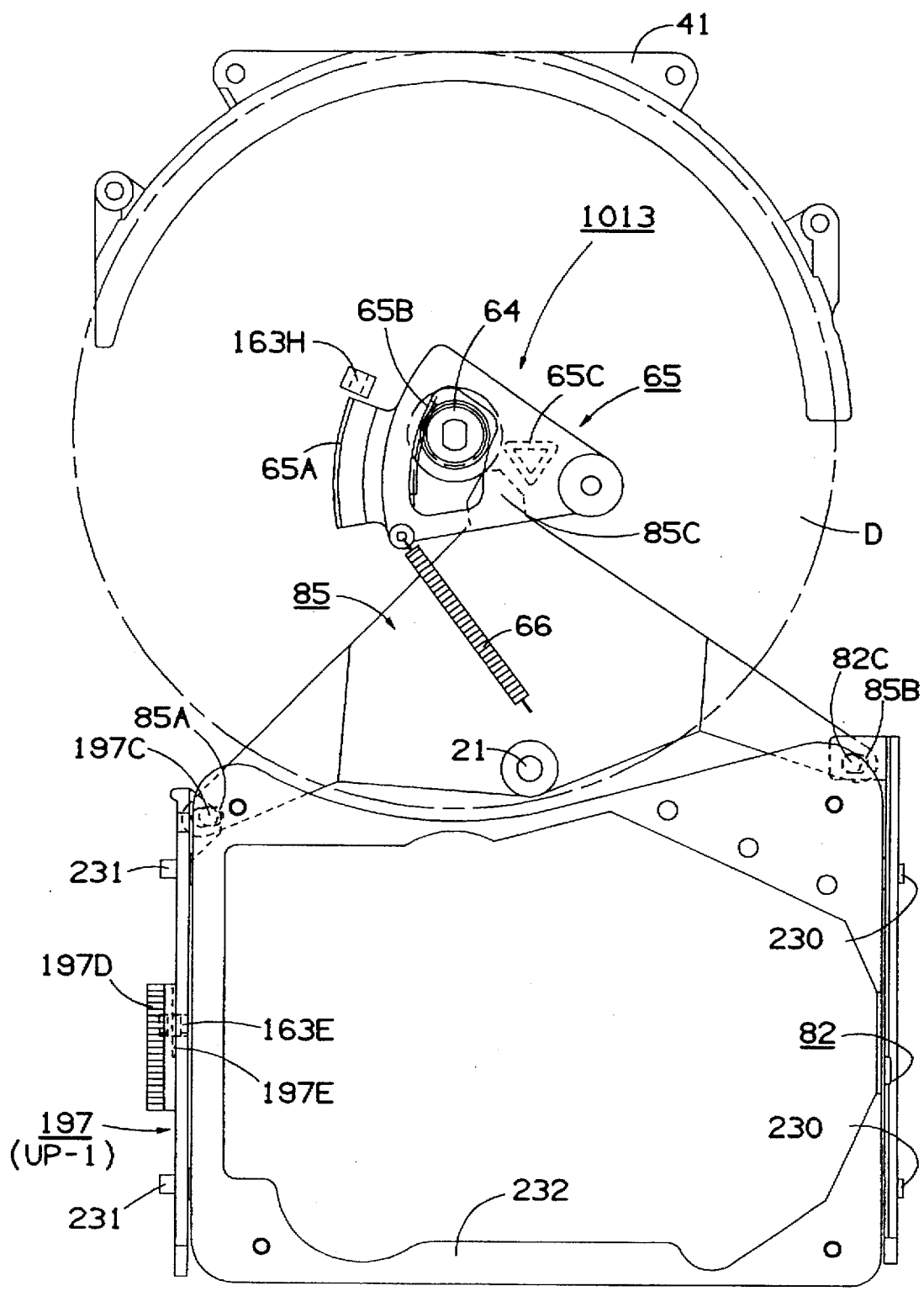
FIG. 34 is a plan-view of disk lock mechanism 1013 and UD cams 197 and 82 in position UP-1.
Figure 35:
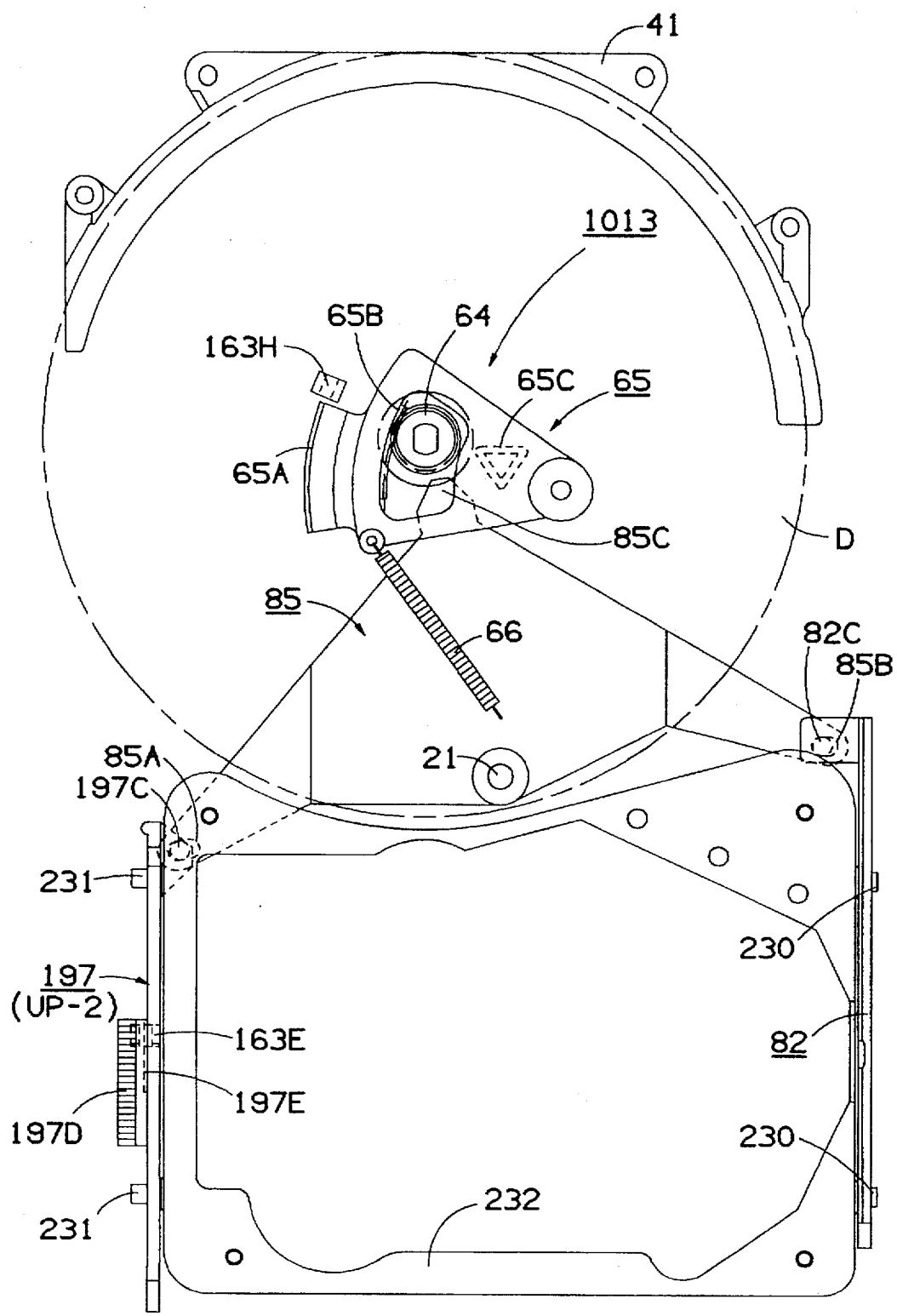
FIG. 35 is a plan-view of disk lock mechanism 1013 and UD cams 197 and 82 in position UP-2.

When UD cams 197 and 82 move to position UP-1, end 85C of UD link arm 85 is positioned to the left of projection 65C, as shown in FIG. 34. Thus, lock arm 65 again rotates spring 66 in a counterclockwise direction via gear 64. Lock sleeve 62 is raised to the lock position where it fits against guide sleeve 6 (see FIGS. 36 and 38). When UD cams 197 and 82 move to position UP-2, UD link arm 85 is rotated further in the counter-clockwise direction, as shown in FIG. 35, and lock sleeve 62 remains in the lock position.

Figure 73:
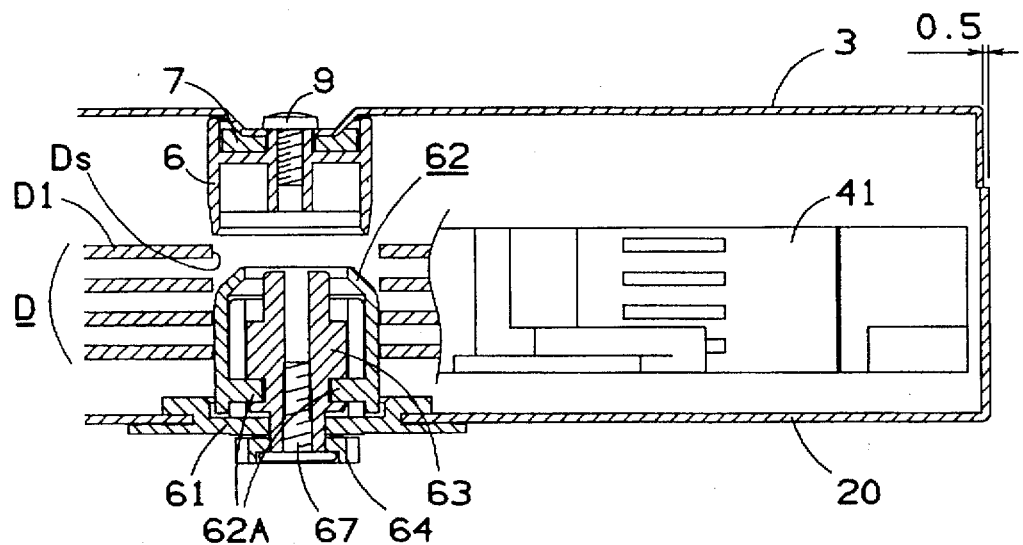
FIG. 73 is a schematic cross-section view of guide sleeve 6 and lock sleeve 62 in the unlock position when they are misaligned.
Figure 74:
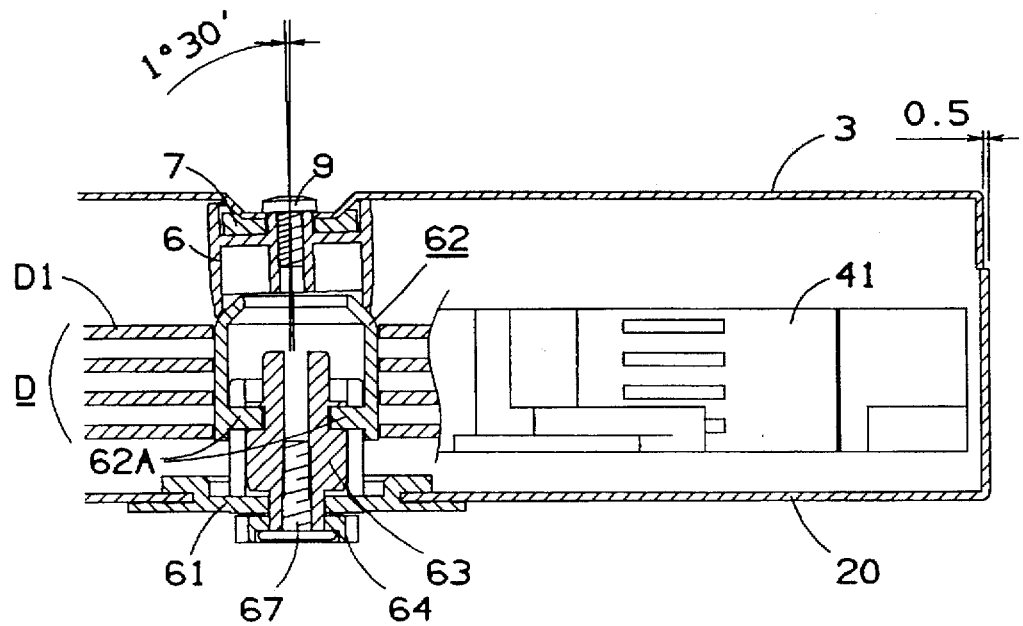
FIG. 74 is a schematic cross-section view of guide sleeve 6 and lock sleeve 62 in the lock position when they are misaligned.
Figure 75:
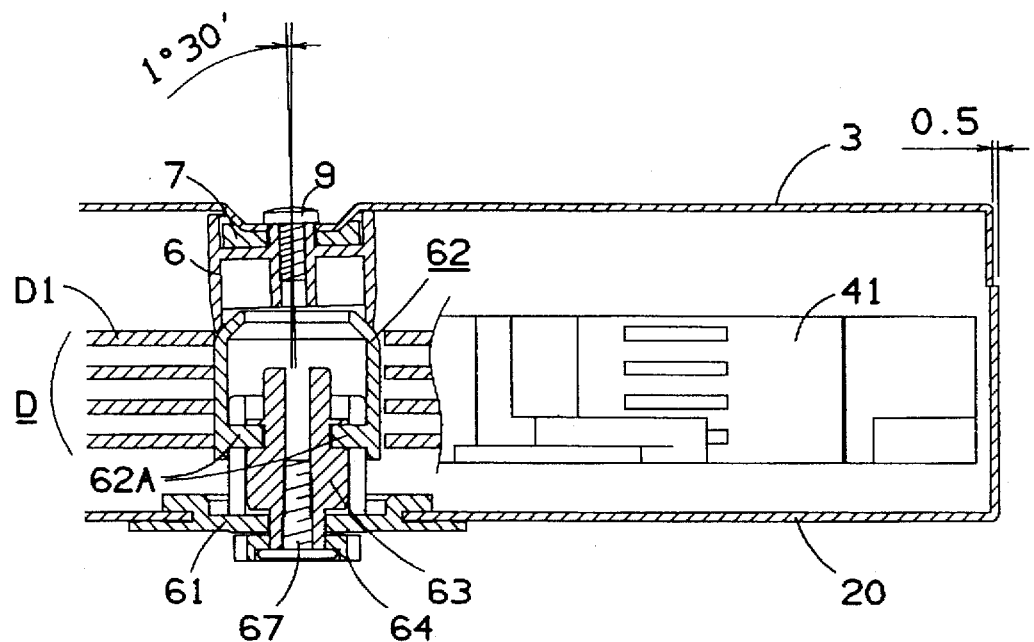
FIG. 75 is a schematic cross-section view of guide sleeve 6 and stocker body 41 in upward motion when they are misaligned.
Figure 76:
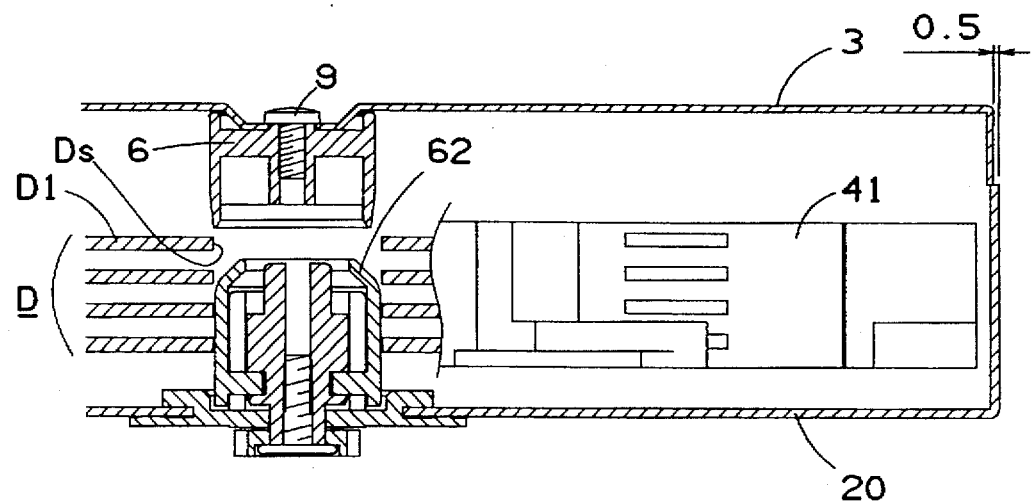
FIG. 76 is a schematic cross-section view of a prior art device showing guide sleeve 6 and lock sleeve 62 in the unlock position when they are misaligned.
Figure 77:
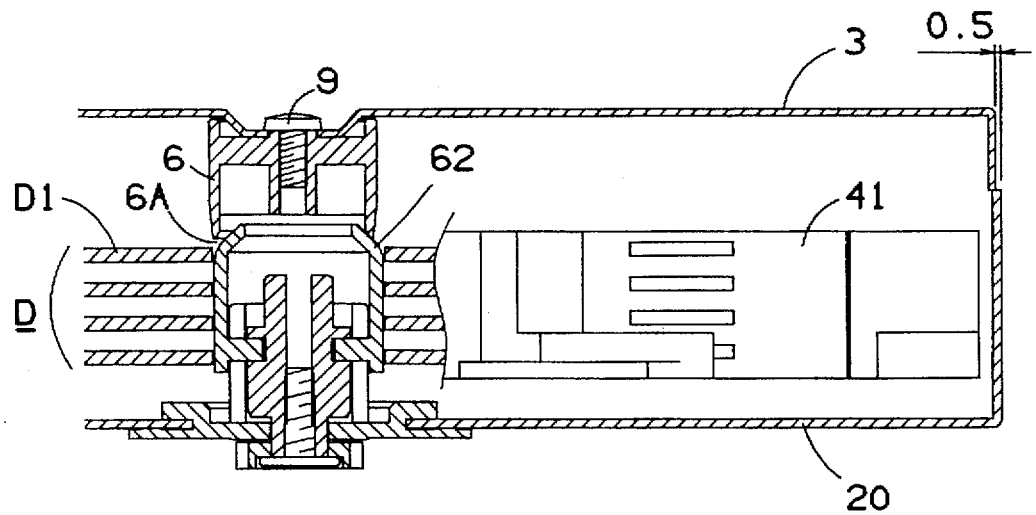
FIG. 77 is a schematic cross-section view of a prior art device showing guide sleeve 6 and lock sleeve 62 in the lock position when they are misaligned.
Figure 78:
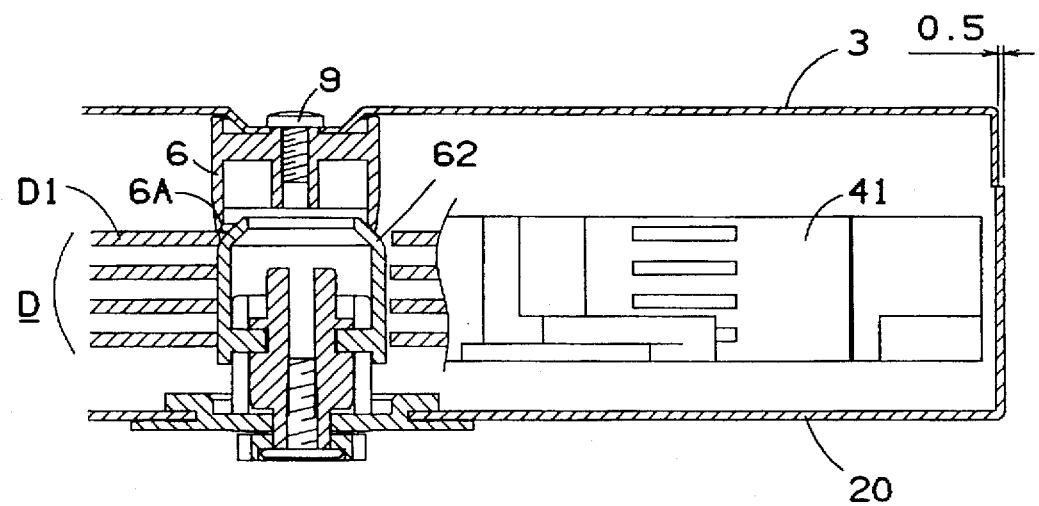
FIG. 78 is a schematic cross-section view of a prior art device showing guide sleeve 6 and stocker body 41 in upward motion when they are misaligned.

Referring to FIGS. 73–75, misalignment between guide sleeve 6 and lock sleeve 62 can occur when top cover 3 is attached to the front of the housing with an offset, for example, of 0.5 mm. Referring to FIG. 73, when lock sleeve 62 is at the unlock position the ends of guide sleeve 6 and lock sleeve 62 are separated from the upper surface and the lower surface of the transfer disk by the correct distance (0.8 mm), similar to the configuration in FIG. 37. When lock sleeve 62 is raised toward the lock position, lock sleeve 62 engages with the end of guide sleeve 6 since guide sleeve 6 is flexibly affixed to top cover 3, as described above. The engagement of lock sleeve 62 with the end of guide sleeve 6 causes guide sleeve 6 to tilt after it rises to the lock position (see FIG. 74). In the lock position, lock sleeve 62 causes guide sleeve 6 to tilt roughly 1.5 degrees toward the rear of changer/player 1000. Referring to FIG. 75, this tilt prevents any discontinuity from being formed between the surface of lock sleeve 62 and guide sleeve 6, thereby preventing the spindle holes of the disks from catching the end of guide sleeve 6 as stocker body 41 is raised. Smooth operation is assured even in the presence of vibration or tilting. Under no reasonable circumstances is a gap or offset between guide sleeve 6 and lock sleeve 62 likely to occur.

A disk transfer error can result in disk D1 being positioned considerably away from the stock position. In this case, when UD cams 197 and 82 are moved to position DOWN-2, the sloped surface at the end of lock sleeve 62 cannot compensate for the misalignment of the transfer disk. Lock sleeve 62 is obstructed by the lower surface of transfer disk D, preventing lock sleeve 62 from rising to the lock position. If the stocker were driven up or down while disk D was in this position, guide sleeve 6 or lock sleeve 62 would damage transfer disk D1, resulting in a malfunction of changer/player 1000. To prevent this type of problem beforehand, a shutter piece 65A is formed on the end of lock arm 65 as shown in FIG. 31. Optical sensor 163H, which projects downwardly from the lower surface of main chassis 20, detects whether lock arm 65 has arrived at the lock position. The output from optical sensor 163H, a disk lock signal (signal $\overline{\text{D.LOCK}}$), indicates when lock sleeve 62 is at the lock position by changing to "L".

Disk Insertion Error Prevention Mechanism

Figure 40:
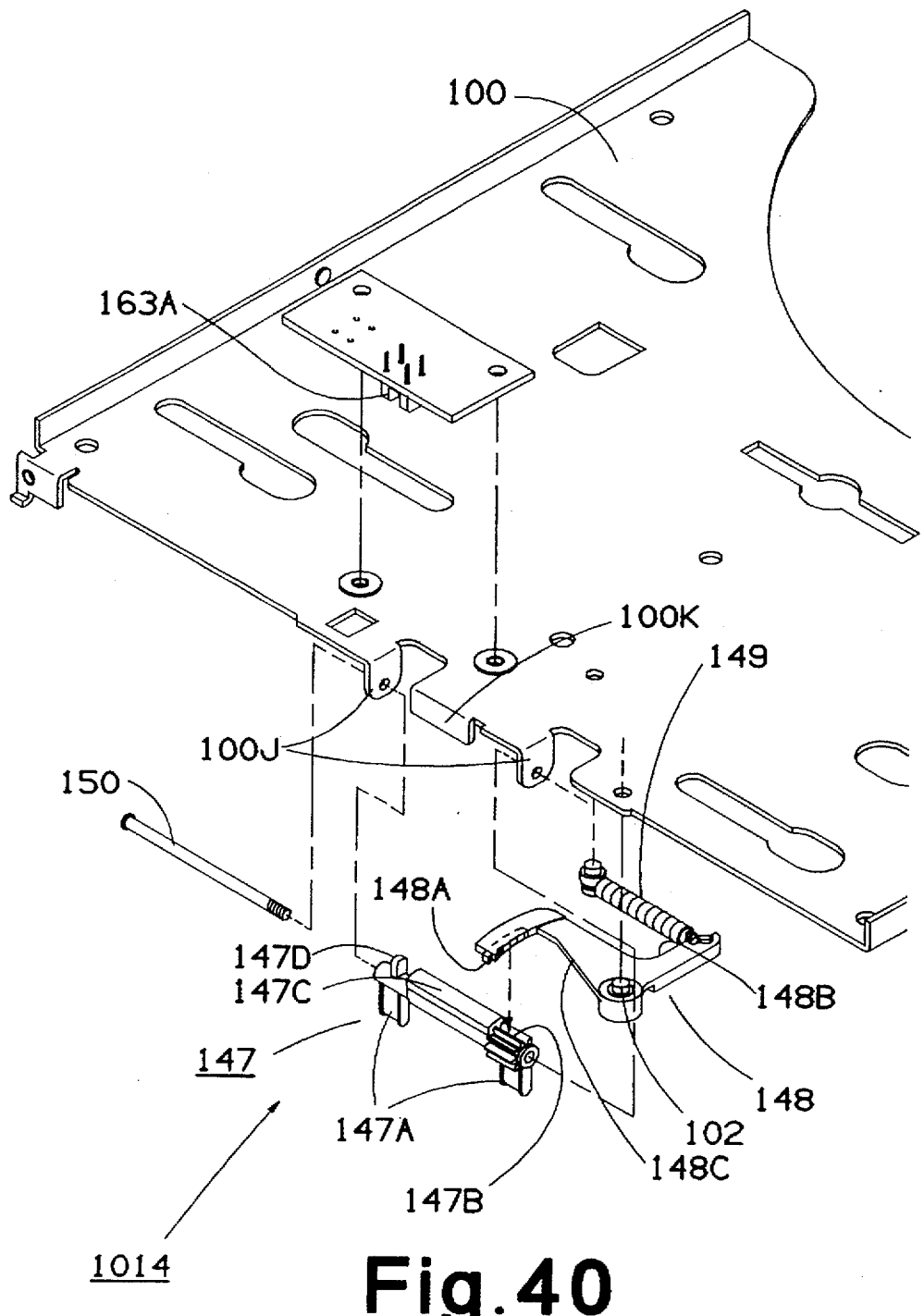
FIG. 40 is an exploded view of a disk insertion error prevention mechanism 1014.
Figure 41:
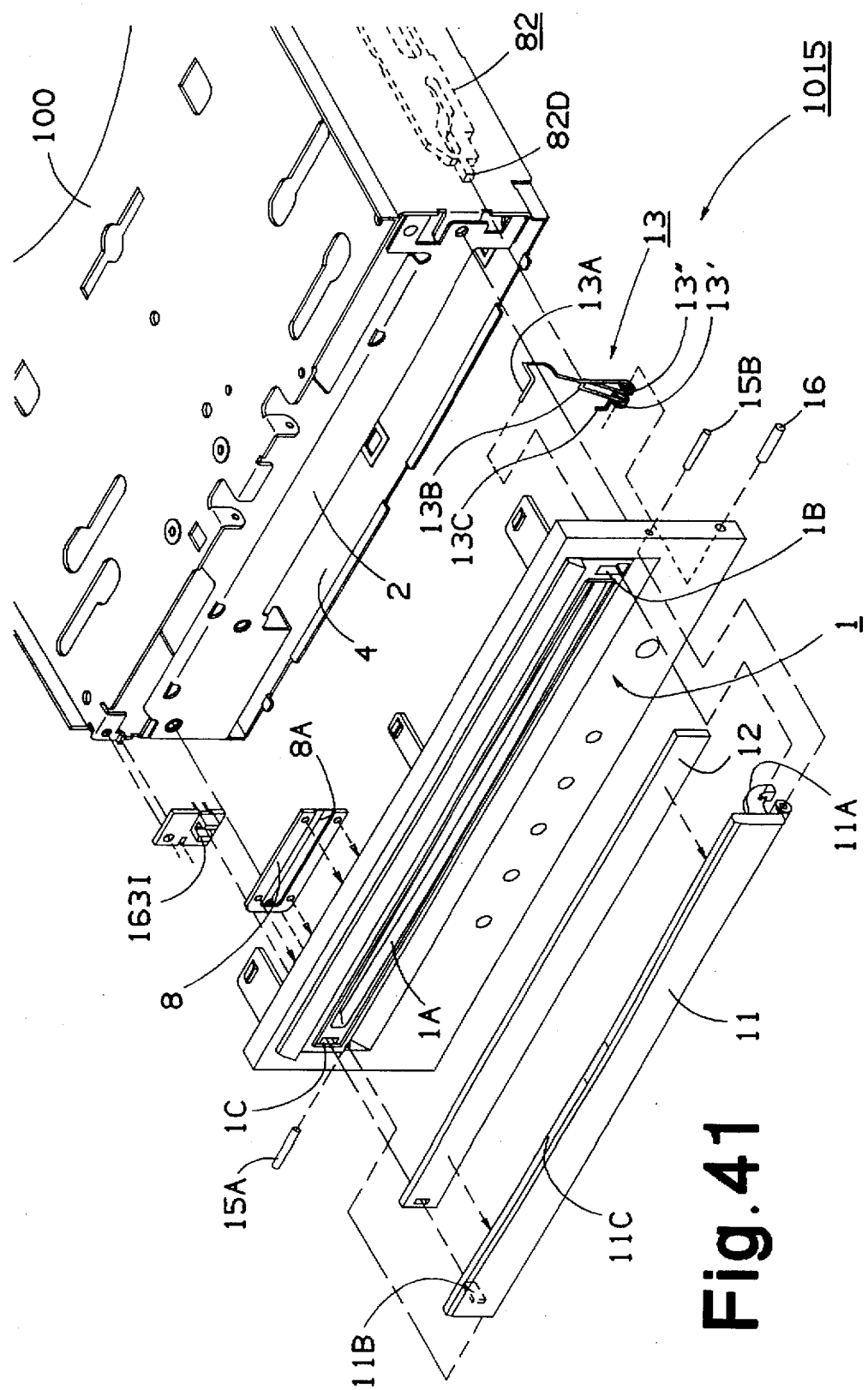
FIG. 41 is an exploded view of a door open/close mechanism 1015.
Figure 42:
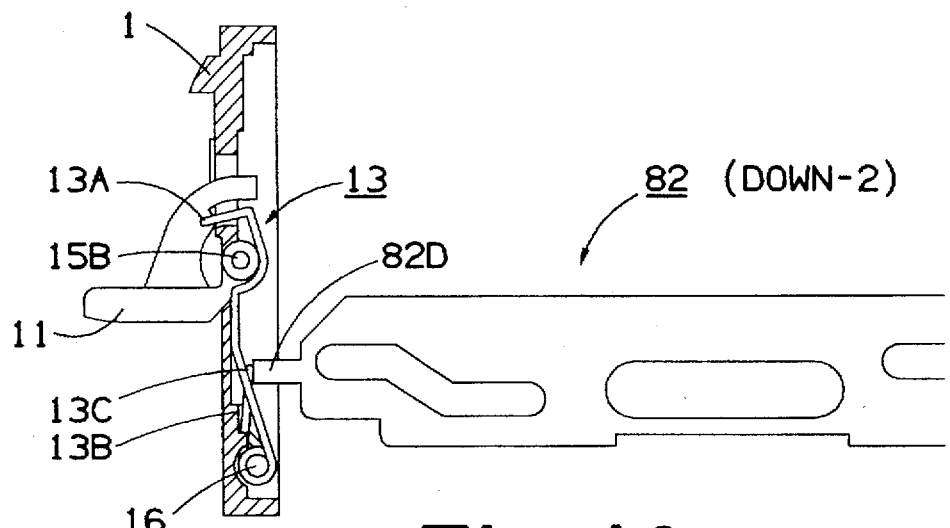
FIG. 42 is a schematic cross-section view of door open/close mechanism 1015 and UD cam 82 in position DOWN-2.
Figure 43:
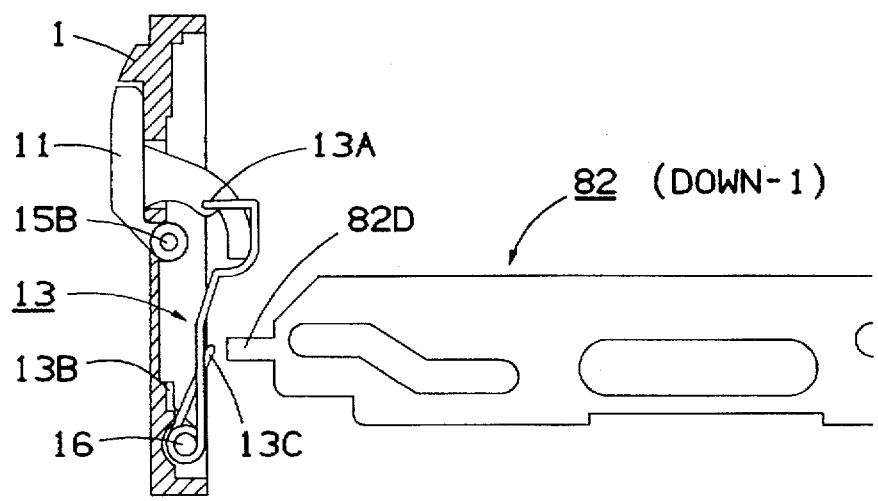
FIG. 43 is a schematic cross-section view of door open/close mechanism 1015 and UD cam 82 in position DOWN-1.
Figure 44:
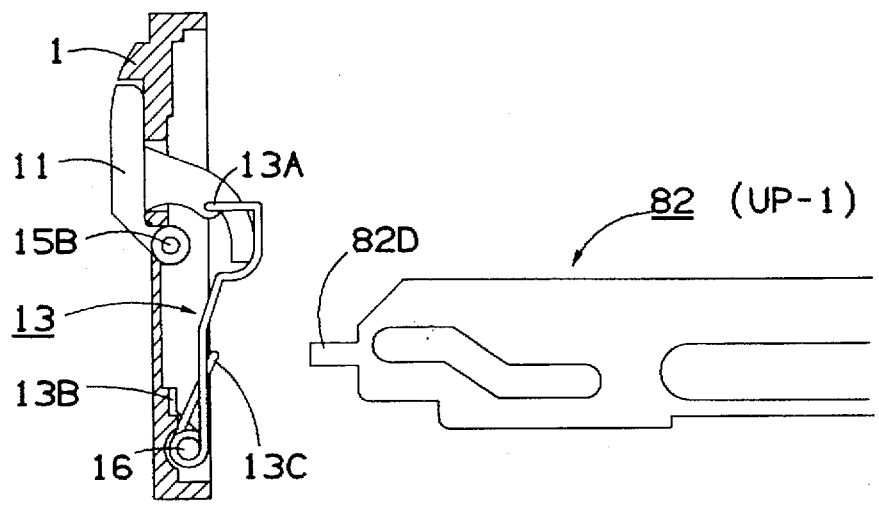
FIG. 44 is a schematic cross-section view of door open/close mechanism 1015 and UD cam 82 in position UP-1.
Figure 45:
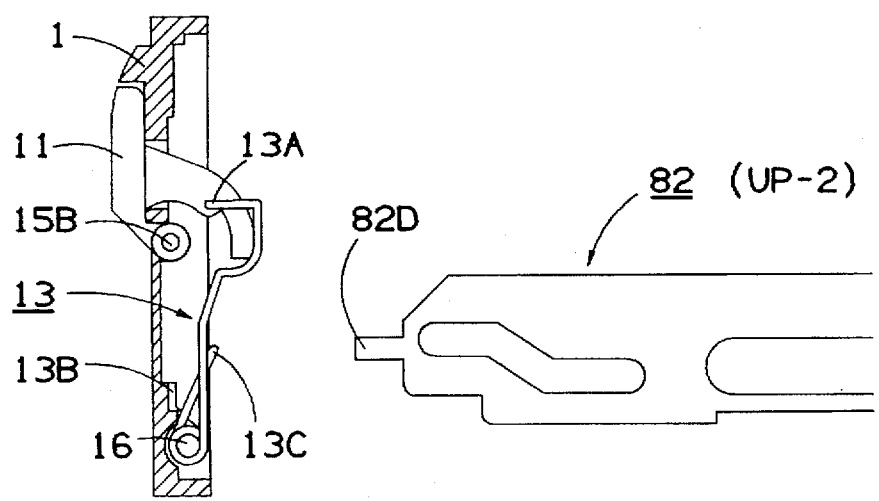
FIG. 45 is a schematic cross-section view of door open/close mechanism 1015 and UD cam 82 in position UP-2.

Referring to FIG. 40, a disk insertion error prevention mechanism 1014 prevents errors during insertion of disk D through disk insertion aperture 1A. A shutter 147 rotates on a shaft 150 supported by bends 100J of loading chassis 100. Flaps 147A extend downwardly from a shutter 147 across disk insertion aperture 1A to prevent improper insertion of disks (see FIG. 1). One end of shutter 147 has a gear segment 147B. Felt, compressed urethane, or similar material used to protect disks, (not shown in the drawings) is adhesively attached to the bottom end of flaps 147A to prevent disks from being damaged when they contact the upper surface of the disk during load/eject operation for disk D as described below.

Shutter actuator 148 rotates on a shaft 102 rotatably supported on loading chassis 100. Shutter actuator 148 is urged counter-clockwise by a spring 149 attached to a first arm 148B of shutter actuator 148. A rack 148A at the end of a second arm 148C, which forms a roughly 90 degree angle with first arm 148B, meshes gear segment 147B of shutter 147. First arm 148B of shutter actuator 148 faces a pin 129 (see FIG. 2) attached to loading plate 104.

In disk insertion prevention mechanism 1014, shutter 147 is opened or closed according to the positions of loading plates 104 and 140. When loading plates 104 and 140 converge to disk receiving position POS.1 (see FIG. 10), shutter actuator 148 is pressed by pin 129 of loading plate 104, rotating it clockwise (as seen from the top surface of changer/player 1000). Shutter 147 then rotates toward the outside of changer/player 1000. Thus, when loading plates 104 and 140 are at disk receiving position POS.1, shutter 147 is in a position that permits disks to be inserted through disk insertion aperture 1A.

When loading plates 104 and 140 are pressed apart due to the insertion of a disk, spring 149 pulls shutter actuator 148 to rotate it counter-clockwise in response the motion of loading plate 104 (pin 129). This causes shutter 147 to pivot down and toward the inside of changer/player 1000. Once loading plates 104 and 140 separate a specified distance, flap 147A of shutter 147 is prevented from pivoting any further by the upper surface of disk D so that shutter 147 remains partly-open. As disk D is being drawn into changer/player 1000, shutter 147 slides along the upper surface of the disk. When disk D is inserted and transported to position P2, flap 147A falls away from the upper surface of disk D, closing shutter 147 due to the force of spring 149. Shutter 147 is prevented from rotating beyond the closed position (where flaps 147A blocks disk insertion aperture 1A) by stop 147C, whose movement is blocked by the inner surface of bend 100K of loading chassis 100.

Since shutter 147 can freely rotate toward the outside of changer/player 1000, disk-ejection is not inhibited, regardless of the position of the loading plates 104 and 140. When a disk is transferred to the front of changer/player 1000 and the edge of the disk engages with flap 147A, shutter 147 is pushed open and slides against the upper surface of the disk thereafter. The ejection of the disk causes loading plates 104 and 140 to move toward each other. When pin 129 of loading plate 104 engages with first arm 148B of shutter actuator 148, shutter actuator 148 rotates clockwise in tandem with the motion of loading plate 104, causing shutter 147 to lift away from the upper surface of the disk. Referring to FIG. 14, when the disk arrives at the eject position P5, loading plates 104 and 140 shift to disk receiving position POS.1, and shutter actuator 148 opens shutter 147 to a position that allows disk insertion into disk insertion aperture 1A.

A shutter piece 147D on the upper portion of shutter 147 is detected by an optical sensor 163B below loading chassis 100 to indicate the closing of shutter 147. The output from optical sensor 163B is a shutter close signal (signal S.CLOSE), which goes high ("H") when shutter 147 closes.

Figure 12:
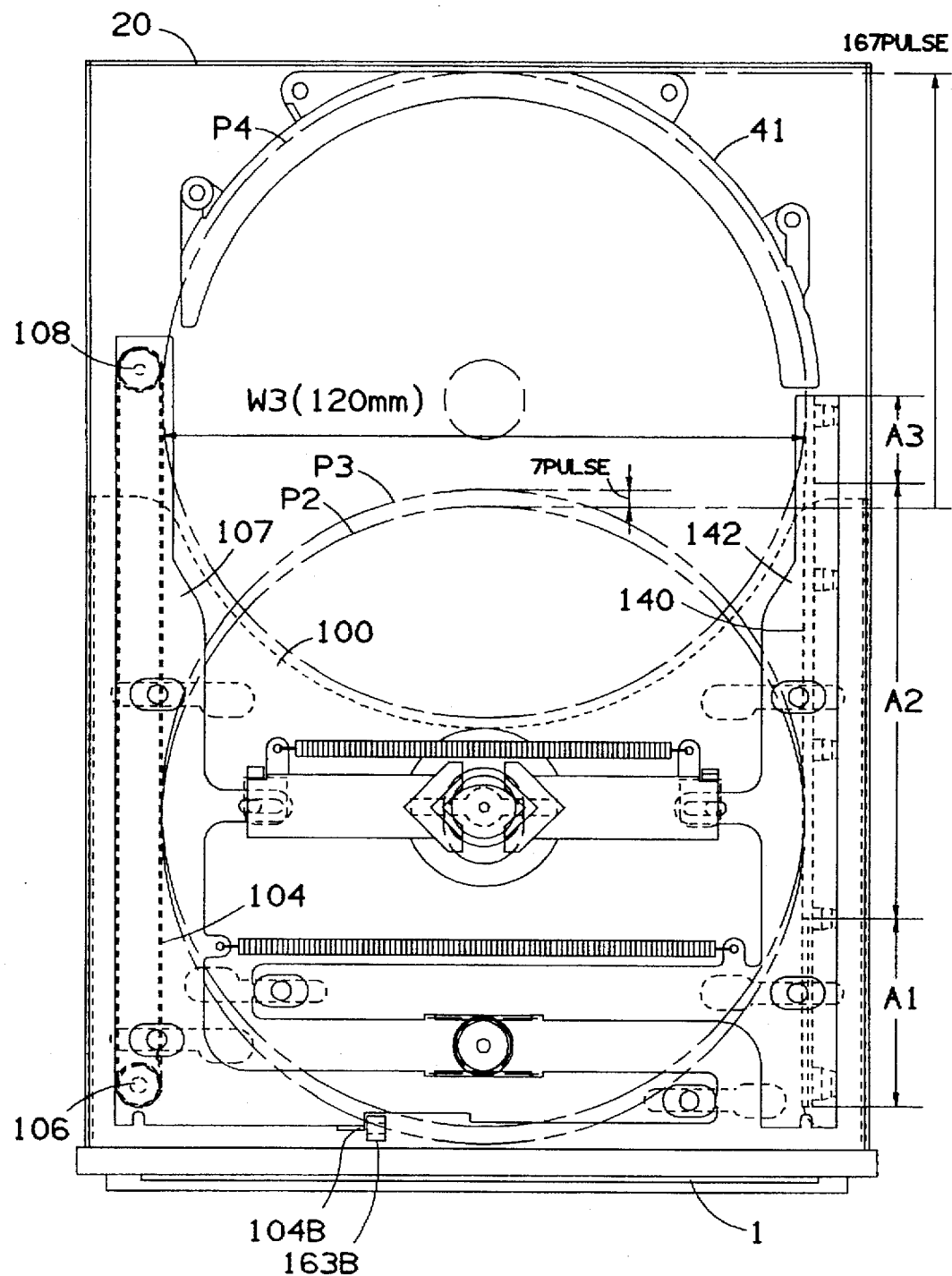
FIG. 12 is a plan-view of changer/player 1000 showing the disk in loading reference position P2, playback position P3, and stock position P4.

Disk playback position P3 and stock position P4 are detected by counting pulses in the output from optical sensor 163C (FIG. 9), signal $\overline{\text{L.PULSE}}$. Signal $\overline{\text{L.PULSE}}$ indicates the incremental displacement of the disk and position is calculated by counting signal $\overline{\text{L.PULSE}}$ after signal S.CLOSE goes high ("H"). Referring to FIG. 12, when disk D reaches reference position P2, after insertion, signal S.CLOSE changes to "H". Playback position P3 is indicated by a count of 7 pulses in signal $\overline{\text{L.PULSE}}$ after this reference position is indicated. Stock position P4 is indicated by a count of 167 pulses after the indication of the reference position.

Door Open/Close Mechanism

Referring to FIGS. 41–45, a door open/close mechanism 1015 selectively closes a door 11 over disk insertion aperture 1A. A protection sheet 12 is attached to the inner surface of door 11. Shafts 15A and 15B, pivotably connect door 11 with front panel 1. Door 11 has an upper end 11C that is slightly bowed to form a concave contour to prevent damage caused by contacting the recorded surface of disk D during insertion. A spring latch 11A on the right end of the inner surface of door 11, passes through a hole 1B of front panel 1 and attaches to another spring 13 described below. A shutter piece 1B passes through a hole 1C in front panel 1 to actuate an optical sensor 163I affixed to loading chassis 100. Optical sensor 163I indicates closure of door 11. The output from optical sensor 163I is a door closed signal (signal D.CLOSE) that goes high ("H") when door 11 closes. A disk grip 8 has a felt grip with a slit 8A, adhesively bonded to the inner surface of front panel 1. Slit 8A of disk grip 8 supports the disk when it is in the eject position, preventing the disk from dropping out of disk insertion aperture 1A.

Spring 13 consists of two coil springs 13', 13" connected by a bridging section 13B. Spring 13 rotates on a shaft 16 supported on the inside of front panel 1. To push door 11 closed, a first remote end 13A of coil spring 13" is inserted in a hole formed on spring latch 11A. A second remote end 13C of coil spring 13" engages with the inner surface of front panel 1. Bridging section 13B faces a nose portion 82D on a forward-facing end of UD cam 82 that engages bridging section 13B when UD cam 82 moves toward the front of changer/player 1000 past position DOWN-1 as described below. This urges door 11 open.

With door open/close mechanism 1015 as described above, door 11 is opened and closed according to the position of UD cam 82, as shown in FIG. 47. When UD cam 82 moves to position DOWN-2, bridging section 13B of spring 13 is forced forwardly by nose portion 82D of UD cam 82, opening door 11 toward the outside of changer/player 1000. Thus, even if the user forcibly closes door 11, coil spring 13 absorbs the force to prevent damage. When UD cam 82 moves from position DOWN-1 to position UP-2, nose portion 82D moves away from bridging section 13B of spring 13, so that spring 13 pulls door 11 closed.

Drive Control Circuit

Referring to FIGS. 48–60, a drive control circuit 1016 includes a system controller 300 comprising one or more microprocessors. Controller 300 includes a ROM, a RAM, interface circuits and other circuit elements. Controller 300 is connected to a computer 303 via mode keys 301, that include EJECT key-1 through EJECT key-4 for ejecting disks D held in slots 41A through 41D of stocker body 41, respectively. Controller 300 is connected to a computer 303 by an interface circuit 302. Controller 300 controls disk changer/player 1000 responsively to actuation of mode keys, commands from computer 303, and disk insertion, according to flow charts in FIGS. 49–66, described below.

Signals S.CLOSE, IN, and $\overline{\text{L.PULSE}}$ from optical sensors 163A, 163B, and 163C, respectively, are, applied controller 300. In response to these signals, controller 300 applies signal FRONT and signal REAR, to a motor drive circuit 304, to control the disk transfer position. Motor drive circuit 304 outputs prescribed drive voltages to a drive motor 190A of timing pulley drive mechanism 1004 (see FIG. 9). When signal FRONT goes high ("H"), a drive voltage is output to rotate timing pulley 106 clockwise. When signal REAR goes high ("H"), an opposite drive voltage is output. Also, motor drive circuit 304 short-circuits the output when both signals are "H" to electromagnetically brake motor 190A. When both signals go low ("L"), the motor leads are isolated and motor 190A can freewheel.

Signal $\overline{\text{P.PULSE}}$ and signal $\overline{\text{P.REF}}$ output by optical sensors 163D and 163E, respectively, are applied to controller 300. In response to these signals, controller 300 applies signals P.UP and P.DOWN to motor drive circuit 305 to control motor 190B to control the positions of UD cams 197 and 82. Motor drive circuit 305 is a driver circuit that outputs prescribed drive voltages to a drive motor 190B of optical mechanism elevator 1008 (FIG. 16). When signal P.UP goes high ("H"), a drive voltage is output to move UD cam 197 in the up direction (toward the front of changer/player 1000). When signal P.DOWN goes high ("H"), an opposite drive voltage is output. When both signals go high ("H"), motor drive circuit 305 short-circuits the motor leads electromagnetically braking motor 190B. When both signals go low ("L"), the leads are open and motor 190B freewheels.

Figure 26:
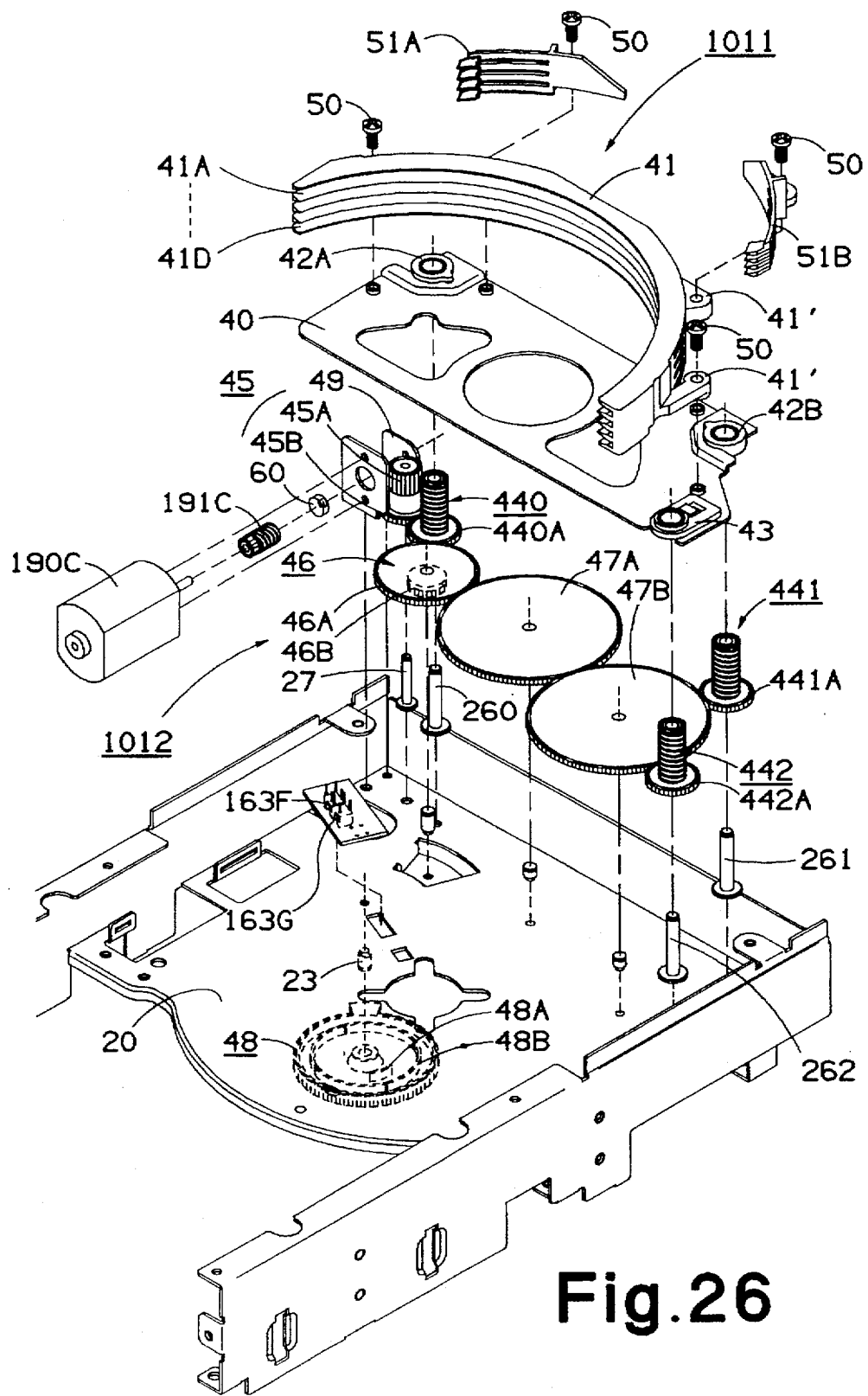
FIG. 26 is an exploded view of the structures of stocker 1011 and stocker elevator mechanism 1012.
Figure 27A:
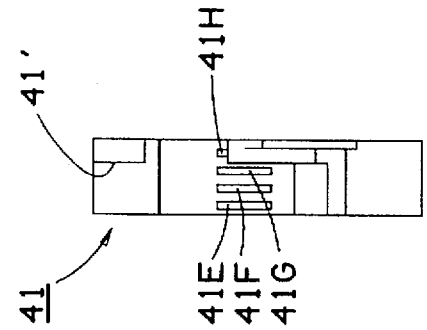
FIGS. 27(A) is a rear view of a stocker body 41.
Figure 27B:
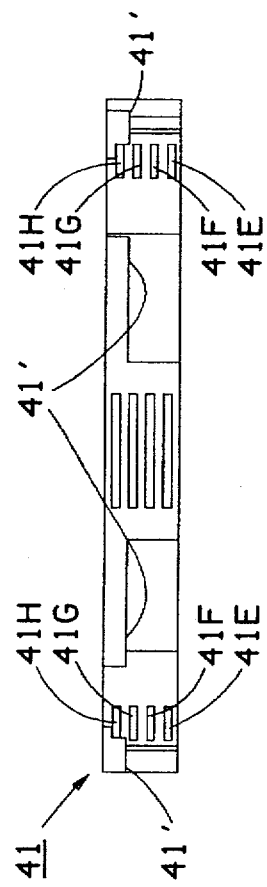
FIGS. 27(B) is a plan view of a stocker body 41.
Figure 27C:
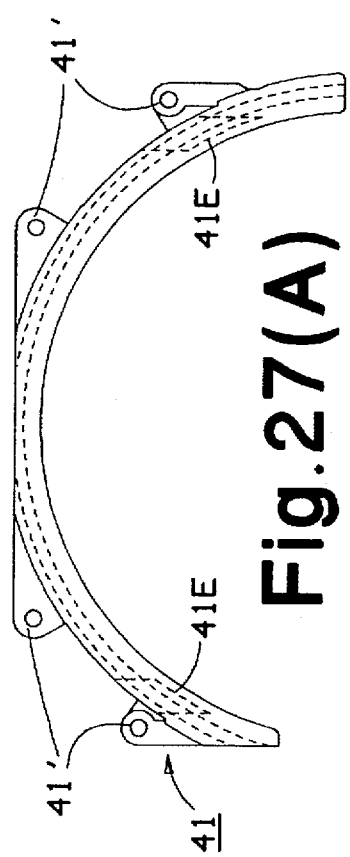
FIGS. 27(C) is a side view of a stocker body 41.
Figure 27D:
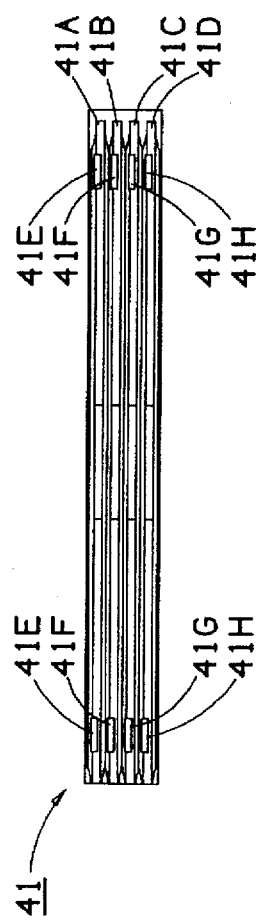
FIGS. 27(D) is a front view of a stocker body 41.
Figure 28A:
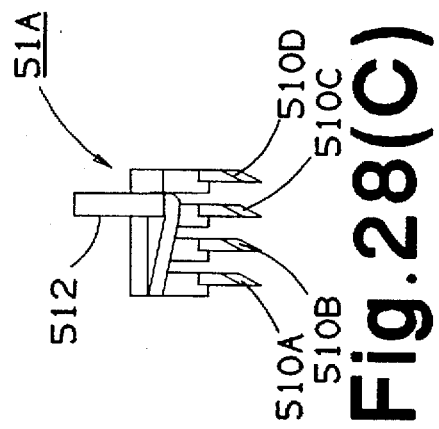
FIG. 28(A) is a plan view of a wedge member 51A.
Figure 28B:
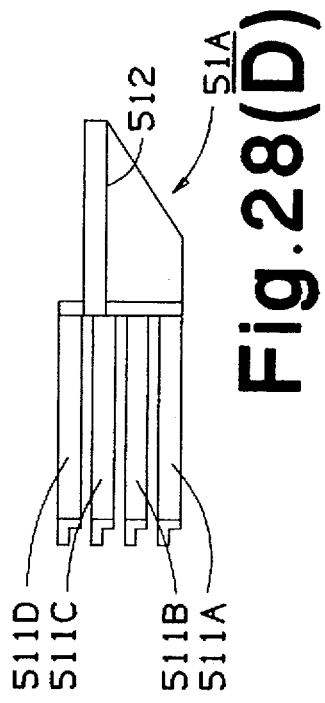
FIG. 28(B and D) are left and right side views of a wedge member 51A.
FIG. 28(C) is a front view of a wedge member 51A.
Figure 28C:
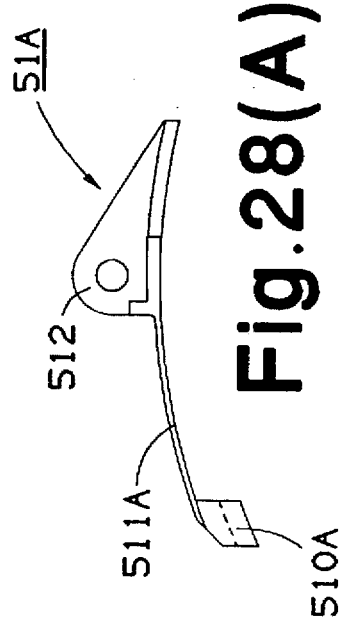
Figure 28D:
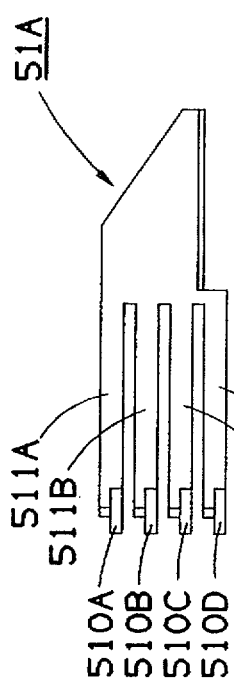
Figure 29:
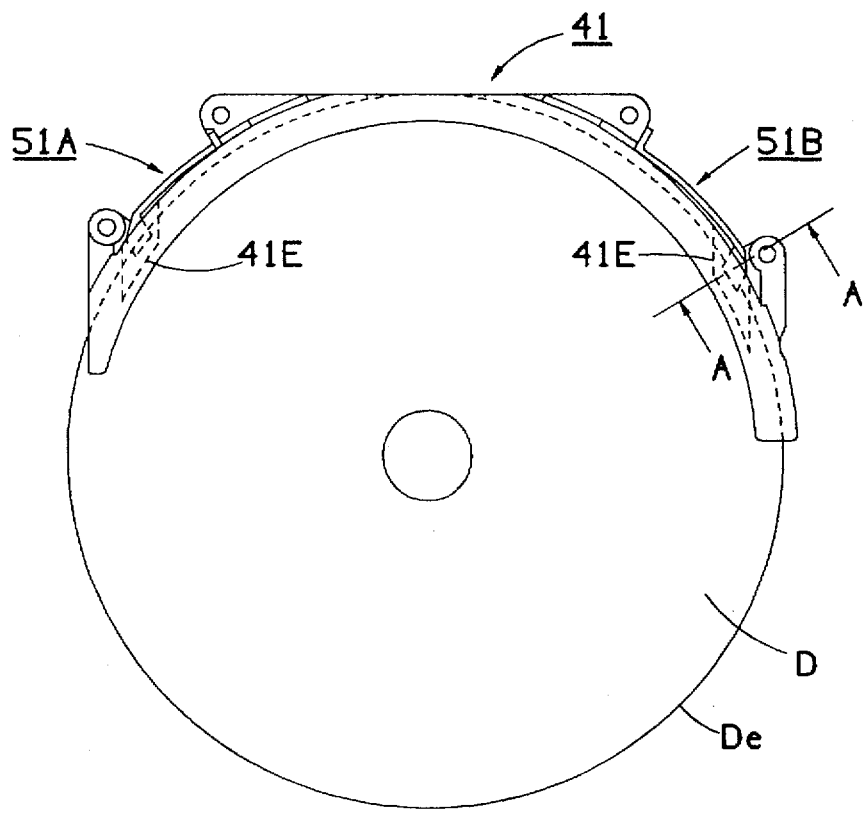
FIG. 29 is a plan-view of stocker body 41 with wedge members 51A, 51B showing disks stored within the stocker.
Figure 30:
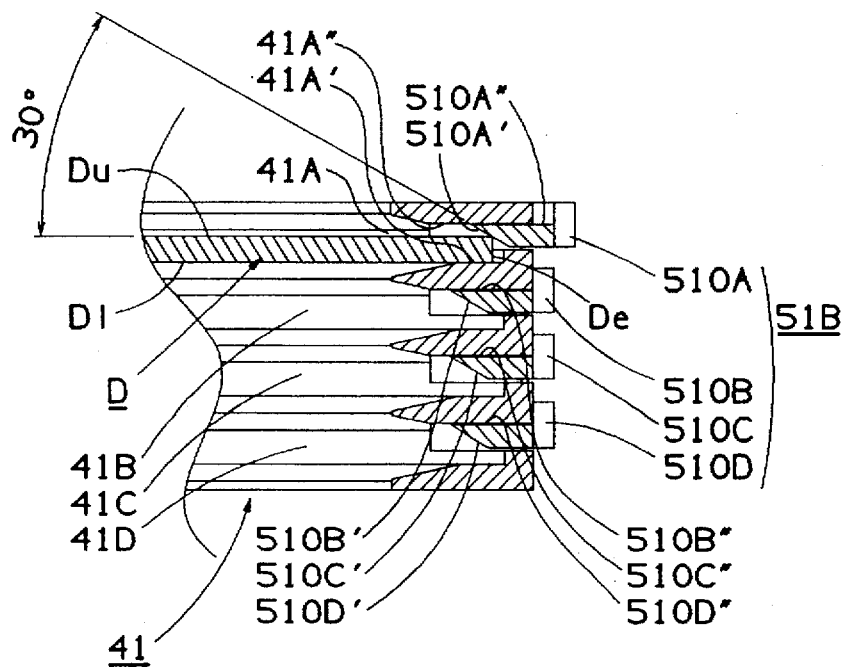
FIG. 30 is a section view taken along section line A—A in FIG. 29.

Signal $\overline{\text{S.REF}}$ and signal $\overline{\text{S.POS}}$ are applied by optical sensors 163F and 163G, respectively, to controller 300. In response to these signals, signals ST.UP and signal ST.DOWN are output to control the output of a motor drive circuit 306, which controls the vertical position of stocker 1011. Motor drive circuit 306 is a driver circuit that outputs prescribed voltages to drive motor 190C of stocker elevator mechanism 1012 (FIG. 26). When signal ST.UP goes high ("H"), a drive voltage is output to raise stocker 1011, and when signal ST.DOWN goes high ("H"), an opposite drive voltage is output. When both signals go high ("H"), motor drive circuit 306 short-circuits the motor leads and electromagnetically braking motor 190C. When both signals go low ("L"), the leads are opened permitting motor 190C to freewheel. Signal $\overline{\text{D.LOCK}}$ and signal $\overline{\text{D.CLOSE}}$ are applied by optical sensors 163H and 163I, respectively, to controller 300. These signals indicate the status of lock sleeve 62 and door 11. A back-up power supply (not shown in the drawings) is connected to controller 300 so that when the main power-supply is off, the stocker position, the flags indicating presence of disks, etc. are stored in RAM.

The read signal read by optical pickup 210 is applied to a signal processing circuit 307 via a RF amp 309, and EFM demodulation, de-interleaving, error correction and the like are performed. The resulting signal is applied to computer 303 via interface circuit 302. Based on a servo error signal from optical pickup 210, servo circuit 308 controls the focus servo, tracking servo and the feed servo for optical pickup 210. This allows the light beam to follow the data tracks on disk D. Signal processing circuit 307 and servo circuit 308 are connected to controller 300 and are controlled according to the operating mode.

Description of Control Procedures

Referring to FIGS. 49–66, the operation of changer/player 1000 is described by flow charts. In the flowcharts, "n" indicates the stocker position. D.FLAG(n) is a flag that indicates the presence of a disk in a respective slot 41A–41D (see FIG. 26). D.FLAG(1) is set to 1, to indicate a disk is present in slot 41A, and to 0 when slot 41A is empty. D.FLAG(2) is set to 1, to indicate a disk is present in slot 41B, and to 0 when slot 41B is empty. D.FLAG(3) is set to 1, to indicate a disk is present in slot 41C, and to 0 when slot 41C is empty. D.FLAG(4) is set to 1, to indicate a disk is present in slot 41D, and to 0 when slot 41D is empty.

M.FLAG is a flag that indicates the current operating mode. When M.FLAG is set to "READY", the changer/player is in a disk receiving mode. Loading plates 104 and 140 placed in disk receiving position POS.1, and door 11 is open. When M.FLAG is set to "CLOSE", loading plates 104, 140 are brought to disk receiving position POS.1, but door 11 is closed. When M.FLAG is set to "PLAY", changer/player 1000 is in playback mode for playing back a disk. When M.FLAG is set to "STAND-BY", a disk is clamped on the optical mechanism, but changer/player 1000 is in stand-by mode, where disk playback is halted. When M.FLAG is set to "STOCK", changer/player 1000 is in a stop mode. A disk is transferred to the stock position, and loading plates 104 and 140 are brought to open position POS.3.

Main Flow

Figure 49:
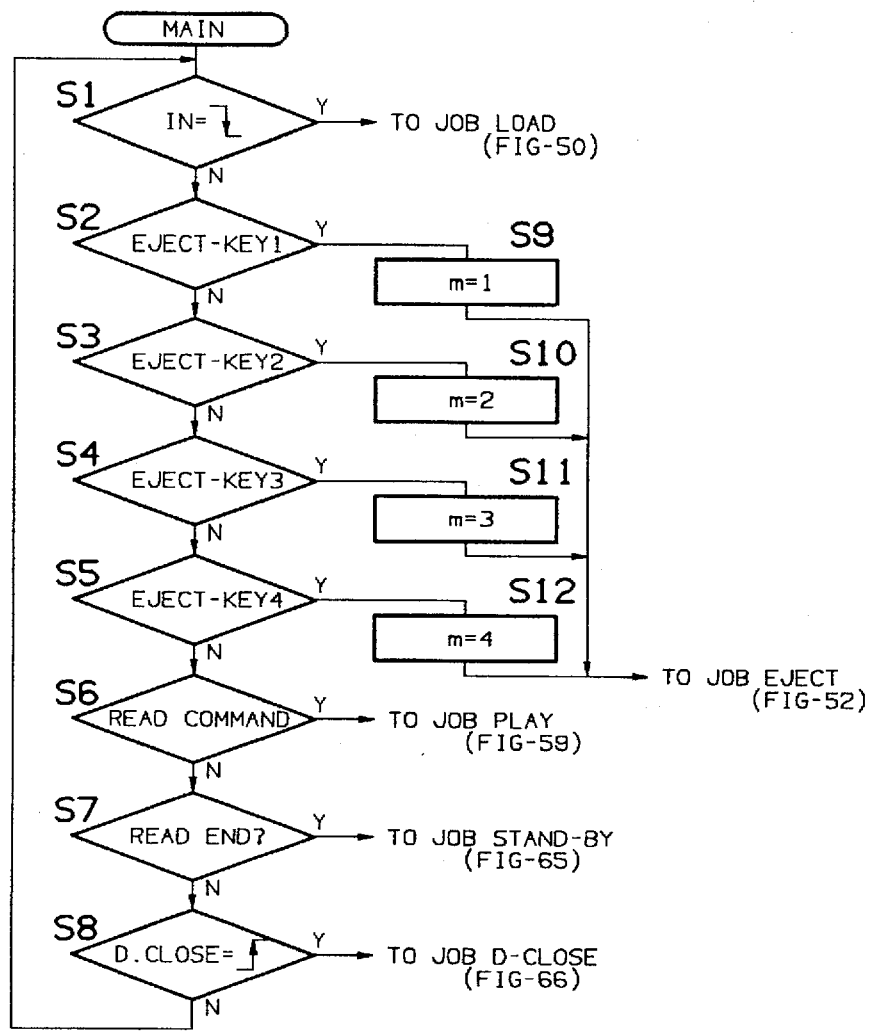
FIG. 49 is a flowchart showing a main routine executed by controller 300.

When the power supply is turned on, controller 300 performs a set of prescribed initialization procedures and then proceeds to the main routine defined by the flowchart of FIG. 49. In a loop including steps S1–S8, controller 300 monitors for: a change in signal IN to "L" (disk insertion detection), user activation of one of EJECT keys 1–4; a read command applied by computer 303; a read end; or a change in signal D.CLOSE to "H" (detection of forcible closure of door 11).

Disk Loading Operation

When changer/player 1000 is in disk receiving mode and disk D is inserted through disk insertion aperture 1A loading plates 104 and 140 are driven apart. Referring to FIG. 11, when disk D is inserted to position P1, the output from optical sensor 163B, (signal IN), goes low "L". Controller 300 then proceeds from step S1 to procedure JOB LOAD shown in FIG. 50. Controller 300 then begins a loading operation which transports disk D to stock position P4. With the movement of loading plate 104, shutter actuator 148 rotates counter-clockwise and shutter 147 rotates toward the inside of changer/player 1000. Thus, when the disk is inserted to a certain point, flap 147A of shutter 147 drops to the upper surface of the disk, sliding against the upper surface of disk D as disk D is transported further inside changer/player 1000.

In the event that user forcibly pulls open closed door 11 and inserts a disk, as disk D is being forcibly inserted, because door 11 is not held open, door 11 will scrape against the lower surface of the disk as spring 13 tries to pull it closed. As described above, upper end 11C of door 11 is bow-shaped so that the center is lower than the ends. Therefore, upper end 11C engages only the edges of the lower surface of the disk, helping to prevent door 11 from scraping the recorded surface, which is offset from the very edges of disk D. However, it is not unlikely that, during a forced insertion, that the user will bend the disk causing the recorded surface to scrape against door 11. To eliminate damage in this event, procedure JOB LOAD opens door 11 during forced insertion. The forced insertion of disk D causes signal IN changes to "L" initiating procedure JOB LOAD whose entry point is step S20. First, controller 300 checks to see if M.FLAG is set to "CLOSE". If M.FLAG is set to "CLOSE", UD cams 197 and 82 are moved from position DOWN-1 to DOWN-2, and door 11 is opened at steps S21–S27.

The following are the details of steps S21–S27. At step S21, controller 300 sets signal P.UP to "H", and, at step S22, waits for signal P.REF to change to "H". When signal P.UP goes high ("H"), drive motor 190B (FIG. 16) of optical mechanism elevator 1008 is rotated and UD cams 197 and 82 move toward the UP position. When signal P.REF goes high ("H"), controller 300 sets signal P.UP to "L" and signal P.DWN to "H", at step S23, and waits for signal P.REF to change to "L" at step S24. Drive motor 190B, in optical mechanism elevator 1008, is rotated in reverse and UD cams 197 and 82 move toward the DOWN position. The reverse rotation of UD cams 82 and 197 cause signal P.REF to change to "L". At step S25 controller 300 begins counting the pulses from signal P.PULSE until the pulse count reaches "32" at step S103. UD cams 82 and 197 move in the opposite direction to the reference position and then to position DOWN-2 to avoid cumulation of error in the count of signal P.PULSE attending repeated movement of UD cams between position DOWN-2 and DOWN-1.

When the count value reaches "32", it indicates to controller 300 that UD cams 82 and 197 have arrived at position DOWN-2. At step S27, signals P.UP and signal P.DWN are set to "H" for 50 msec. electromagnetically braking motor 190B and stopping UD cams 197 and 82. Thus, when UD cams 197 and 82 are brought to position DOWN-2, door 11 is opened as described above (see FIG. 42).

Figure 51:
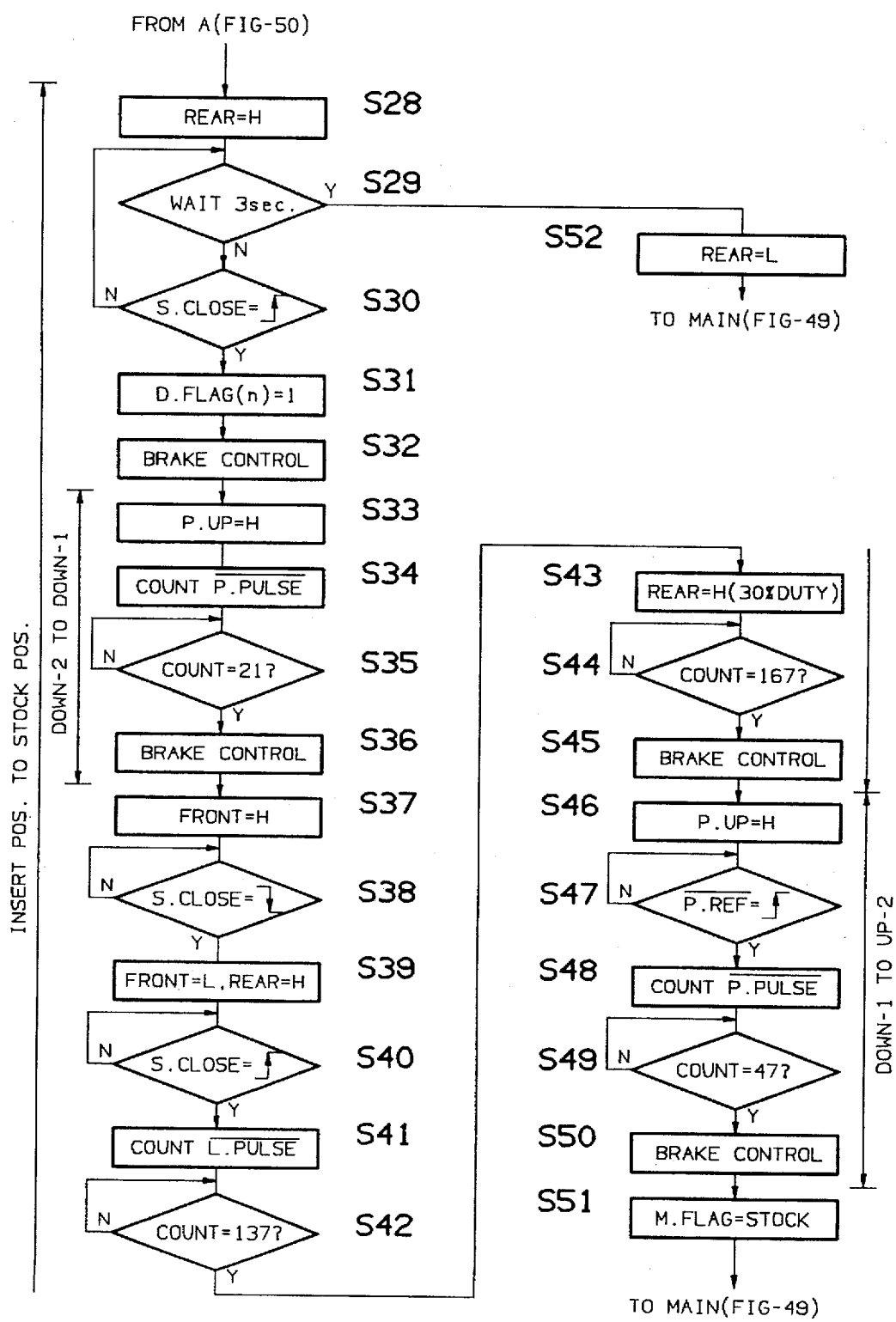
FIG. 51 is a flowchart showing another portion of procedure JOB LOAD.

After step S27 is completed, or after step S20 when M.FLAG is not set to "CLOSE" (it is normally set to "EJECT"), controller 300 proceeds to step S28 in FIG. 51. When signal REAR is set to "H", in the loop of steps S29–S30, controller 300 waits 3 seconds for signal S.CLOSE to go high ("H"). When signal REAR goes high ("H"), drive motor 190A of disk transfer mechanism 1001 (see FIG. 9) rotates causing timing belt 107 to rotate counter-clockwise. The inserted disk D is rolled clockwise along friction belt 142 as it is transported toward the rear of changer/player 1000. If signal S.CLOSE fails to go high ("H") within three seconds, it indicates to controller 300 that the inserted disk cannot be transferred into changer/player 1000 and signal REAR is changed to "L" at step S52 to halt the loading procedure. Then, controller 300 returns to the main routine in FIG. 49.

If disk transfer proceeds normally and the disk arrives at reference position P2 (FIG. 12), then shutter 147 begins to close and signal S.CLOSE goes high ("H"). At step S31, controller 300 sets disk presence flag D.FLAG(n) to "1". At step S32, signal FRONT and signal REAR are set to "H" for 50 msec. electromagnetically braking motor 190A to temporarily stop disk transfer. At steps S33–S36, UD cams 197 and 82 move from position DOWN-2 to position DOWN-1, and door 11 is closed.

At step S33, controller 300 sets signal P.UP to "H", and then at step S34 begins counting the pulses from the output (signal P.PULSE) from optical sensor 163D. At step S35, controller 300 waits for the pulse count to reach "21". When signal P.UP goes high ("H"), drive motor 190B (FIG. 16) of optical mechanism elevator 1008 is rotated and UD cams 197 and 82 move toward the UP position. When the pulse count reaches "21", it indicates to controller 300 that UD cams 82 and 197 have arrived at position DOWN-1. At step S36, signal P.UP and signal P.DWN are set to "H" for 50 msec. electromagnetically braking motor 190B to halt the motion of UD cams 82 and 197. When UD cams 82 and 197 have arrived at position DOWN-1, door 11 is closed, as described above (see FIG. 43). Lock sleeve 62 is in the unlock position (see FIGS. 33 and 37), allowing disks to be transferred to the stocker.

At step S37, controller 300 sets signal FRONT to "H", initiating disk transfer again. At step S38 controller 300 waits for signal S.CLOSE to change to "L". The change in signal FRONT to "H" causes disk transfer mechanism 1001 to rotate timing belt 14 clockwise, which causes inserted disk D to move toward the front of changer/player 1000 as it rotates counter-clockwise. The force of disk D causes shutter 147 to begin to open toward the outside of changer/player 1000. When signal S.CLOSE changes to "L", at step S39, controller 300 sets signal FRONT back to "L" and sets signal REAR to "H". At step S40, controller 300 waits for signal S.CLOSE to change to "H" again. When signal REAR is set to "H", disk transfer mechanism 1001 rotates timing belt 14 counter-clockwise, and the inserted disk D is transported toward the rear of changer/player 1000 again.

As disk D is transported toward the front of changer/player 1000, shutter 120 begins to close and signal S.CLOSE goes high ("H"). At step S41, controller 300 begins counting the pulses from the output (L.PULSE) of optical sensor 163C. At step S42, controller 300 waits for the pulse count to reach "137". The disk is transported as it rolls counter-clockwise along friction belt 142. The pulse count representing the stock position is not affected, even if there is disk overrun due to a temporary halt (step S32). When the pulse count reaches "137", it indicates to controller 300 that disk D is near stock position P4. At step S42, signal REAR is pulsed at a 30 percent duty cycle to lower the disk transfer speed. At step S44, controller 300 waits for the pulse count to reach "167". When the pulse count reaches "167", it indicates to controller 300 that the disk has arrived at stock position P4. At step S45, signal FRONT and signal REAR are set to "H" for 50 msec., electromagnetically braking motor 190A to stop the disk transfer.

Figure 13:
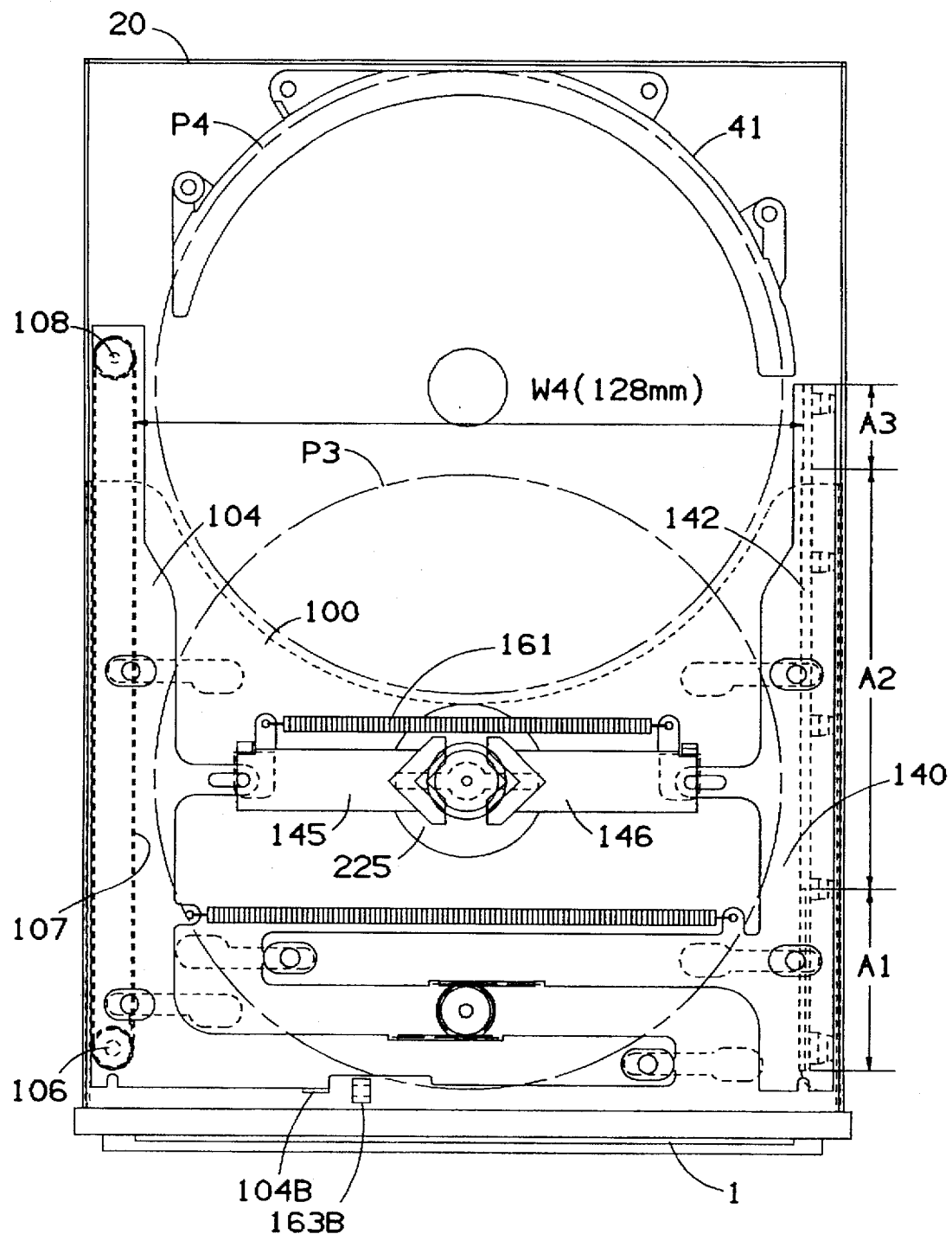
FIG. 13 is a plan-view of disk transfer mechanism 1001 in an open position POS.3.

Next, in steps S46–S50, controller 300 moves UD cams 197 and 82 from position DOWN-1 to position UP-2, and loading plates 104 and 140 are separated to open position POS.3 (see FIG. 13). At step S46, controller 300 sets signal P.UP to "H", and then waits for signal P.REF to change to "H" at step S47. When signal P.UP goes high ("H"), drive motor 190B (FIG. 16) of optical mechanism elevator 1008 rotates, and UD cams 197 and 82 move toward the UP position. When signal P.REF goes high ("H"), controller 300 begins counting pulses in signal P.PULSE at step S48. Controller 300 waits for the pulse count to reach "47" at step S49. When the pulse count reaches "47", it indicates to controller 300 that UD cams 82 and 197 have arrived at position UP-2. At step S50, signal P.UP and signal P.DWN are set to "H" for 50 msec., electromagnetically braking motor 190B to stop UD cams 197 and 82. When UD cams 197 and 82 arrive at position UP-2, loading plates 104 and 140 are separated to open position POS.3 by loading plate cam 186 and belts 107 and 142 move away from edge De of the transfer disk (see FIG. 25).

With the above procedures, controller 300 completes the disk loading operation. Finally, at step S51, M.FLAG is set to "STOCK" and controller 300 returns to the main routine defined by the flowchart of FIG. 49.

Control Procedures Responsive to the EJECT Keys

The following is a description of the procedure followed when one of EJECT key 1 through EJECT key 4 is pressed.

Briefly, when an EJECT key corresponding the current stocker position is pressed, controller 300 opens the door and brings the disk in the transport plane, which is either in the playback position or in the stock position, out to the eject position. When there is no disk present at the location corresponding to the EJECT key number, the controller responds to the EJECT key entry only by opening or closing door 11. If the EJECT key pressed corresponds to a position that is different from the current stocker position, controller 300 moves the stocker to the corresponding position, the door is opened, and the disk in the stocker is brought to the eject position. If there is no disk corresponding to the EJECT key, the controller moves the stocker to the corresponding position, opens the door, and goes into the disk receiving mode.

Control Procedures Responsive to the EJECT Keys During Stock Mode

If one of EJECT keys 1–4 is pressed while changer/player 1000 is in stock mode, a memory "m" is set to a number corresponding the EJECT key pressed. This happens at the corresponding step in the range S9–S12. Referring to FIGS. 52–58, controller 300 then proceeds to flowchart JOB EJECT. If M.FLAG is set to "STOCK", controller 300 goes from step S70 to step S71, and checks to see if the values of m and n are identical to see if the EJECT key that was pressed has the same number as the current stocker position.

Figure 53:
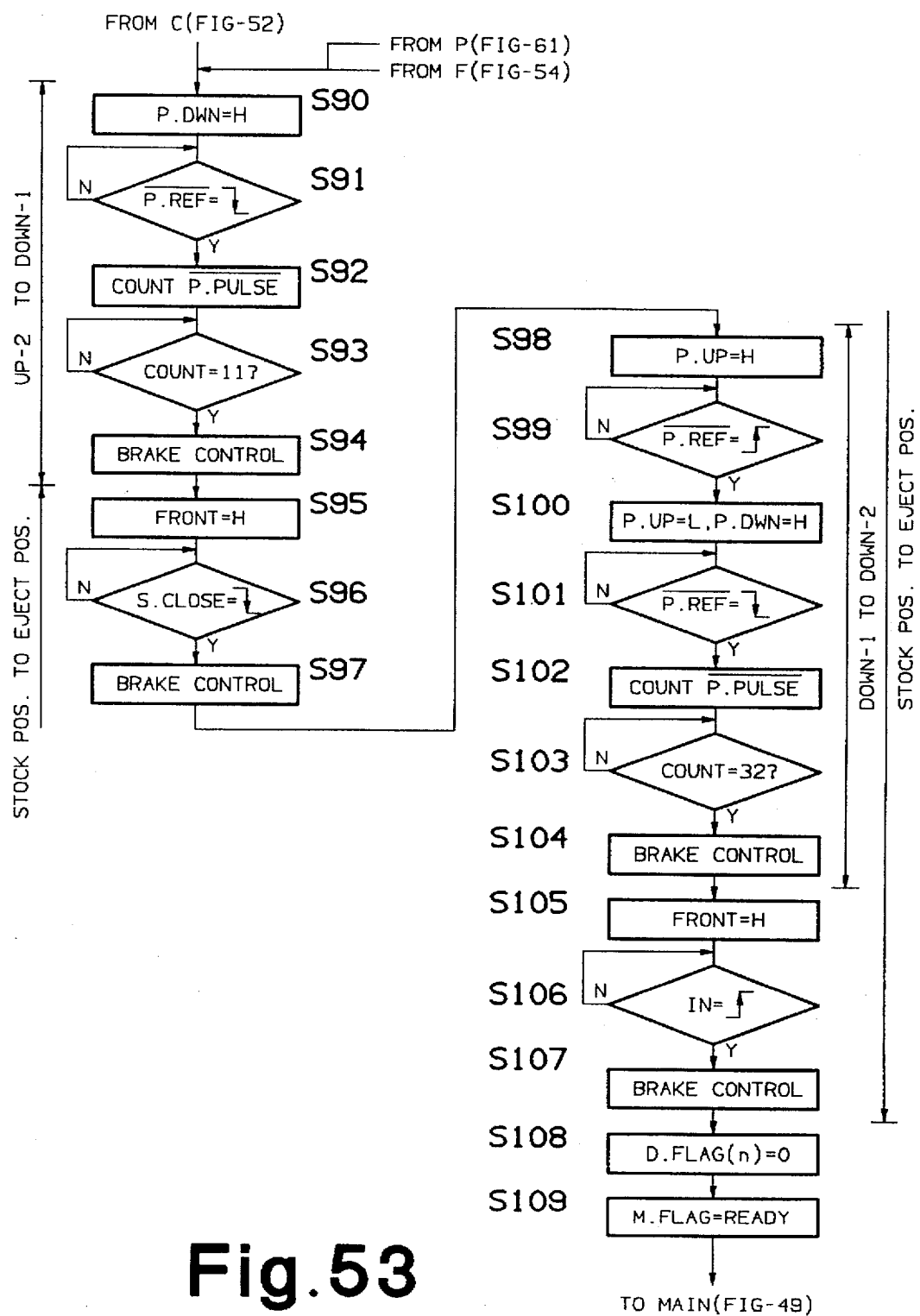
FIG. 53 is a flowchart showing another portion of procedure JOB EJECT.

When m and n are identical, controller 300 moves UD cams 197 and 82 from position UP-2 to position DOWN-1 in steps S90–S94, shown in FIG. 53. At step S90, controller 300 raises signal P.DWN to "H" and waits for signal $\overline{\text{P.REF}}$ to change to "L" at step S91. When signal P.DWN goes high ("H"), drive motor 190B (FIG. 16) of optical mechanism elevator 1008 rotates, and UD cams 197 and 82 move toward the DOWN position. Once signal $\overline{\text{P.REF}}$ changes to "L", controller 300 begins counting the output from signal $\overline{\text{P.PULSE}}$ at step S92. At step S93, controller 300 waits for the pulse count to reach "11", which indicates to controller 300 that UD cams 82 and 197 have been brought to position DOWN-1. At step S94, signals P.UP and P.DWN are set high ("H") for 50 msec. electromagnetically braking motor 190B causing UD cams to stop moving. As UD cams 197 and 82 move to position DOWN-1, loading plates 104 and 140 converge to disk support position POS.2, urged by spring 160. This causes drive-side and fixed-side disk guides 1002 and 1003 to converge about disk D and support it. In position POS.2, disk D is supported within stocker body 41. Lock sleeve 62 is brought to the unlock position (see FIGS. 33 and 37), allowing the supported disk to be drawn out from the stocker.

In steps S95 through S107, controller 300 brings a stored disk within the stocker to the eject position. First, at step S95, controller 300 sets signal FRONT to "H", and waits for signal S.CLOSE to change to "L" at step S96. When signal FRONT is set to "H", drive motor 190A (FIG. 9) of disk transfer mechanism 1001 is rotated causing timing belt 107 to rotate clockwise. Inserted disk D rolls counter-clockwise along friction belt 142 and the disk is transferred toward the front of changer/player 1000. Referring to FIG. 12, when the disk is brought to position P2, the force of disk D begins to open shutter 147 causing signal S.CLOSE to go low ("L"). At step S97, controller 300 sets signal FRONT and signal REAR high ("H") for 50 msec., electromagnetically braking motor 190A. The transfer of the disk is halted temporarily and the disk is prevented from engaging with door 11.

Next, in steps S98–S104, which are identical to steps S20–S27 (FIG. 50) described above, UD cams 197 and 82 move from position DOWN-1 to DOWN-2 pushing door 11 open. The details of this operation are the same as described above, so they will not be repeated. At step S105, controller 300 sets signal FRONT to "H", and disk transfer begins again. At step S106, controller 300 waits for signal IN to go high ("H"). When signal FRONT changes to "H", disk transfer mechanism 1001 transports disk D toward the front of changer/player 1000 rolling it counter-clockwise along friction belt 142. Loading plates 104 and 140 begin gradually to close as the disk is pushed through disk insertion aperture 1A and beyond front panel 1. Referring to FIG. 11, when the disk arrives at position P1, signal IN is high ("H"), to indicate to controller 300 that the disk has been brought roughly to the eject position. At step S107, signal FRONT and signal REAR are set to "H" for 50 msec. electromagnetically braking motor 190A and disk transfer is halted. The inertia of the disk causes it to overrun slightly after it is transported to the eject position. This causes disk D to come to a halt approximately at eject position P5, where loading plates 104 and 142 are fully closed to disk receiving position POS.1. With the operation described above, controller 300 completes the disk eject procedure. At step S108, D.FLAG (n) is set to "0" (clear). At step S109, M.FLAG is set to "READY", and controller 300 returns to the main routine defined by the flowchart of FIG. 49.

Figure 52:
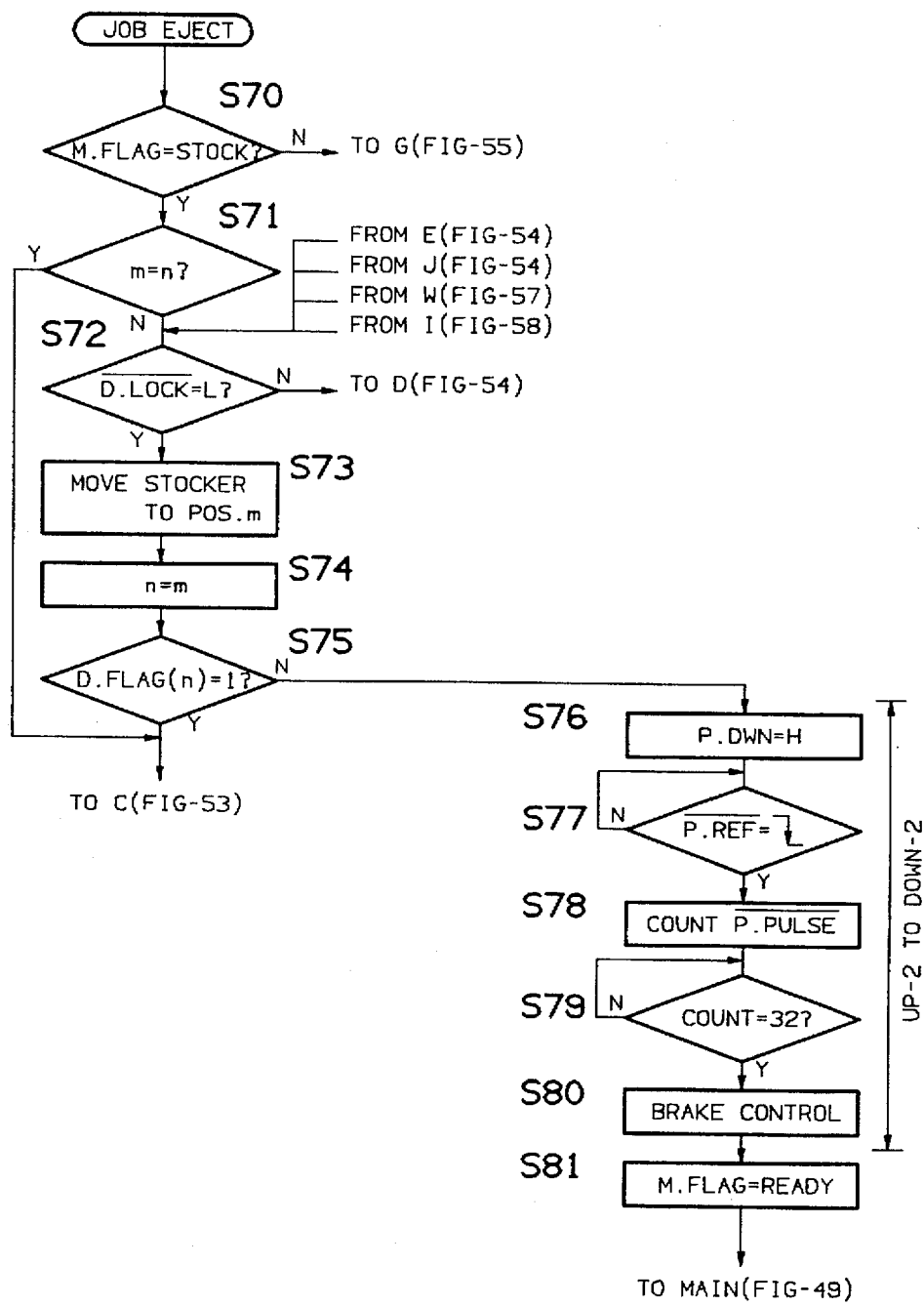
FIG. 52 is a flowchart showing a portion of a procedure JOB EJECT.

Referring to FIG. 52, if the values of m and n are not identical at step S71, controller 300 first checks the output of optical sensor 163H (signal $\overline{\text{D.LOCK}}$) at step S72. If signal $\overline{\text{D.LOCK}}$ is low ("L"), it indicates lock sleeve 62 is in the lock position. If signal $\overline{\text{D.LOCK}}$ is "L", controller 300 monitors the stocker reference position signal ($\overline{\text{S.REF}}$) and the stocker position signal ($\overline{\text{S.POS}}$) at step S73. Stocker 1011 is moved to position POS(m) indicated by the EJECT key m entry. For example, if EJECT key 4 was pressed, stocker 1011 would move to position POS(4) to align slot 41D with the transport plane. When the stocker arrives at the specified position, controller 300 makes constant n, which indicates the current stocker position, equal to the value of m. At step S75, controller 300 checks to see if D.FLAG(n) is "1", i.e. whether there is a disk in POS(n). If flag D.FLAG(n) is "1", indicating a disk is present, controller 300 proceeds to step S90, shown in FIG. 53, and disk eject procedures begin.

If, at step S75, D.FLAG(n) is "0", indicating POS(n) is empty, then controller 300 proceeds to step S76, and disk receiving procedures begin, putting changer/player 1000 in disk receiving mode. First, at step S76, controller 300 sets signal P.DWN high ("H"), and then waits for signal $\overline{\text{P.REF}}$ to change to "L" at step S77. When signal P.DWN goes high "H", drive motor 190B of optical mechanism elevator 1008 is rotated, and UD cams 197 and 82 move in the DOWN direction. The movement of UD cams 197 and 82 changes signal $\overline{\text{P.REF}}$ to "L", so controller 300 begins counting the pulses of signal $\overline{\text{P.PULSE}}$ at step S78. At step S79, controller 300 waits for the pulse count to reach "32". When the pulse count is "32", it indicates to controller 300 that UD cams 82 and 197 have arrived at position DOWN-2. At step S80, signal P.UP and signal P.DWN are set to "H" for 50 msec. electromagnetically braking motor 190B, stopping UD cams 197 and 82. Loading plates 104 and 140 are held in a closed, disk receiving position POS.1, by spring 160. Shutter 147 is open and door 11 is open.

The above procedures, followed by controller 300, complete the disk receiving operation. At step S81, controller 300 sets M.FLAG to "EJECT", and then returns to the main routine defined by the flowchart of FIG. 49.

Disk Lock Error/Re-Load Operation

Figure 54:
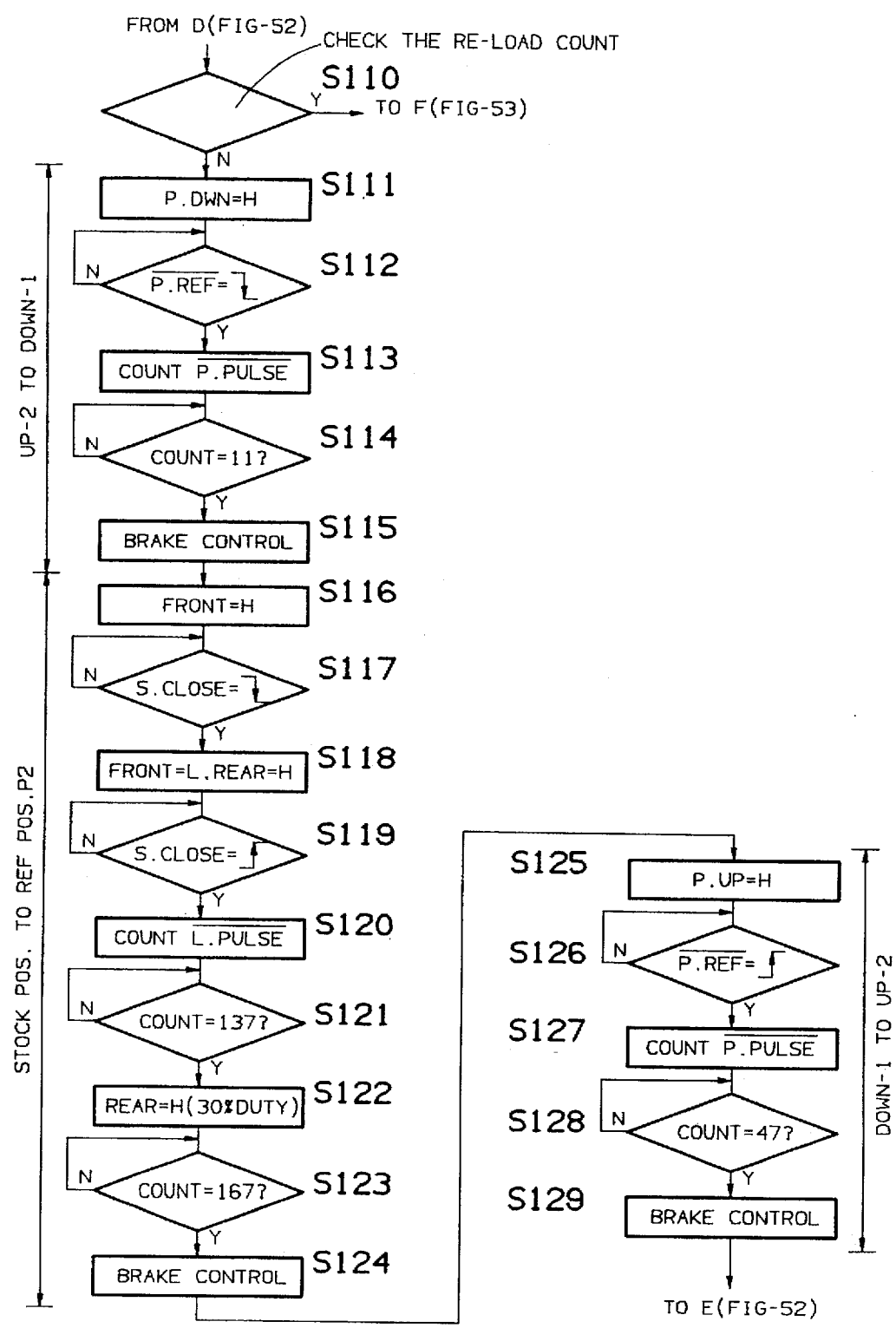
FIG. 54 is a flowchart showing another portion of procedure JOB EJECT.
Figure 55:
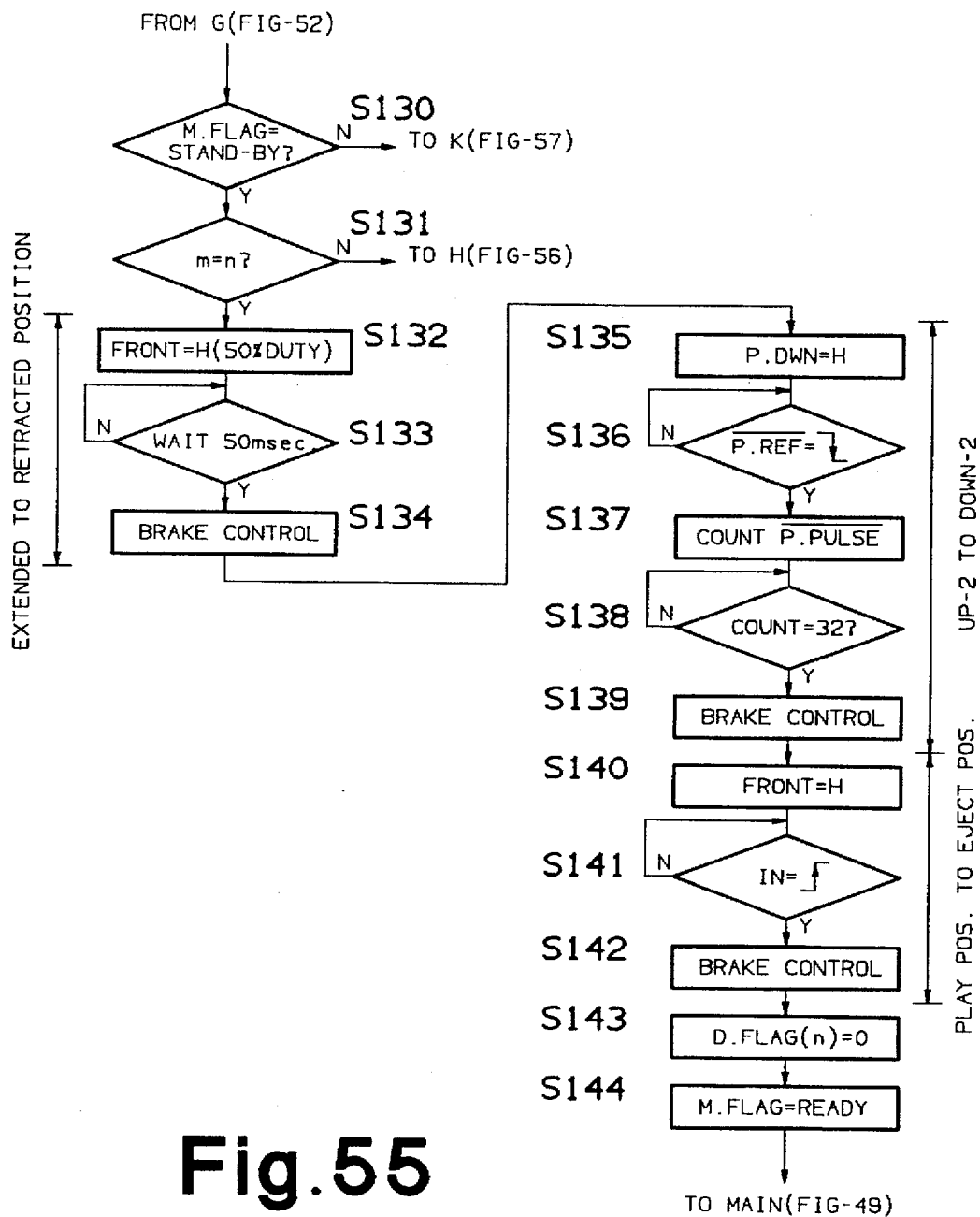
FIG. 55 is a flowchart showing another portion of procedure JOB EJECT.

Referring to FIG. 52, if, at step S72, D.LOCK is "H", indicating lock sleeve 62 has not reached the lock position, controller 300 proceeds to step S110 in FIG. 54. As discussed earlier, this situation arises when disk D is misaligned. To deal with this situation, disk D is transported to reference position P2 (see FIG. 12) and the loading operation repeated to bring disk D back to stock position P4.

At step S110, controller 300 checks the re-load count, the number of attempts that have been made to correct the misalignment. In steps S111–S115, exactly as in steps S90–S94 (see FIG. 53), UD cams 197 and 82 move from position UP-2 to DOWN-1. Loading plates 104 and 140 move to disk supporting position POS.2, and lock sleeve 62 is retracted to the unlock position. The details of this operation are the same as previous described above, so the details are not repeated.

In steps S116–S124, controller 300 moves the misaligned disk to reference position P2, and returns the disk to stock position P4. First, at step S116, controller 300 sets signal FRONT to "H" and waits for signal S.CLOSE to change to "L" at step S117. When signal FRONT is set to "H", drive motor 190A (FIG. 9) of disk transfer mechanism 1001 is rotated, revolving timing belt 107 clockwise. The disk is transported toward the front of changer/player 1000 as it rolls counter-clockwise along friction belt 142. Referring to FIG. 12, when the disk is brought to reference position P2, the pressure from the disk causes shutter 147 to begin to open, and signal S.CLOSE changes to "L". Then, at step S118, controller 300 sets signal FRONT to "L", and signal REAR to "H". At step S119, controller 300 waits for signal S.CLOSE to change to "H".

The transport of disk D back toward the rear of changer/player 1000 causes shutter 147 to begin to close. When signal S.CLOSE goes high ("H"), controller 300 begins counting signal L.PULSE at step S120. At step S121, controller 300 waits for the pulse count to reach "137". When the pulse count reaches "137", it indicates to controller 300 that disk D has arrived in the vicinity of the stock position. At step S122, signal REAR is pulsed at a 30 percent duty cycle to lower the disk transfer speed. At step S123, controller 300 waits for the pulse count to reach "167". When the pulse count reaches "167", it indicates to controller 300 that the disk has arrived at the stock position. At step S124, signal FRONT and signal REAR are set to "H" for 50 msec. electromagnetically braking motor 190A, and halting disk D.

In steps S125–S129, exactly as in steps S46–S50 described above (see FIG. 51), controller 300 moves UD cams 197 and 82 from position DOWN-1 to position UP-2. Loading plates 104 and 140 move to open position POS.3 (see FIG. 13), and lock sleeve 62 is raised. The details of steps S125–S129 are the same as the previous description so they are not repeated.

In the above procedures, controller 300 completes a reloading operation and returns to step S72 (FIG. 52). Controller 300 checks to see that signal $\overline{\text{D.LOCK}}$ is "L", and if it is, the stocker is transferred to specified position POS(m). Otherwise the reloading operation is performed again, subject to the re-load count at step S110. Depending on whether a disk is present, the disk eject operation or the disk receiving operation are performed.

Disk Lock Error/Eject Operation

If signal $\overline{\text{D.LOCK}}$ is not "L", indicating the reloading operation had been repeated three times, controller 300 proceeds from step S110 in FIG. 54 to step S90 in FIG. 53 and performs the disk eject operation.

Eject Key Operation in Standby Mode

The following is a description of the operation that is performed when an eject key is pressed in stand-by mode.

When one of eject key 1–eject key 4 is pressed, controller 300 sets constant m to the corresponding number, "1"–"4", at the corresponding step of steps S9–S12 (FIG. 49). Controller 300 proceeds to step S131 via step S70 (FIG. 52) and S130 (FIG. 55), and checks whether the values of m and n are identical.

If m and n are identical, at steps S132–S134 controller 300 rotates disk separation arms 130 and 131 to the retracted position shown in FIG. 69. At step S132, controller 300 pulses signal FRONT at a 50 percent duty cycle, and at step S133 waits for 50 msec. to elapse.

As loading plate 104 moves to open position POS.3, the force of return spring 134 causes timing belt 107 to engage pinion gear 132A. Signal FRONT is pulsed at a 50 percent duty cycle so that timing belt 107 is rotated clockwise at a low speed, and disk separation arms 130 and 131 are rotated clockwise. The lapse of 50 msec. indicates to controller 300 that disk separation arms 130 and 131 have rotated to the retracted position. At step S134, signal FRONT and signal REAR are set to "H" for 50 msec. to electromagnetically brake motor 190A, and timing belt 107 comes to a halt.

In steps S135–S139, which are identical to steps S76–S80 (FIG. 52) described above, controller 300 moves UD cams 197 and 82 from position UP-2 to DOWN-2. Optical mechanism 1006 is lowered to the down position, and door 11 is opened. In steps S140–S142, which are identical to steps S105–S107 (FIG. 53), controller 300 brings the disk to eject position P5.

The above operation ejects the disk from stand-by mode. At step S143, controller 300 resets D.FLAG(n) and sets M.FLAG to "READY" at step S144. Controller 300 then returns to the main routine defined by the flowchart of FIG. 49.

Figure 56:
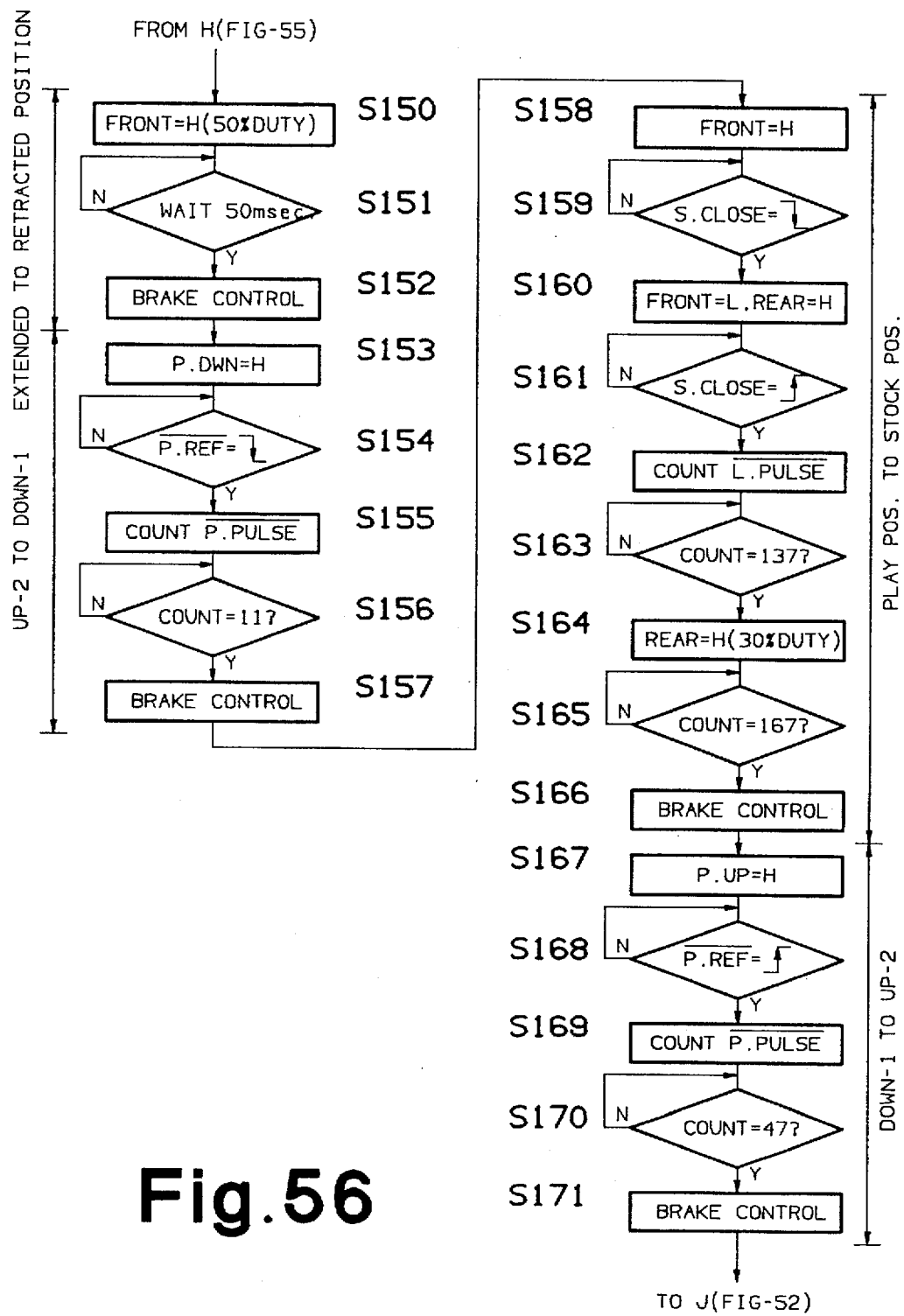
FIG. 56 is a flowchart showing another portion of procedure JOB EJECT.

If the values of m and n are not identical at step S131, controller 300 proceeds to step S150 shown in FIG. 56. Controller 300 then performs the following operations. (1) In steps S150–S152, exactly as in steps S132–S134 (FIG. 55) described above, disk separation arms 130 and 131 are rotated to the retracted position. (2) In steps S153–S157, which are identical to steps S111–S115 (FIG. 54), UD cams 197 and 82 are transferred from position UP-2 to DOWN-1. (3) In steps S158–S166, which are identical to steps S116–S124 (FIG. 54), disk D in playback position P3 is transferred to stock position P4. (4) In steps S167–S171, which are identical to steps S125–S129 (FIG. 54), UD cams 197 and 82 are transferred from position DOWN-1 to UP-2. Controller 300 checks to see if signal $\overline{\text{D.LOCK}}$ is "L", and the stocker is transferred to the specified position POS(m). Depending on whether a disk is present, disk eject operation or disk receiving operation is performed.

Eject Key Operations in Eject Mode

Figure 57:
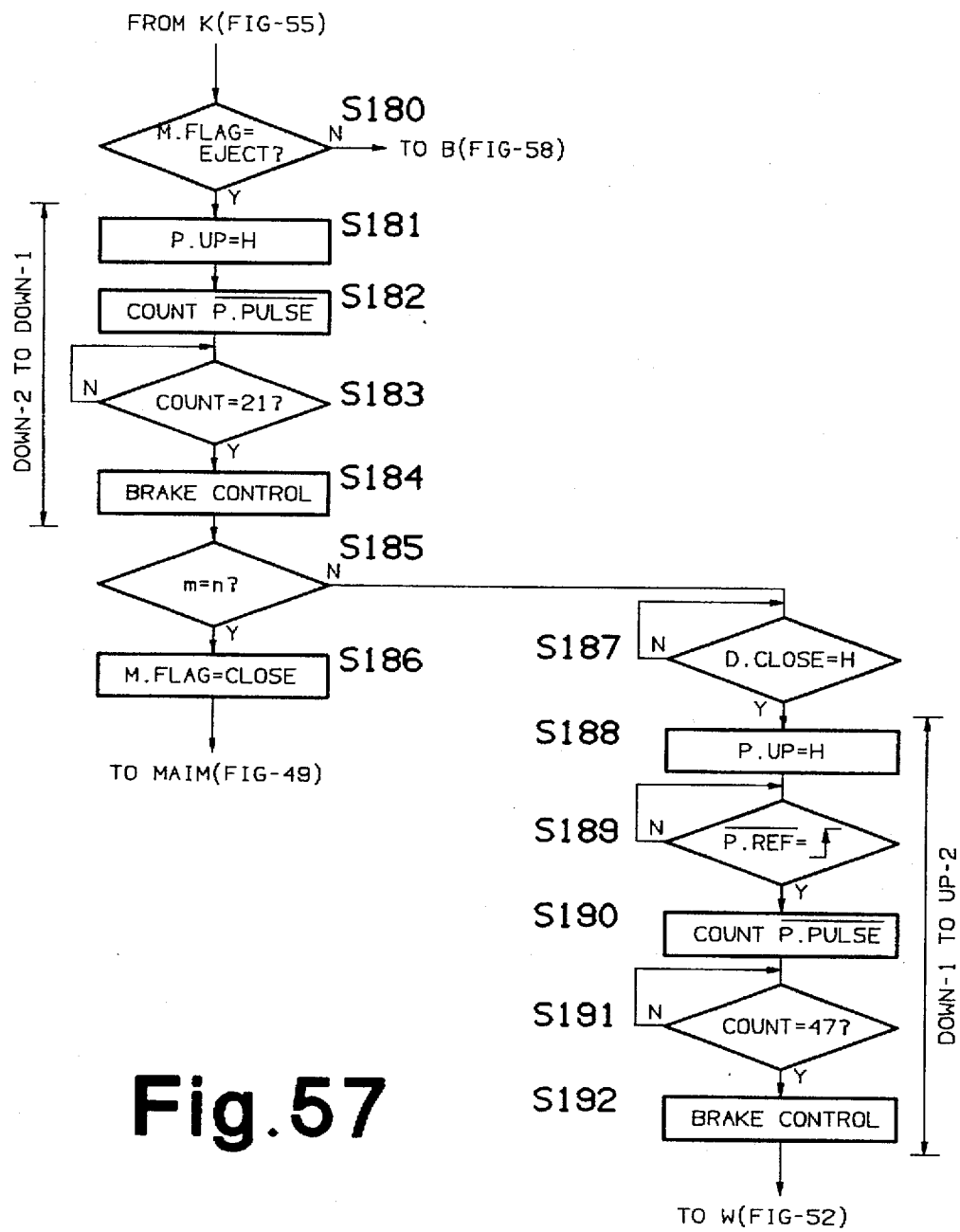
FIG. 57 is a flowchart showing another portion of procedure JOB EJECT.

The following is a description of the operation performed in response to eject key entry in eject mode. When eject key 1–eject key 4 is pressed in eject mode, controller 300 sets constant m to "1"–"4" in the corresponding step of steps S9–S12 (FIG. 49). Controller 300 then proceeds to step S181 via step S70 (FIG. 52), step S130 (FIG. 55), and step S180 (FIG. 57).

First, in steps S181–S184, exactly as in steps S33–S36, controller 300 moves UD cams 197 and 82 from position DOWN-2 to position DOWN-1 and closes door 11. Then, in step S185, controller 300 checks to see if the values of m and n are identical. If they are identical, M.FLAG is set to "CLOSE" at step S186, and controller 300 returns to the main routine defined by the flowchart of FIG. 49.

If the values of m and n are not identical, controller 300 waits for signal D.CLOSE to change to "H" at step S187. This step is included to see if a disk has been left in the eject position. If a disk has been left in the eject position and loading plates 104 and 140 are at open position POS.3 in the step described below, the disk at the eject position would be unstable. Since another disk from the stocker would push the disk left in the eject position outside changer/player 1000, it is possible for the unstable disk to be damaged.

Since UD cams 82 and 197 have been moved to position DOWN-1 in steps S181–S184 described above, if there is no disk in the eject position, door 11 is closed. If signal D.CLOSE is set to "H", it indicates to controller 300 that there is no disk in the eject position. In steps S188–S192, exactly as in steps S46–S50 (FIG. 51), UD cams 82 and 197 are transferred from position DOWN-1 to position UP-2, and loading plates 104 and 140 are opened to open position POS.3. Controller 300 returns to step S72 in FIG. 52, and checks to see that signal $\overline{\text{D.LOCK}}$ is "L". The stocker is then transferred to specified position POS(m), and, depending on whether a disk is present, the disk eject operation or the disk receiving operation is performed.

If there is a disk in the eject position, door 11 is not closed, since it engages the lower surface of the disk. If signal D.CLOSE is "L", it indicates to controller 300 that a disk is in the eject position. Controller 300 then wait for the disk to be removed and signal D.CLOSE to change to "H".

Operations Corresponding to Eject Key Entry in Close Mode

Figure 58:
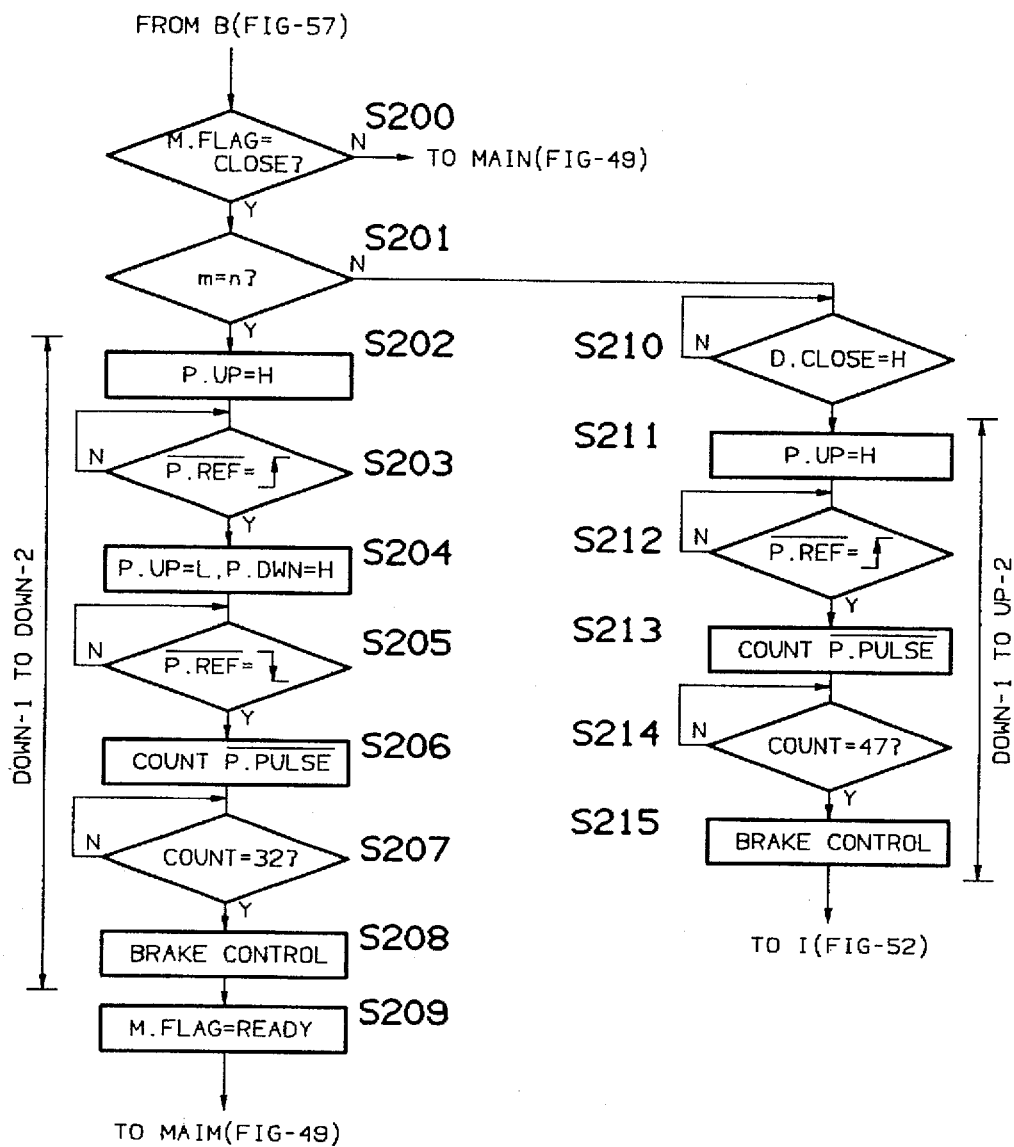
FIG. 58 is a flowchart showing another portion of procedure JOB EJECT.

The following is a description of the procedures followed in response to eject key actuation while disk changer/player 1000 is in close mode. If one of eject key 1-eject key 4 is pressed in close mode, controller 300 sets constant m to "1"–"4" in the corresponding steps S9–S12 (FIG. 49). Controller 300 then proceeds to step S201 via step S70 (FIG. 52), step S130 (FIG. 55), step S180 (FIG. 57), and step S200 (FIG. 58).

Figure 50:
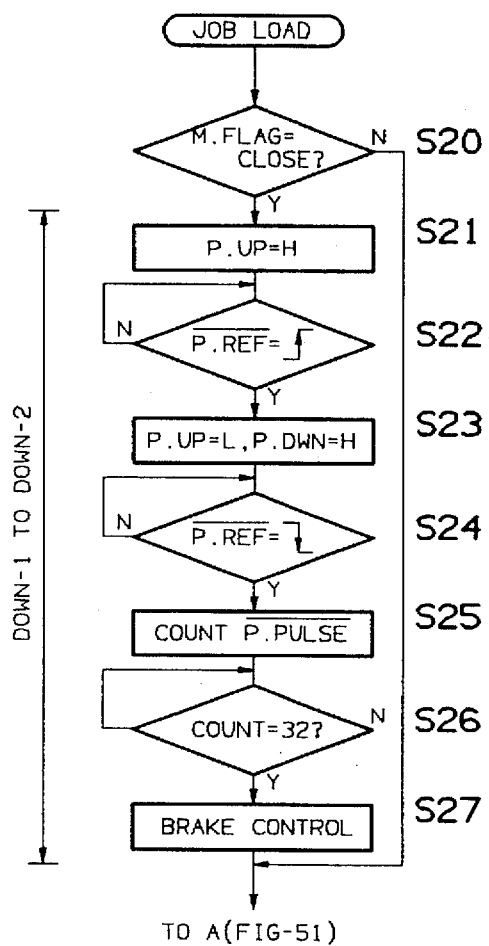
FIG. 50 is a flowchart showing a portion of a procedure JOB LOAD.

First, controller 300 checks to see if the values of m and n are identical. If m=n, controller 300 moves UD cams 197 and 82 from position DOWN-1 to DOWN-2 and opens door 11 in steps S202–S208, exactly as in steps S21–S27 (FIG. 50). At step S209, M.FLAG is set to "READY", and controller 300 returns to the main routine defined by the flowchart of FIG. 49.

If the values of m and n are not identical, controller 300 performs the operations in steps S210–S215, exactly as in steps S187–S192 described above. Controller 300 checks to see that signal D.CLOSE is "H". UD cams 82 and 197 are transferred from position DOWN-1 to UP-2, and loading plates 104 and 140 are separated to open position POS.3. Controller 300 returns to step S72 shown in FIG. 52 and checks to see that signal $\overline{\text{D.LOCK}}$ is "L". Then the stocker is transferred to the specified position POS(m), and depending on whether a disk is present, the disk eject operation or the disk receiving operation is performed.

Operations Corresponding to Read Commands in Stock Mode

Figure 59:
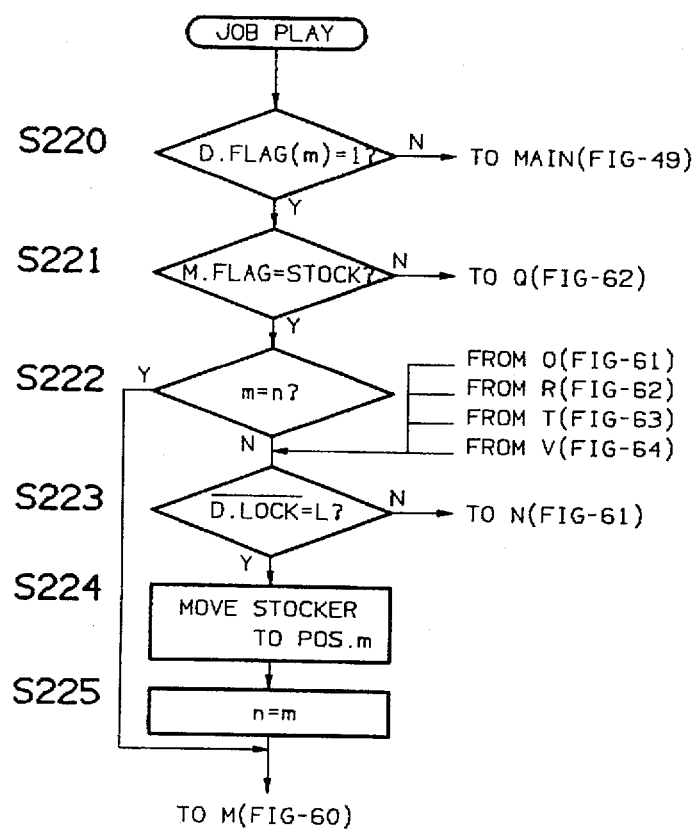
FIG. 59 is a flowchart showing a portion of a procedure JOB PLAY.

When a read command from externally connected computer 303 is detected in stock mode, controller 300 proceeds from step S6 in FIG. 49 to flowchart JOB PLAY in FIG. 59. Along with the read command, computer 303 sends other data, including data needed for reading files, such as the disk number "m" to be played back, the file to be read, etc.

At step S220, controller 300 checks to see if D.FLAG(m) is "1" to determine whether the disk for which the playback command was issued is present. If the disk is not present, controller 300 ignores the read command and returns to the main routine in FIG. 49. When there is no disk, it is desirable to display a warning message on the display connected to computer 303 indicating that no disk is present. It is also be possible periodically to send disk presence data to the computer, and have computer 303 determine whether a disk is present. Computer 303 can then send a read command to the disk changer only when a disk is present.

If the disk for which the playback command was issued is present, then controller 300 checks at step S221 to see if M.FLAG is "STOCK". Then, controller 300 proceeds to step S222 and checks to see if the values of m and n are identical to determine if the disk number for which the playback command was issued is identical to the current stocker position.

Figure 60:
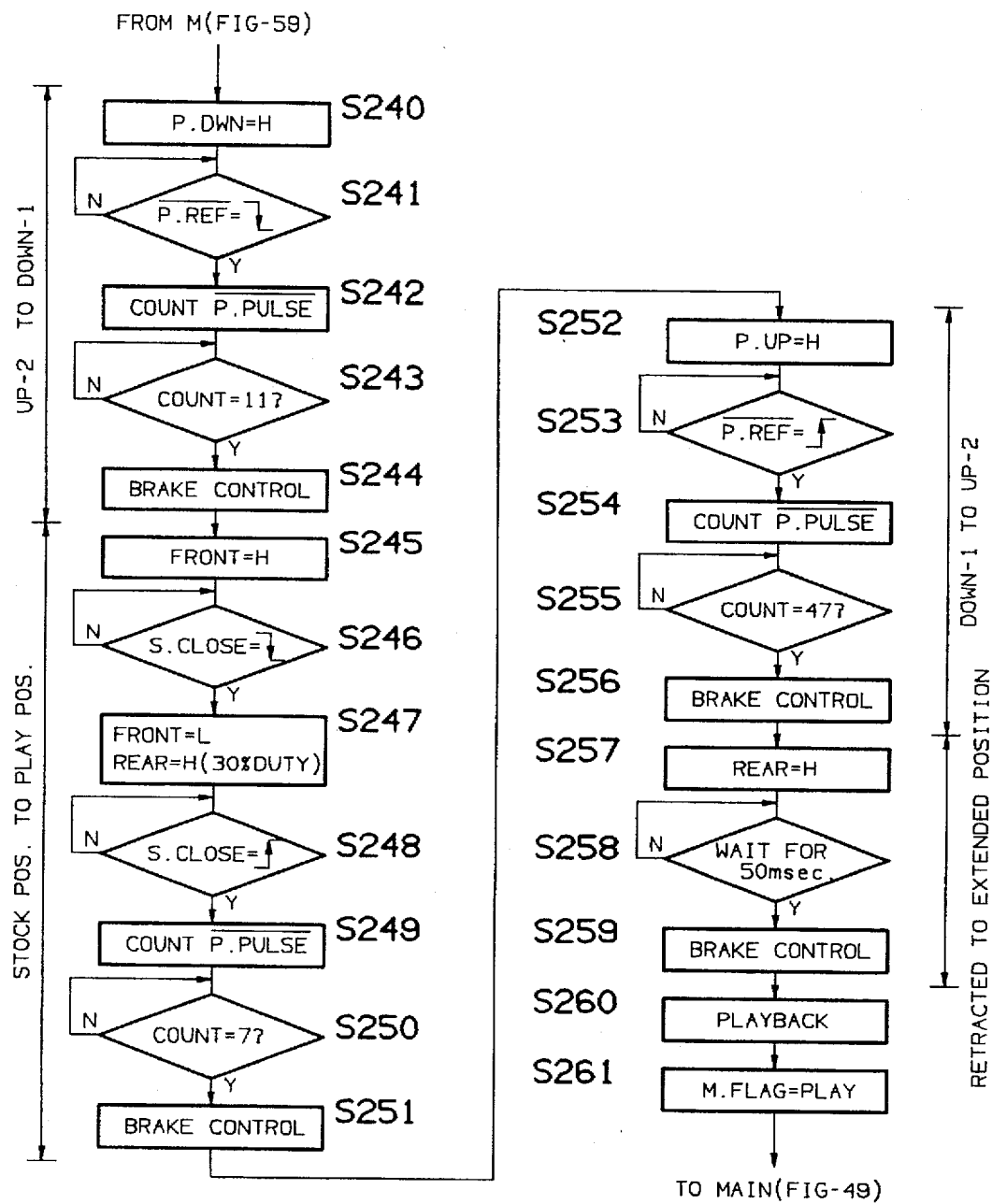
FIG. 60 is a flowchart showing another portion of procedure JOB PLAY.

If m and n are identical, controller 300 proceeds to step S240, shown in FIG. 60. In steps S240–S244, as in steps S90–S94 described above, UD cams 197 and 82 move from position UP-2 to DOWN-1. Thus, loading plates 104 and 140 are pulled by spring 160 so that they close to disk support position POS.2 to support the disk within the stocker. Lock sleeve 62 is lowered to the unlock position (see FIG. 33, FIG. 37), thus allowing disks to be removed from, and inserted into, the stocker.

In steps S245–S251, controller 300 brings the disk from the stocker to the playback position. First, at step S245 controller 300 sets signal FRONT to "H". At step S246, controller 300 waits for signal S.CLOSE to change to "L". When signal FRONT is changed to "H", disk transfer mechanism 1001 rotates timing belt 107 clockwise causing inserted disk D to roll counter-clockwise along friction belt 142 to transport disk D toward the front of changer/player 1000. Referring to FIG. 12, when the disk arrives at position P2, the outer perimeter of the disk forces shutter 147 open, and signal S.CLOSE changes to "L". Then, at step S247, controller 300 sets signal FRONT to "L", and signal REAR is pulsed at a 30 percent duty cycle. At step S123, controller 300 waits for signal S.CLOSE to change to "H".

Since signal REAR is pulsed at a 30 percent duty cycle, disk transfer mechanism 1001 rotates timing belt 14 in reverse at a slow speed in a counter-clockwise direction. This causes shutter 147 to begin to close, and when signal S.CLOSE goes high ("H"), controller 300 begins counting the pulses from signal P.PULSE at step S249. At step S250, controller 300 waits for the pulse count to reach "7". When the pulse count reaches "7" it indicates to controller 300 that the disk has arrived at playback position P3. At step S251, controller 300 sets signal FRONT and signal REAR to "H" for 50 msec. electromagnetically braking motor 190A and halting disk transfer.

Figure 19:
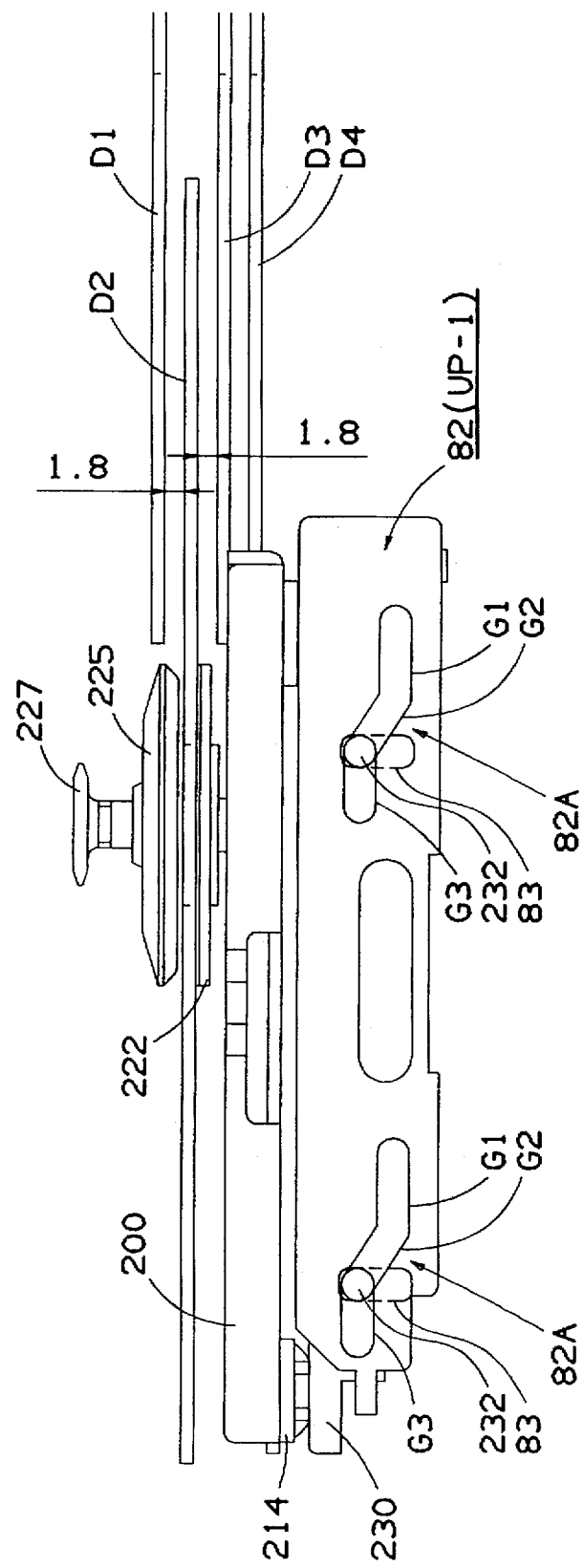
FIG. 19 is a side-view of optical mechanism 1006 and UD cam 82 in position UP-1.
Figure 20:
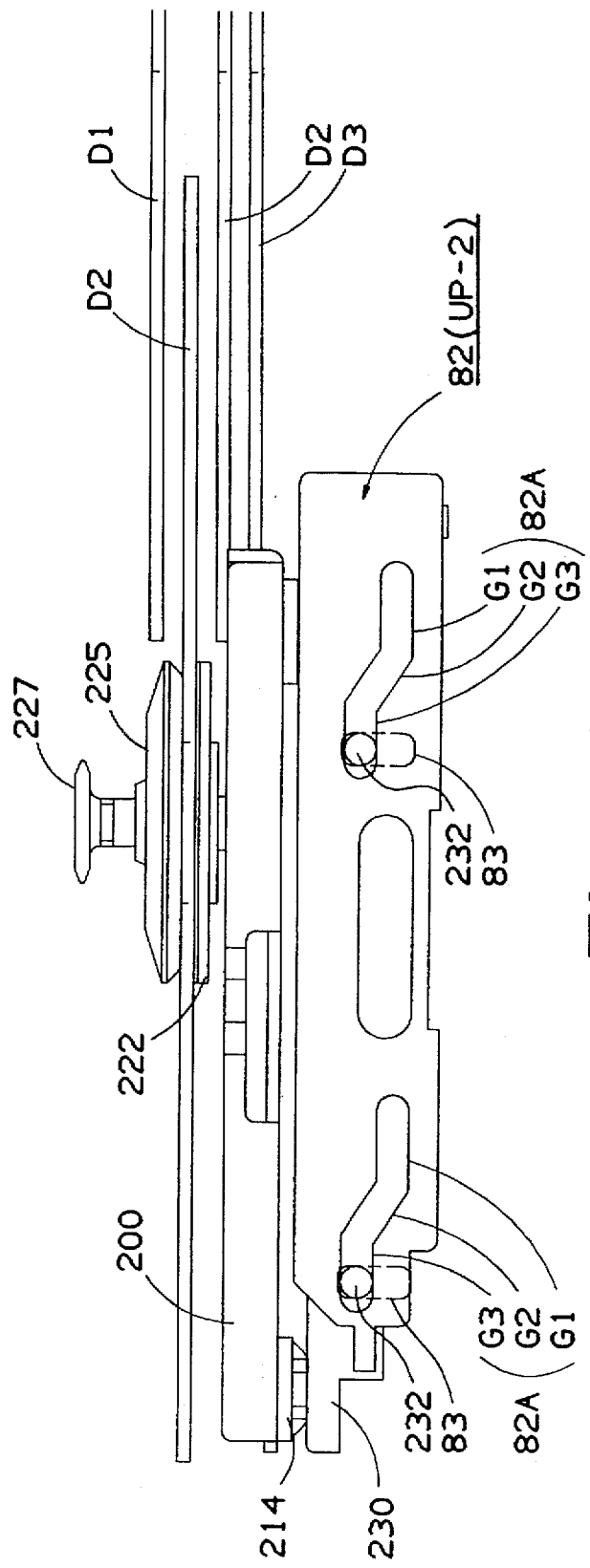
FIG. 20 is a side-view of optical mechanism 1006 and UD cam 82 in position UP-2.

In steps S252–S256, as in steps S46–S50 (FIG. 51), controller 300 moves UD cams 197 and 82 from position DOWN-1 to UP-2. When UD cams 197 and 82 move to position UP-1, optical mechanism 1006 is lifted upward to the up position, where a playback disk can be mounted on turntable 222 (FIG. 19). Then, when UD cams 82 and 197 move to position UP-2, loading plates 104 and 140 are opened up to open position POS.3 (FIG. 13), and the support on damper 1009 is released. Thus, playback disk D2 is released by belts 107 and 142 and clamped on turntable 222 by damper 1009 (FIG. 20).

In steps S257–S259, controller 300 rotates disk separation arms 130 and 131 to the extended position (FIGS. 71 and 72). First, at step S257, controller 300 sets signal REAR to "H", and then waits for 50 msec. to elapse at step S258.

Since loading plates 104 and 140 are at open position POS.3, timing belt 107 is pressed by spring 134 to engage with pinion gear 132A. Thus, when signal REAR is set to "H", timing belt 107 rotates counter-clockwise and disk separation arms 130 and 131 pivot counter-clockwise. Ends 130B and 131B of separation arms 130 and 131 insert between disks D1 and D3, above and below playback disk D2, preventing stored disks D1 and D3 from touching or even approaching playback disk D2. At step S259, after the lapse of 50 msec., which indicates to controller 300 that disk separation arms 130 and 131 are in the extended position shown in FIG. 71, signal FRONT and signal REAR are set to "H" for 50 msec., electromagnetically braking motor 190A and timing belt 107 is halted.

Next, at step S260, controller 300 controls signal processing circuit 307 and servo circuit 308 (FIG. 48), and begins reading the specified file. The read signal output from optical pickup 210 is sent signal processing circuit 307 via RF amp 309. EFM demodulation, deinterleaving, error correction and the like are performed. The signal is then sent, via interface circuit 302, to externally connected computer 303.

The above procedures define a disk playback operation in stock mode. At step S261, M.FLAG is set to "PLAY" and controller 300 returns to the main routine defined by the flowchart of FIG. 49.

If, at step S222 in FIG. 59, the values of m and n are not identical, then controller 300 determines, at step S223, if signal $\overline{D.LOCK}$ is low ("L"), which indicates lock sleeve 62 is in the lock position. If signal $\overline{D.LOCK}$ is low ("L"), controller 300 moves the stocker to position POS(m), where the disk for which the read command was issued can be selected. When the stocker is brought to the specified position, controller 300 sets constant n, which indicates the current stocker position, to the value of m at step S225. Controller 300 proceeds to step S240 in FIG. 60, and disk playback is initiated.

Disk Lock Errors/Re-Loading Operations

Figure 61:
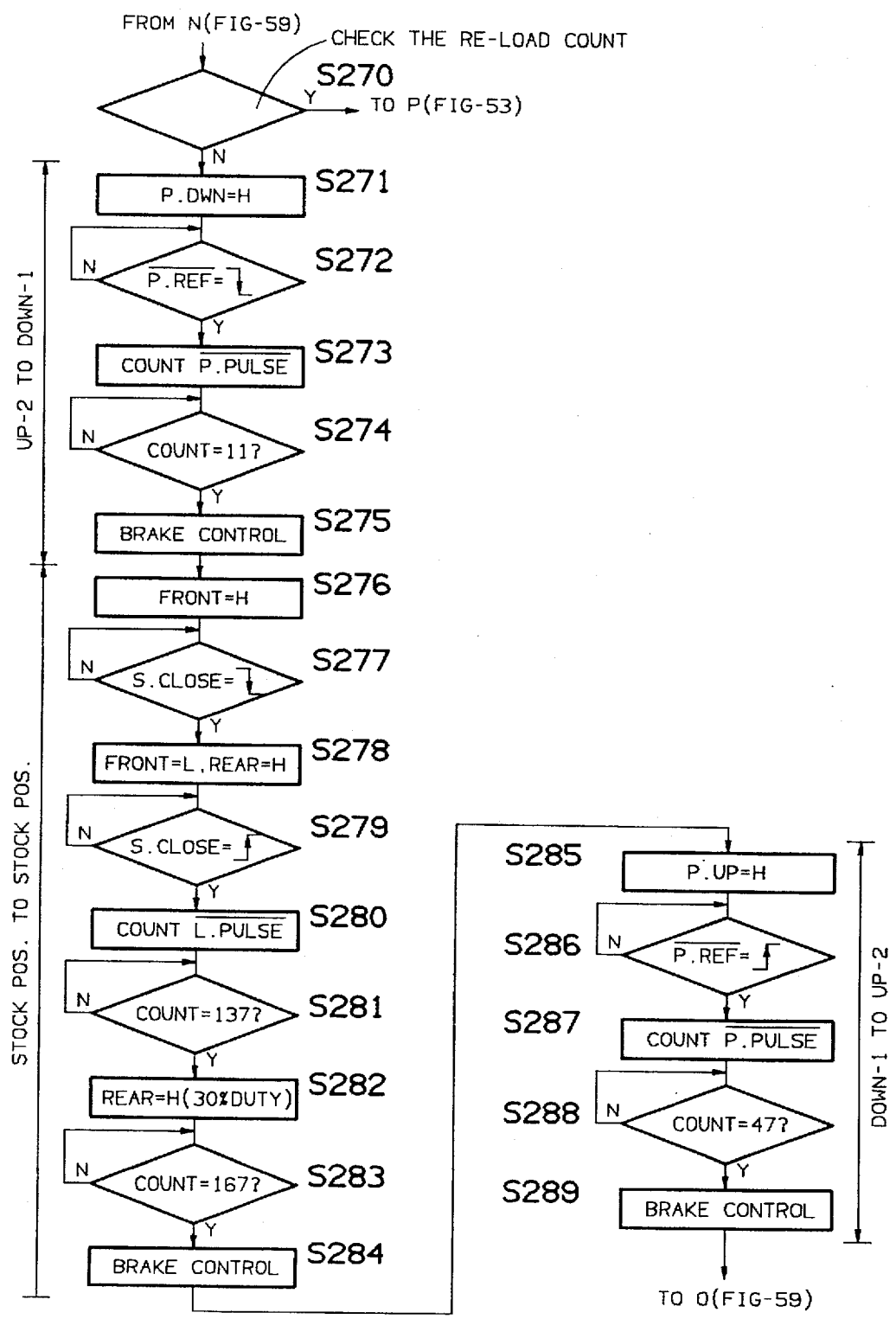
FIG. 61 is a flowchart showing another portion of procedure JOB PLAY.
Figure 62:
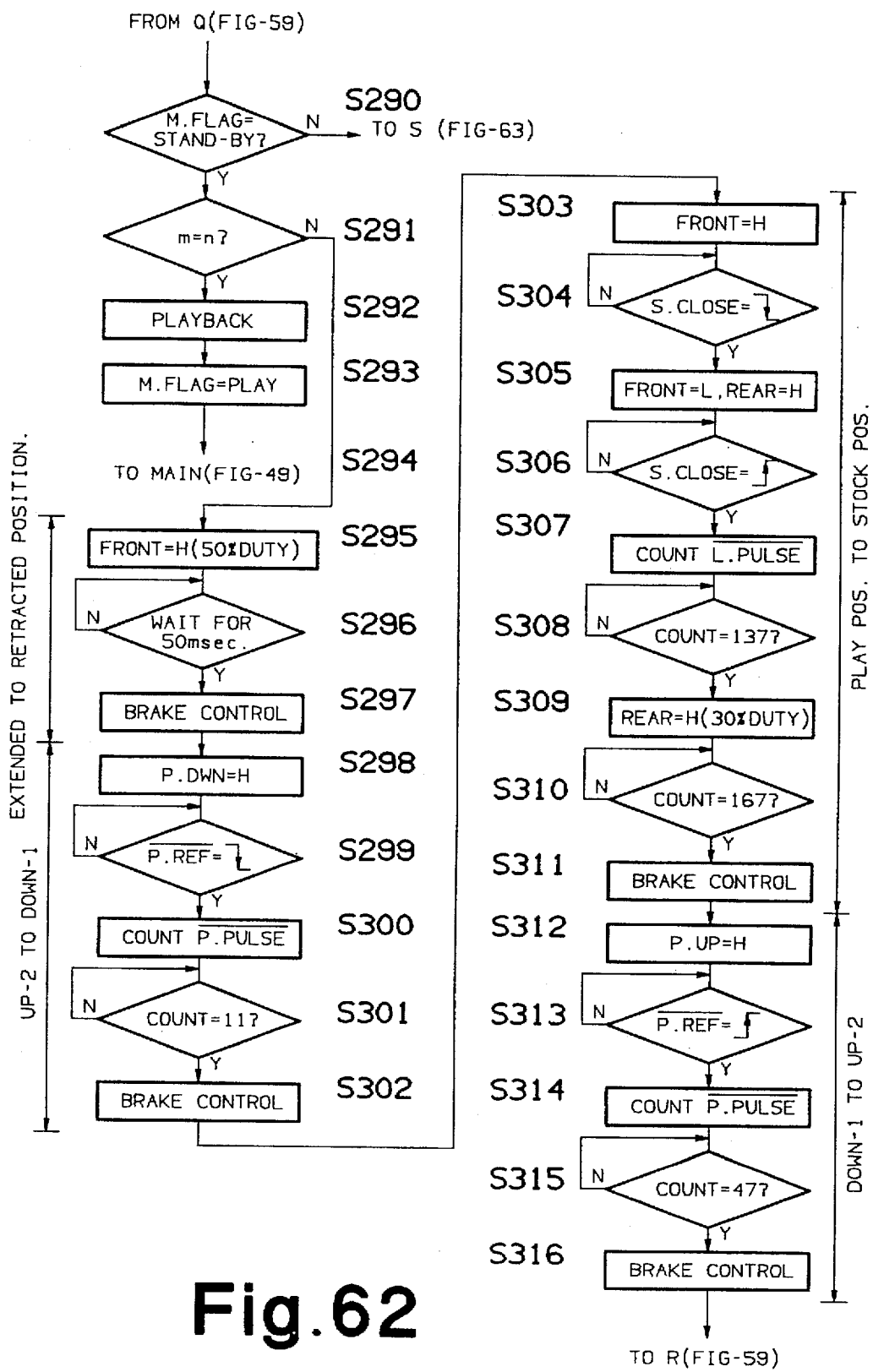
FIG. 62 is a flowchart showing another portion of procedure JOB PLAY.

If, at step S223 in FIG. 59, D.LOCK is high ("H"), indicating lock sleeve 62 is not in the lock position, then controller 300 proceeds to step S270 in FIG. 61. In steps S270–S289, as in steps step S110–S129 (FIG. 54), disk D, which is misaligned, is moved to reference position P2 (see FIG. 12), and the reloading operation performed. The reloading operation returns the disk to stock position P4 again. The details of the operation is as described above, so the description is not repeated.

Control Procedures Responsive to Read Commands in Stand-by Mode

When a read command is received during stand-by mode, controller 300 proceeds to step S6 (FIG. 49), then to step S220 (FIG. 59). At step S220, the presence of the disk for which the read command was issued is determined. If a disk is present in the corresponding slot, controller 300 proceeds to steps S290 and S291 in FIG. 62 via step S221 and checks to see if the values of m and n are identical.

If m and n are identical, controller 300 goes straight to step S292 to control signal processing circuit 307 and servo circuit 308 (FIG. 48), because the disk for which the playback command was issued is already mounted on the optical mechanism. The requested file is read and M.FLAG is set to "PLAY" at step S293. Controller 300 then returns to the main routine defined by the flowchart of FIG. 49.

If, at step S291, the values of m and n are different, controller 300 goes to steps S295–S316, which are the same as steps S150–S171 (FIG. 56). The following operations are performed: (1) disk separation arms 130 and 131 move from the extended position (FIGS. 71 and 72) to the retracted position (FIGS. 69 and 70). (2) UD cams 197 and 82 move from position UP-2 to DOWN-1. (3) Disk D at playback position P3 is transported to stock position P4. (4) UD cams 197 and 82 move from position DOWN-1 to UP-2. After these steps are completed, controller 300 returns to step S223 in FIG. 59. Controller 300 checks to see that signal $\overline{D.LOCK}$ is low ("L"). Stocker 1011 then moves to specified position POS(m), and disk playback operations begin.

Operations Corresponding to Read Commands in Eject Mode

Figure 63:
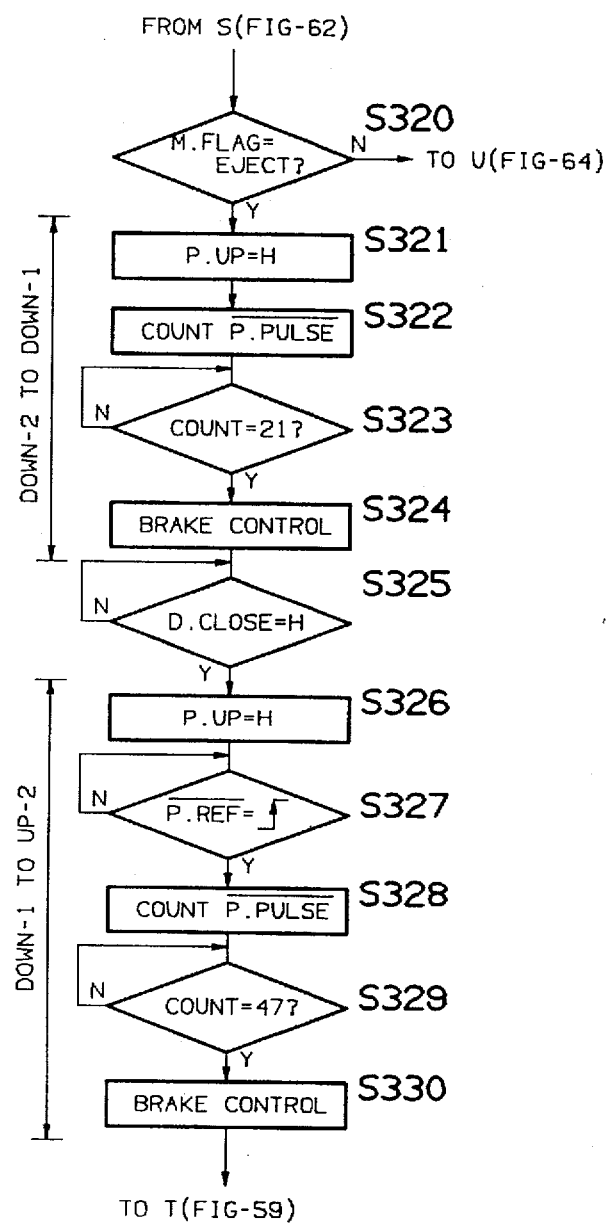
FIG. 63 is a flowchart showing another portion of procedure JOB PLAY.
Figure 64:
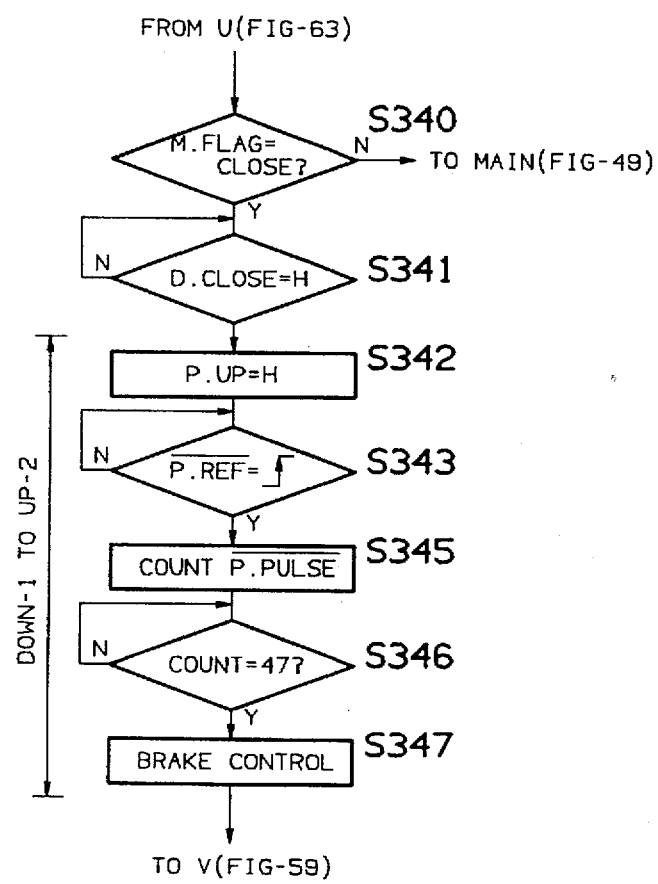
FIG. 64 is a flowchart showing another portion of procedure JOB PLAY.

If a read command is detected in eject mode, controller 300 proceeds to step S6 (FIG. 49), and S220 (FIG. 59), and checks to see whether the disk for which the playback command was issued is present. Controller 300 proceeds to step S321 via step S221 (FIG. 59), S290 (FIG. 62), and step S320 (FIG. 63). In steps S321–S324, as in steps S33–S36 described above, UD cams 82 and 197 move from position DOWN-2 to DOWN-1. At step S325, controller 300 checks to see whether signal D.CLOSE is "H".

If door 11 is closed and signal D.CLOSE is confirmed high "H", controller 300 performs steps S326–S330, as in steps S46–S50 (FIG. 51) described above. UD cams 82 and 197 move from position DOWN-1 to UP-2, and controller 300 proceeds to step S223 in FIG. 59 to confirm that signal $\overline{D.LOCK}$ is low ("L"). Stocker 1011 then moves to specified position POS(m), and disk playback is initiated.

Operations in Response to Read Commands in the Close Mode

If a read command is detected in close mode, controller 300 proceeds through step S6 (FIG. 49) and S220 (FIG. 59), and controller 300 confirms that the disk for which the playback command was issued is present. Controller 300 then proceeds to step S341 via steps S221 (FIG. 59), S290 (FIG. 62), S320 (FIG. 63), and S340 (FIG. 64), and checks that signal D.CLOSE is "H".

If door 11 is closed and signal D.CLOSE is "H", controller 300 proceeds to steps S342–S347, which are the same as steps S46–S50 (FIG. 51), described above. UD cams 82 and 197 move from position DOWN-1 to UP-2, and controller 300 returns to step S223 in FIG. 59. Controller 300 checks to see that signal $\overline{D.LOCK}$ is "L". Then, the stocker is moved to specified position POS(m), and disk playback operations initiated.

Operation Responsive to Completion of File Read

Figure 65:
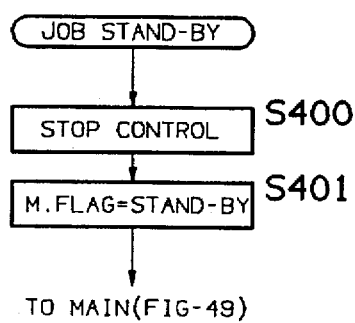

After the requested file has been read, controller 300 goes from step S7 in FIG. 49 to JOB STAND-BY, shown in FIG. 65. At step S400, signal processing circuit 307 and servo circuit 308 (FIG. 48) are controlled to halt disk playback. At step S401, M.FLAG is set to "STAND-BY", and controller 300 returns to the main routine in FIG. 49.

Control Response to Forcible Closure of Door

Figure 66:
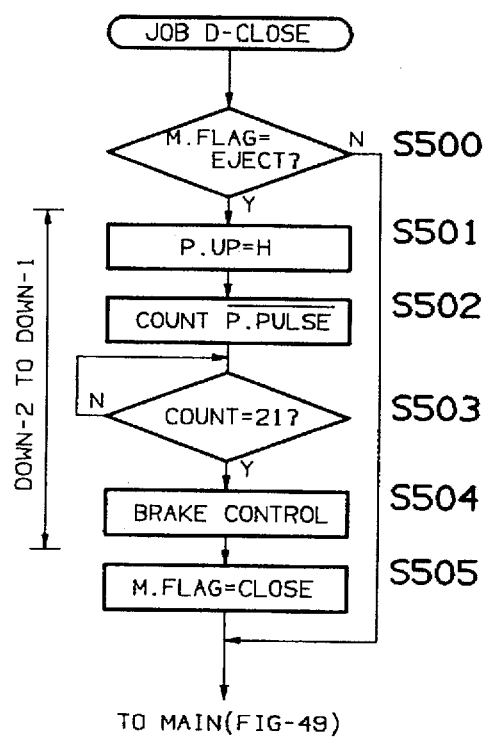
FIG. 66 is a flowchart showing a procedure JOB D-CLOSE.

If the user forcibly closes an open door 11, controller 300 changes signal D.CLOSE to "H", and proceeds from step S8 in FIG. 49 to JOB D-CLOSE in FIG. 66, to perform a closing operation. At step S500, controller 300 checks to see if M.FLAG is set to "EJECT". Only if M.FLAG is set to "EJECT" does controller 300 respond as if door 11 had been forcibly closed. In this case, controller 300 performs the operation in steps S501–S504, the same as steps S33–S36 (FIG. 51), described above. UD cams 197 and 82 move from position DOWN-2 to DOWN-1 and door 11 is closed. At step S505, M.FLAG is set to "CLOSE" and controller 300 returns to the main routine defined by the flowchart of FIG. 49. If, at step S500, M.FLAG is not set to "EJECT", the controller responds as if the user closed the door after forcibly opening the door when it was closed, thus causing signal D.CLOSE to change to "H". Controller 300 responds as if nothing happened and returns to the main routine of FIG. 49.

Although only a single or few exemplary embodiments of this invention have been described in detail above, those skilled in the art will readily appreciate that many modifications are possible in the exemplary embodiment(s) without materially departing from the novel teachings and advantages of this invention. For example, according to the embodiment described above, in transfer zone A1, which is the initial transfer zone of the disk within changer/player 1000, the disk transfer surface slopes so that it engages with the edge of the lower surface of the playback disk. In transfer zone A2, where the playback disk is transferred right up to where it engages with the slot in the stocker, the disk transfer surface slopes so that it engages with the edge of the upper surface of the playback disk. However, if the disk were not pressed downward by the shutter in transfer zone A1, it would also be possible to have the disk transfer surface for transfer zone A1 to be sloped in the same direction as the disk transfer surface for transfer zone A2.

Also, the changer/player 1000 according to the preferred embodiment described above, is capable of selectively playing a plurality of disks stored within a stocker, the disks being inserted through a disk insertion opening and stored within a stocker inside changer/player 1000. However, the present invention can also be implemented in a changer/player in which disks are manually inserted in a removable magazine that can be inserted and removed from changer/player 1000. In this case, there would be no transfer zone A1.

In addition, although in the embodiment described above, the stocker is moved up and down, other alternatives are consistent with the invention. For example, the magazine could store disks as the cards in a Rolodex, so that the stocker does not move up and down, but rotates.

While the embodiment above used a timing belt reeved across pulleys to drive the disk edge, it would also be possible to employ one or more rubber rollers on a pivoting arm to perform a similar function. The present invention is not restricted to the structure of the disk transfer mechanism described above.

Although, in the embodiments described in detail above, guide grooves 121' and 141' are defined by contiguous surfaces, it is possible to obtain the benefits of the invention using non-contiguous surfaces or a only one horizontal guide surface and one surface to engage the disk edge surface De. In fact, in transport zones in which the disk is securely urged against a guide surface, the side opposite the guide surface does not perform a guiding function, under normal conditions, so one horizontal guiding surface (e.g., like 141C of FIG. 6) and one disk-edge engaging surface (e.g., like sloped surface 142A) are all that would be needed. In addition, the guiding surfaced and the disk-edge engaging surface need not be contiguous to form an uninterrupted surface between the guiding and disk-edge engaging surfaces. In addition, the guide surface need not be a flat smooth surface. It could be a surface of one or more narrow ridges or even the surface of a series of bumps, as long as it contacts the surface of the disk and effectively performs the guiding function, it would work effectively as the embodiments described above.

In addition, although in embodiments described above the disk surface is urged against the guiding surface by a sloped edge-engaging surface, it would also be possible to urge the disk surface against the guide surface by other means to achieve the objects of the invention that fall within the scope of at least some of the claims. For example, if a leaf spring were used to urge the disk against the guide surface. The leaf spring could be used in zones A1 and A2 of disk transport and end or change properties in zone A3.

In the embodiments described above, the drive-side disk guide and the fixed-side disk guide are attached to the loading chassis and move in parallel in directions perpendicular to the direction of disk insertion. However, it would also be possible to have the guides supported so that they can freely rotate around the rear of changer/player 1000, thus allowing motion toward the disk transfer surface toward the disk insertion opening. In this case, the axis of rotation would be positioned so that the guides do not open and close when the disk is moved, excluding the cases when the disk is inserted or removed. Also, the embodiment described above connected the guides with pinion gear. It would also be possible, however, to affix one guide to the chassis and support only one movably. If the drive-side disk guide is fixed to the chassis, it could further simplify the drive mechanism, which drives timing pulley 15. In this case, moving the timing belt away from disk edge De is difficult, but the need for a spindle motor would be eliminated if disk rotation during playback can be performed by using the timing belt to drive the disk edge, and the timing belt would not have to be moved away from the outer disk edge surface.

Although in the embodiments described above, vertical surface 142C is vertical, it would also be possible to permit the disk to align itself with the stocker slot without changing the slope to vertical, rather, the slope could simply be lessened so that the disk is not held as firmly against the guiding surface as in zones A1 and A2. This alternative is within the scope of at least some of the claims below.

Although only certain embodiments of the invention have been described in great detail, many modifications of those embodiments are possible without materially departing from the novel teachings and advantages of the invention. Accordingly, all such modifications are intended to be included within the scope of this invention as defined in the following claims. In the claims, means-plus-function clauses are intended to cover the structures described herein as performing the recited function and not only structural equivalents but also equivalent structures. Thus although a nail and screw may not be structural equivalents in that a nail relies entirely on friction between a wooden part and a cylindrical surface whereas a screw's helical surface positively engages the wooden part, in the environment of fastening wooden parts, a nail and a screw may be equivalent structures.

What is claimed is:

1. A device, for transporting, in a direction of travel, a recorded disk having a back surface, a recorded surface, and an edge surface, comprising:

a first guide having a first surface oriented to engage said edge surface at a first portion of said edge surface;

a second guide having a second surface oriented to engage said edge surface at a second portion of said edge surface substantially opposite said first portion of said edge surface;

said first guide having at least one guide surface;

means for urging said disk against said at least one guide surface;

means for rolling said disk along said at least one guide surface;

said at least one guide surface being such that said disk is forced toward a defined orientation relative to said direction of travel;

a disk storage magazine;

said disk storage magazine having at least one storage guide, alignable with said first disk guide, to guide said disk from said first and second disk guides into said disk storage magazine, said disk being guided by said storage guide after a position of initial engagement with said storage guide;

said means for urging having means for reducing a force of urging, as said disk is transported through said position of initial engagement, during a transporting from said first and second disk guides toward said storage guide, whereby said disk is made freer to align itself with said storage guide.

2. A device as in claim 1, wherein said means for urging is a portion of said first surface angularly disposed relative to said back surface and said edge surface.

3. A device as in claim 2, further comprising means for urging said first and second disk guides together so that said portion of said first surface is urged into positive engagement with said edge surface.

4. A device as in claim 2, said first disk guide includes a piece of resilient material affixed thereto, said first surface being a surface of said piece of resilient material.

5. A device, for transporting, in a direction of travel, a recorded disk having a back surface, a recorded surface, and an edge surface, comprising:

a first guide having a first surface oriented to engage said edge surface at a first portion of said edge surface;

a second guide having a second surface oriented to engage said edge surface at a second portion of said edge surface substantially opposite said first portion of said edge surface;

said first guide having at least one guide surface;

means for urging said disk against said at least one guide surface;

said at least one guide surface being such that said disk is forced toward a defined orientation relative to said direction of travel;

a disk storage magazine;

said disk storage magazine having at least one storage guide, alignable with said first disk guide, to guide said disk from said first and second disk guides into said disk storage magazine, said disk being guided by said storage guide after a position of initial engagement with said storage guide;

said means for urging having means for reducing a force of urging, as said disk is transported through said position of initial engagement, during a transporting from said first and second disk guides toward said storage guide, whereby said disk is made freer to align itself with said storage guide;

said means for urging is a portion of said first surface angularly disposed relative to said back surface and said edge surface;

means for urging said first and second disk guides toward each other so that said portion of said first surface is urged into positive engagement with said edge surface;

said first surface being a resilient material;

said portion of said first surface has at least two portions, a first portion of which is set at a first angle relative to said back surface and a second portion of which is set at a second angle relative to said back surface;

a transition between said first and second portion being in a vicinity of said position of initial engagement so that said edge surface engages said second portion as said disk approaches said disk storage magazine.

6. A device as in claim 2, further comprising means for urging said first and second disk guides together so that said first and second surfaces are urged into positive engagement with said edge surface.

7. A device as in claim 2, wherein said first disk guide has a channel, having an access, into which said disk fits, said guide surface defining a portion of said access.

8. A device as in claim 7, wherein said channel has a blind end, said first surface forms at least a portion of said blind end.

9. A device as in claim 1, further comprising means for urging said first and second disk guides together so that said first and second surfaces are urged into positive engagement with said edge surface.

10. A device as in claim 1, wherein said first disk guide has a channel, having an access, into which said disk fits, said guide surface defining a portion of said access.

11. A device as in claim 10, wherein said channel has a blind end, said first surface forms at least a portion of said blind end.

12. A device as in claim 1, further comprising:

means for rolling said disk along said first surface;

means for urging said disk edge surface against said first surface; and a portion of said first surface being shaped to cause said disk to creep toward said guide surface as said disk is rolled along said first surface.

13. A device as in claim 12, said first disk guide includes a piece of resilient material affixed thereto, said first surface being a surface of said piece of resilient material.

14. A device as in claim 13, wherein said channel has a blind end, said first surface forms at least a portion of said blind end.

15. A device for transporting a recorded disk with a recorded surface, a back surface opposite said recorded surface, and an edge surface running around a perimeter of said disk, comprising:

a first longitudinal guide having a first surface oriented to engage said edge surface at a first portion of said edge surface;

a second longitudinal guide having a second surface oriented to engage said edge surface at a second portion of said edge surface opposite said first portion of said edges surface;

said first longitudinal guide having a guide surface parallel to a direction of travel of said disk;

said guide surface also being parallel to said recorded surface; and a resilient element attached to said first longitudinal guide sloped to urge one of said recorded surface and said back surface against said guide surface;

a third guide to which said disk is transferred from said first and second longitudinal guides, said third guide being substantially alignable with said first longitudinal guide;

said resilient element being shaped such that a force of said urging is reduced when said disk is transferred from said first longitudinal guide to said third guide, whereby an engagement between said guide surface and said disk is one of relinquished and made more compliant, so that said disk is enabled to tilt and thereby pass smoothly to said third guide when said third guide is imperfectly aligned with said first longitudinal guide.

16. A device as in claim 15, wherein said first surface is a surface of said resilient element.

17. A device as in claim 16, wherein said first surface has a first portion that is non-parallel with said edge surface of said disk.

18. A device for transporting a recorded disk with a recorded surface, a back surface opposite said recorded surface, and an edge surface running around a perimeter of said disk, comprising:
   a first longitudinal guide having a first surface oriented to engage said edge surface at a first portion of said edge surface;
   a second longitudinal guide having a second surface oriented to engage said edge surface at a second portion of said edge surface opposite said first portion of said edges surface;
   said first longitudinal guide having a guide surface parallel to a direction of travel of said disk;
   said guide surface also being parallel to said recorded surface;
   a resilient element attached to said first longitudinal guide positioned to urge one of said recorded surface and said back surface against said guide surface;
   a third guide to which said disk is transferred from said first and second longitudinal guides, said third guide being substantially alignable with said first longitudinal guide;
   said resilient element being shaped such that a force of said urging is reduced when said disk is transferred from said first longitudinal guide to said third guide, whereby an engagement between said guide surface and said disk is one of relinquished and made more compliant, so that said disk is enabled to tilt and thereby pass smoothly to said third guide when said third guide is imperfectly aligned with said first longitudinal guide;
   said first surface is a surface of said resilient element;
   said first surface has a first portion that is non-parallel with said edge surface of said disk; and
   said first surface has a second portion that is closer to parallel to said edge surface than said first portion, said second portion being located near an interface between said first longitudinal guide and said third guide, such that, during a transporting of said disk from said first longitudinal guide to said third guide, said disk engages said second portion prior to engaging said third guide.

19. A device as in claim 16, wherein:
   said first longitudinal guide has a channel; and
   said first surface lies inside said channel.

20. A device as in claim 19, further comprising an urging mechanism positioned to force said first and second longitudinal guides together so that a pair of constant oppositely-directed forces is applied to said disk edge surface.

21. A device as in claim 19, wherein said first surface forms a blind end of said channel.

22. A device as in claim 15, wherein:
   said first longitudinal guide has a channel;
   said first surface lies inside said channel; and
   said resilient element forms a blind end of said channel.

23. A device as in claim 22, further comprising an urging mechanism positioned to force said first and second longitudinal guides together so that a pair of constant oppositely-directed forces is applied to said disk edge surface.

24. A device as in claim 22, wherein:
   said resilient element has first and second surface portions forming first and second angles with said edge surface, said second surface portion being more nearly parallel to said edge surface than said first surface portion;
   said first surface portion positioned to engage said edge surface when said disk is at a remote position remote from a position of engagement of said third guide; and
   said second surface portion positioned to engage said edge surface when said disk is closer to said position of engagement of said third guide than said remote position.

25. A device for transporting a recorded disk with a recorded surface, a back surface opposite said recorded surface, and an edge surface running around a perimeter of said disk, comprising:
   a first longitudinal guide having a first surface oriented to engage said edge surface at a first portion of said edge surface;
   a second longitudinal guide having a second surface oriented to engage said edge surface at a second portion of said edge surface opposite said first portion of said edges surface;
   said first longitudinal guide having a guide surface parallel to a direction of travel of said disk;
   said guide surface also being parallel to said recorded surface;
   a resilient element attached to said first longitudinal guide positioned to urge one of said recorded surface and said back surface against said guide surface;
   a third guide to which said disk is transferred from said first and second longitudinal guides, said third guide being substantially alignable with said first longitudinal guide;
   said resilient element being shaped such that a force of said urging is reduced when said disk is transferred from said first longitudinal guide to said third guide, whereby an engagement between said guide surface and said disk is one of relinquished and made more compliant, so that said disk is enabled to tilt and thereby pass smoothly to said third guide when said third guide is imperfectly aligned with said first longitudinal guide;
   said first surface is said resilient element;
   said first longitudinal guide has a channel;
   said first surface lies inside said channel;
   said first surface forms a blind end of said channel;
   said resilient element has first and second surface portions forming first and second angles with said edge surface, said second surface portion being more nearly parallel to said edge surface than said first surface portion;
   said first surface portion positioned to engage said edge surface when said disk is at a remote position remote from a position of engagement of said third guide; and
   said second surface portion positioned to engage said edge surface when said disk is closer to said position of engagement of said third guide than said remote position.

26. A device as in claim 15, further comprising an urging mechanism positioned to force said first and second longitudinal guides together so that a pair of constant oppositely-directed forces is applied to said disk edge surface.

27. A device, for transporting a disk, with an edge and recorded and back surfaces, along a path of travel, comprising:

a chassis;

a first guide element, connected to said chassis, with a channel aligned with said path;

said channel having a first guide surface parallel to said path of travel;

said first guide surface defining, at least partly, a first side of an access of said channel;

a second guide element having a second guide surface defining, at least partly, a second side of said access;

a resilient member with a first edge-engaging surface defining a blind end of said channel;

said first edge-engaging surface being sloped to urge one of said recorded and back surfaces against said first guide surface as said disk is transported along a first portion of said path, whereby said disk's orientation is maintained parallel to said first guide surface;

said first edge-engaging surface being shaped to ease a force of urging generated by said first edge-engaging surface at a second portion of said path coinciding with a position of said disk at which said disk engaged with said first guide surface begins to engage said second guide surface, whereby said disk is made more free to pivot and is thereby enabled to align itself with said second guide surface.

28. A device as in claim 27, further comprising:

said second guide element having a second edge-engaging surface oriented to engage said edge of said disk;

at least one of said first and second guide elements being movably connected to said chassis and urged toward the other of said first and second guide elements so that each of said first and second edge-engaging surfaces urges said edge of said disk against the other of said first and second edge-engaging surfaces.

29. A device for transporting a disk, with an edge and recorded and back surfaces, along a path of travel, comprising:

a chassis;

a first guide element, connected to said chassis, with a channel aligned with said path;

said channel having a first guide surface parallel to said path of travel;

said first guide surface defining, at least partly, a first side of an access of said channel;

a second guide element having a second guide surface that is imperfectly alignable with said first guide surface such that said first and second guide surfaces lie in different planes;

a resilient member with a first edge-engaging surface defining a blind end of said channel;

said first edge-engaging surface being shaped to urge one of said recorded and back surfaces against said first guide surface as said disk is transported along a first portion of said path, whereby said disk's orientation is maintained parallel to said first guide surface;

said first edge-engaging surface being shaped to ease a force of urging generated by said first edge-engaging surface at a second portion of said path coinciding with a position of said disk at which said disk engaged with said first guide surface begins to engage said second guide surface, whereby said disk is made more free to pivot and is thereby enabled to align itself with said second guide surface;

a third guide surface of said first guide element defining, at least partly, a second side of said access; and said first edge-engaging surface being shaped to urge the other of said recorded and back surfaces against said third guide surface as said disk is transported along a third portion of said path lying between said first portion of said path and said second portion of said path.

30. A device as in claim 29, wherein said first edge-engaging surface has a portion, coinciding with said third portion of said path, that forms a non-zero angle of less than 90 degrees with said other of said recorded and back surfaces.

31. A device as in claim 27, wherein said first edge-engaging surface has a portion that forms a non-zero angle of less than 90 degrees with the other of said recorded and back surfaces.

32. A device, for transporting a disk, with an edge and recorded and back surfaces, along a path of travel, comprising:

a chassis;

a first guide element, connected to said chassis, with a channel aligned with said path;

said channel having a first guide surface parallel to said path of travel;

said first guide surface defining, at least partly, a first side of an access of said channel;

a second guide element having a second guide surface that is imperfectly alignable with said first guide surface such that said first and second guide surfaces lie in different planes;

a resilient member with a first edge-engaging surface defining a blind end of said channel;

said first edge-engaging surface being shaped to urge one of said recorded and back surfaces against said first guide surface as said disk is transported along a first portion of said path, whereby said disk's orientation is maintained parallel to said first guide surface;

said first edge-engaging surface being shaped to ease a force of urging generated by said first edge-engaging surface at a second portion of said path coinciding with a position of said disk at which said disk engaged with said first guide surface begins to engage said second guide surface, whereby said disk is made more free to pivot and is thereby enabled to align itself with said second guide surface;

said second guide element having a second edge-engaging surface oriented to engage said edge of said disk;

at least one of said first and second guide elements being movably connected to said chassis and urged toward the other of said first and second guide elements so that each of said first and second edge-engaging surfaces urges said edge of said disk against the other of said first and second edge-engaging surfaces;

a third guide surface of said first guide element defining, at least partly, a second side of said access; and said first edge-engaging surface being shaped to urge the other of said recorded and back surfaces against said second guide surface as said disk is transported along said second portion of said path.

33. A device as in claim 32, wherein said first guide surface has a portion that forms a non-zero angle of less than 90 degrees with the other of said recorded and back surfaces.

34. A device, comprising:

a first guide with a first support surface positioned to engage and movably support, at least partly, said disk;

a second guide with a first guide surface substantially parallel to a recorded surface of said disk and positioned to engage one of said recorded surface and a back surface of said disk;

a third guide, imperfectly aligned with said second guide, positioned to engage said one of said recorded surface and said back surface of said disk when said disk is transported along said first guide beyond a transition point along a path of transport of said disk at which said disk begins to engage said third guide;

said second guide having an urging surface forming a first angle, substantially greater than 0 and substantially less than 90 degrees, with said recorded surface of said disk;

said first guide having means for urging an edge of said disk against said urging surface and for permitting said disk to roll along said edge against said urging surface, whereby one of said recorded surface and a back surface is urged against said guide surface;

said second guide having a low-urging-force surface positioned such that, when said disk approaches said transition point, said disk rolls off said urging surface onto said low-urging force surface; and said low-urging-force surface forming a second angle substantially greater than said first angle.

35. A device, comprising:

a first guide with a first support surface positioned to engage and movably support, at least partly, a disk;

a second guide with a first guide surface substantially parallel to a recorded surface of said disk and positioned to engage one of said recorded surface and a back surface of said disk;

a third guide, imperfectly aligned with said second guide, positioned to engage said one of said recorded surface and said back surface of said disk when said disk is transported along said first guide beyond a transition point along a path of transport of said disk, said transition point being a point at which said disk just begins to engage said third guide;

said second guide having a resilient urging surface positioned to urge one of said recorded surface and a back surface against said guide surface with a first urging force;

said urging surface being operative to urge said disk over a portion of said path other than a region proximate said transition point so that, when said disk approaches said transition point, said first urging force is one of relinquished and reduced so that said disk is permitted to tilt more easily to align itself with said third guide as said disk passes through said transition point.

36. A device for transporting a disk, with an edge, a recorded surface, and a back surface opposite said recorded surface, from an insertion position to a first position of said device, comprising:

first and second disk transfer guides movably supported in said device;

said first disk transfer guide including first means for engaging a first portion of said edge;

said second disk transfer guide including second means for engaging a second portion of said edge; and means for urging said first and second disk transfer guides together so that said disk can be supported therebetween;

at least one of said first and second disk transfer guides including drive means for moving said disk along said first and second disk transfer guides;

one of said first and second disk guides having an urging surface and a guide surface;

said urging surface having a sloped portion positioned to engage said edge at a corner thereof, said sloped portion being oriented to urge said disk toward the other of said first and second disk guides and also urge one of said recorded and back surfaces against said guide surface with a first force of urging;

a storage guide at said first position having a storage guiding surface to guide said disk at said first position;

said urging surface having a transition surface portion, coinciding with a portion of a path of travel of said disk to said first position where said disk initially engages said storage guide; and said transition surface portion being oriented such that said disk is urged against said guide surface with a second force that is less than said first force, whereby said disk is permitted to tilt to align itself with said storage guiding surface.

37. A device as in claim 36, wherein an orientation of said guide surface is such as to maintain a constant pitch angle of said disk as said disk is transported.

38. A device as in claim 37, wherein said guide surface engages an edge portion of said recorded surface on which no data is recorded.

39. A device as in claim 36, further comprising:

a resilient surface on said one of said first and second disk transfer guides;

said urging surface includes a portion of said resilient surface.

40. A device as in claim 39, wherein an orientation of said guide surface is such as to maintain a constant pitch angle of said disk as said disk is transported.

41. A device as in claim 40, wherein said guide surface engages an edge portion of said recorded surface on which no data is recorded.

42. A device for transporting a disk, comprising:

a longitudinal guide;

said longitudinal guide having first and second opposed surfaces spaced apart a distance permitting said disk to fit therebetween in a loose fit;

means for urging said disk into said longitudinal guide;

a blind end in said longitudinal guide;

means for rolling said disk in substantially non-sliding contact with said blind end;

said blind end having at least one portion which is angled at an angle effective to bias said disk into contact with said first surface when said disk is in a first zone.

43. A device according to claim 42, further comprising:

a second portion of said blind end which is angled at a second angle effective in a second zone to bias said disk out of contact with said first surface and into contact with said second surface.

44. A device according to claim 42, further comprising:

a second portion of said blind end which is angled at a second angle effective in a second zone; and said second angle is substantially at right angles to a surface of said disk, whereby said disk is angularly free within said loose fit.

\* \* \* \* \*